US012793520B2

(12) United States Patent
Kim et al.

(10) Patent No.: US 12,793,520 B2
(45) Date of Patent: Nov. 10, 2026

(54) INFORMATION OUTPUT APPARATUS

(71) Applicant: DOT INCORPORATION, Seoul (KR)

(72) Inventors: Ju Yoon Kim, Gimpo-si (KR); Ji Ho Kim, Gimpo-si (KR); Hyeon Cheol Park, Gwangmyeong-si (KR)

(73) Assignee: DOT INCORPORATION, Seoul (KR)

( * ) Notice: Subject to any disclaimer, the term of this patent is extended or adjusted under 35 U.S.C. 154(b) by 77 days.

(21) Appl. No.: 18/750,992

(22) Filed: Jun. 21, 2024

(65) Prior Publication Data

US 2024/0346894 A1 Oct. 17, 2024

Related U.S. Application Data

(63) Continuation-in-part of application No. PCT/KR2022/021059, filed on Dec. 22, 2022.

(30) Foreign Application Priority Data

Dec. 23, 2021 (KR) ........................ 10-2021-0186177
Dec. 29, 2023 (KR) ........................ 10-2023-0197388

(51) Int. Cl.
*G08B 6/00* (2006.01)

(52) U.S. Cl.
CPC ...................................... *G08B 6/00* (2013.01)

(58) Field of Classification Search
CPC ........................................................ G08B 6/00
USPC ....................................................... 340/407.1
See application file for complete search history.

(56) References Cited

U.S. PATENT DOCUMENTS

2002/0050923 A1* 5/2002 Petersen .............. G09B 21/004 340/407.1
2015/0379895 A1* 12/2015 Chari ................... G09B 21/004 434/114
2017/0249020 A1* 8/2017 Wild ........................ G06F 3/016
2020/0160747 A1* 5/2020 Yang ..................... G06F 3/0412
2021/0077337 A1 3/2021 Kim et al.
2021/0090411 A1 3/2021 Kim et al.
(Continued)

FOREIGN PATENT DOCUMENTS

JP 2015-70729 A 4/2015
KR 10-2000-0038125 A 7/2000
(Continued)

OTHER PUBLICATIONS

International Search Report dated Mar. 30, 2023 issued by the International Bureau in International Application No. PCT/KR2022/021059.

*Primary Examiner* — Jack K Wang
(74) *Attorney, Agent, or Firm* — Sughrue Mion, PLLC

(57) ABSTRACT

An embodiment of the present disclosure provides an information output apparatus including an expression unit moving in at least one direction to be detected by a user, a movement unit disposed at one side of the expression unit, formed to be rotatable in at least one direction, and rotated to move the expression unit in at least one direction, a driving force providing unit disposed at one side of the movement unit and configured to provide a driving force to the movement unit, and a driving force limiting member formed to reduce or restrict the driving force generated by the driving force providing unit from being transmitted in a direction that is different from a direction from the driving force providing unit to the expression unit.

5 Claims, 51 Drawing Sheets

(56) References Cited

U.S. PATENT DOCUMENTS

| | | | | |
|---|---|---|---|---|
| 2021/0104175 | A1 * | 4/2021 | Pitts | G09B 21/004 |
| 2021/0208540 | A1 * | 7/2021 | Conti | G04C 3/001 |
| 2021/0316446 | A1 * | 10/2021 | Leroy | G06F 3/014 |
| 2022/0322752 | A1 * | 10/2022 | Bologna | A24F 15/01 |
| 2023/0082726 | A1 * | 3/2023 | Peters | E05B 47/0012 70/279.1 |
| 2023/0335009 | A1 | 10/2023 | Kim et al. | |
| 2023/0419860 | A1 * | 12/2023 | Drake | G09B 21/004 |
| 2024/0346894 | A1 * | 10/2024 | Kim | G06F 3/016 |

FOREIGN PATENT DOCUMENTS

| | | | |
|---|---|---|---|
| KR | 10-2012-0031779 | A | 4/2012 |
| KR | 10-2017-0052385 | A | 5/2017 |
| KR | 10-2017-0089827 | A | 8/2017 |
| KR | 10-2019-0133929 | A | 12/2019 |
| KR | 10-2019-0134072 | A | 12/2019 |
| KR | 10-2019-0139634 | A | 12/2019 |
| KR | 10-2055304 | B1 | 12/2019 |
| KR | 10-2020-0006025 | A | 1/2020 |
| KR | 10-2268554 | B1 | 6/2021 |
| KR | 10-2023-0096573 | A | 6/2023 |
| KR | 10-2023-0096574 | A | 6/2023 |
| WO | 2017/078476 | A1 | 5/2017 |

* cited by examiner

INFORMATION OUTPUT APPARATUS

CROSS-REFERENCE TO RELATED APPLICATION

This application is a Continuation-in-part of International Application No. PCT/KR2022/021059, filed on Dec. 23, 2021, which claims priority under 35 U.S.C. § 119 to Korean Patent Application No. 10-2021-0186177, filed on Dec. 23, 2021, and Korean Patent Application No. 10-2023-0197388, filed on Dec. 29, 2023, in the Korean Intellectual Property Office, the disclosures of which are incorporated by reference herein in their entirety.

BACKGROUND

1. Field

Embodiments of the present disclosure relate to an information output apparatus.

2. Description of the Related Art

Users may perceive information in various ways. To this end, various types of information output apparatuses are being used.

For example, visual information output apparatuses using printed materials and audio information output apparatuses using sound are being used.

In particular, in modern times, as an amount of information increases and technology develops, information output apparatuses including electronic technology are being widely used, and display apparatuses including a plurality of pixels are being commonly used as visual information output apparatuses.

However, in the case of such display apparatuses, various circuits or the like are embedded, which reduces convenience in manufacturing and causes inconvenience in control.

Meanwhile, due to the development of technologies, the diversification of lifestyles, and the like, various information output types are required.

For example, various information output apparatuses may be required according to the situation of each user, and in particular, users with weakened specific senses, for example, users with weak visual capacity or without visual capacity, require information output through the sense of touch. When information is output through the sense of touch, it is difficult to easily control and stably drive the output, and thus there is a limitation in improving user convenience through improvements in information output apparatuses.

SUMMARY

Embodiments of the present disclosure provide an information output apparatus capable of improving a precise control ability for information output and information output efficiency.

An embodiment of the present disclosure provides an information output apparatus including an expression unit formed to be movable in at least one direction to be detected by a user, a driving force providing unit configured to provide a driving force for the expression unit, and a driving force limiting member formed to reduce or block a portion of the driving force generated by the driving force providing unit from being transmitted in at least one direction.

In the present embodiment, the driving force providing unit may include a coil, and the driving force limiting member may be disposed on at least one side of the coil.

In the present embodiment, the coil may be disposed around a driving support, and the driving force limiting member may be formed to have a height in a longitudinal direction of the driving support.

In the present embodiment, the driving force limiting member may have a height to reach an upper end of the coil in a height direction of the coil.

In the present embodiment, the driving force limiting member may have a height to pass beyond an upper end of the coil in a height direction of the coil.

In the present embodiment, the driving force providing unit may be provided as a plurality of driving force providing units, and the driving force limiting member may be disposed on at least one side of the plurality of driving force providing units.

In the present embodiment, the driving force providing unit may be provided as a plurality of driving force providing units, and the driving force limiting member may be disposed at two or more driving force providing units that are adjacent to each other among the plurality of driving force providing units.

In the present embodiment, the driving force providing unit may be provided as a plurality of driving force providing units, and the driving force limiting member may be provided as a plurality of driving force limiting members respectively corresponding to the plurality of driving force providing units.

In the present embodiment, the information output apparatus may include a movement unit or a movement part which is moved by the driving force provided by the driving force providing unit and transmits the driving force to the expression unit through the movement.

In the present embodiment, the movement unit or the movement part may be formed to perform angular movement or rotational movement in at least one direction.

Other aspects, features and advantages of the disclosure will become better understood through the accompanying drawings, the claims, and the detailed description.

In order to achieve the above object, an aspect of the present disclosure provides an information output apparatus including an expression unit moving in at least one direction to be detected by a user, a movement unit disposed at one side of the expression unit, formed to be rotatable in at least one direction, and rotated to move the expression unit in at least one direction, a driving force providing unit disposed at one side of the movement unit and configured to provide a driving force to the movement unit, and a driving force limiting member formed to reduce or restrict the driving force generated by the driving force providing unit from being transmitted in a direction that is different from a direction from the driving force providing unit to the expression unit.

In addition, the driving force providing may include a driving support formed to extend in one direction, and a coil formed to be wound around the driving support, wherein the driving force limiting member is disposed to overlap at least a portion of the coil.

In addition, the driving force limiting member may be formed to have a height in a longitudinal direction of the driving support.

In addition, the driving force limiting member may be formed to have a height up to a position at which at least a portion of the driving force limiting member overlaps the movement unit.

In addition, the movement unit may be formed to rotate in at least one direction by a magnetic field formed from the coil when an electric field is applied to the coil.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
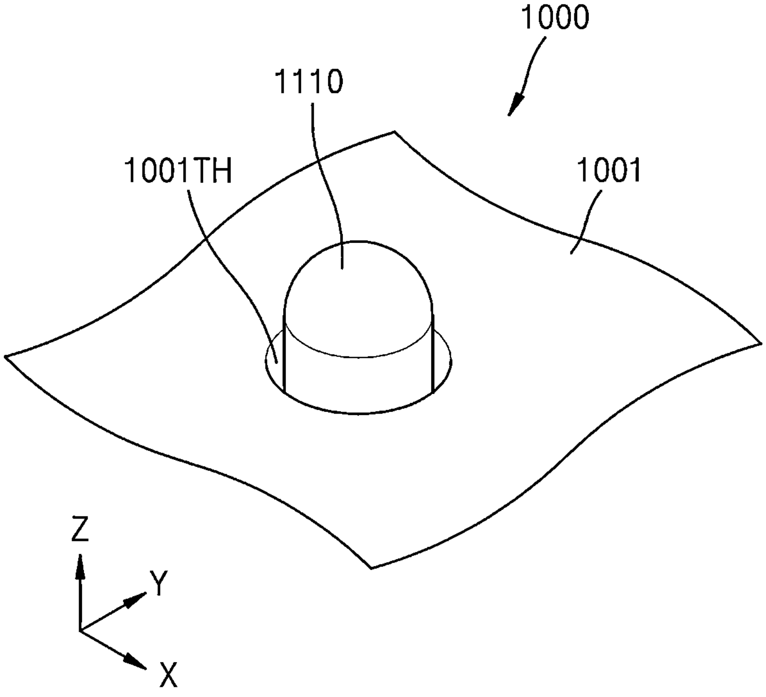
FIG. 1 is a schematic perspective view illustrating an information output apparatus according to an embodiment of the present disclosure.

Since the present disclosure can apply various transformations and have various embodiments, specific embodiments will be illustrated in the drawings and described in detail in the detailed description. Effects and features of the present disclosure, and methods for achieving them will become clear with reference to the embodiments described later in detail together with the drawings. However, the present disclosure is not limited to the embodiments disclosed below and may be implemented in various forms.

Hereinafter embodiments of the present disclosure will be described in detail with reference to the accompanying drawings, wherein like reference numerals refer to the same or corresponding components throughout the drawings, and a redundant description thereof will be omitted.

In the following embodiments, the terms first, second, and the like do not have limited meaning but are used for the purpose of distinguishing one component from another component.

In the following embodiments, the expressions used in the singular such as "a," "an," and "the" are intended to include the plural forms as well, unless the context clearly indicates otherwise.

In the following embodiments, it will be understood that the terms such as "including," "comprising," and "having" specify the presence of stated features or components, but do not preclude the presence or addition of one or more other features or components.

In the drawings, components may be exaggerated or reduced in size for convenience of description. For example, the sizes and thicknesses of the respective components shown in the drawings are arbitrarily shown for convenience of description, and thus one or more embodiments are not necessarily limited thereto.

In the following embodiments, an X-axis, a Y-axis, and a Z-axis are not limited to three axes in a Cartesian coordinate system, but may be interpreted in a broad sense including the three axes. For example, the X-axis, Y-axis, and Z-axis may be orthogonal to each other, but may also refer to different directions that are not orthogonal to each other.

When a certain embodiment may be implemented differently, a specific process order may be performed differently from the described order. For example, two consecutively described processes may be performed substantially at the same time or performed in an order opposite to the described order.

Figure 2:
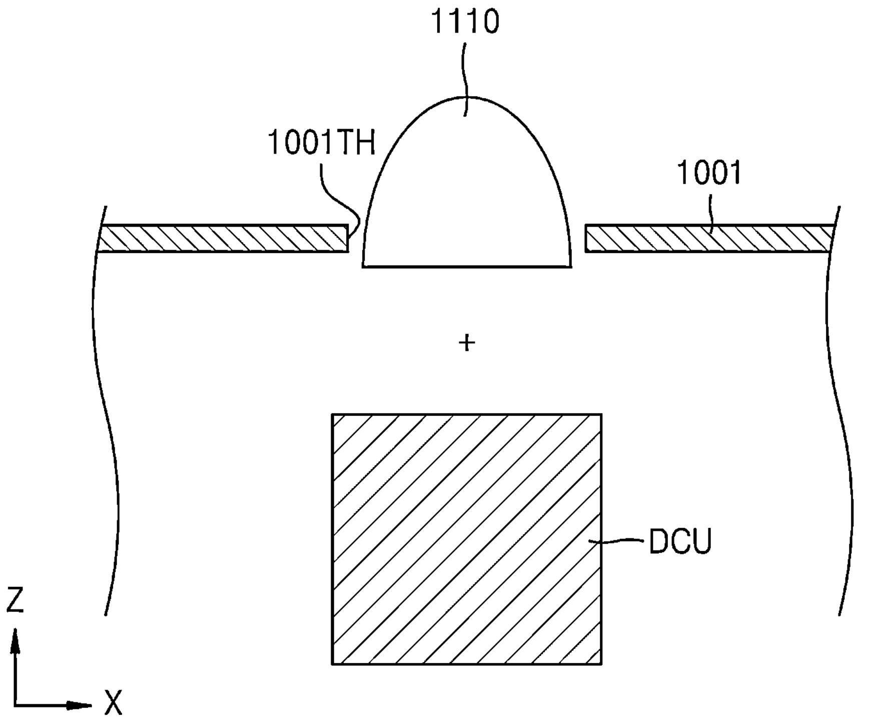
FIG. 2 is a schematic view for describing the information output apparatus of FIG. 1.

FIG. 1 is a schematic perspective view illustrating an information output apparatus 1000 according to an embodiment of the present disclosure FIG. 2 is a schematic view for describing the information output apparatus 1000 of FIG. 1.

Referring to FIGS. 1 and 2, the information output apparatus 1000 of the present embodiment may include an expression unit 1110 and a driving force providing unit DCU.

The expression unit 1110 may be formed to be movable in at least one direction (for example, a Z-axis direction in FIG. 1) and may be formed and disposed to be lifted and lowered in one direction (for example, the Z-axis direction in FIG. 1).

The driving force providing unit DCU may be formed to provide a driving force to the expression unit 1110 such that the expression unit 1110 performs, for example, upward or downward movement.

As a specific example, the expression unit 1110 may be exposed through an opening 1001TH of an upper surface of a housing 1001 and thus may be disposed to have a shape that protrudes when lifted.

A user may detect the expression unit 1110 through the upward movement and the downward movement of the expression unit 1110. For example, the user may detect an expression surface 1111 of the expression unit 1110 by using the sense of touch, and thus an information interaction such as information detection or information input of the user may be performed. As an alternative embodiment, detection of the expression unit 1110 is not limited to the sense of touch and may also be visual detection.

As an alternative embodiment, the information output apparatus 1000 of the present embodiment may include a plurality of expression units 1110. In addition, the information output apparatus 1000 may additionally include a plurality of driving force providing units DCU respectively corresponding to the plurality of expression units 1110.

Although not shown in FIGS. 1 and 2, as an alternative embodiment, a driving unit (or a driver) may be further disposed, and the driving unit may be formed to transmit a driving force generated from the driving force providing unit DCU to the expression unit 1110 and may be formed to move in at least one direction.

Figure 3:
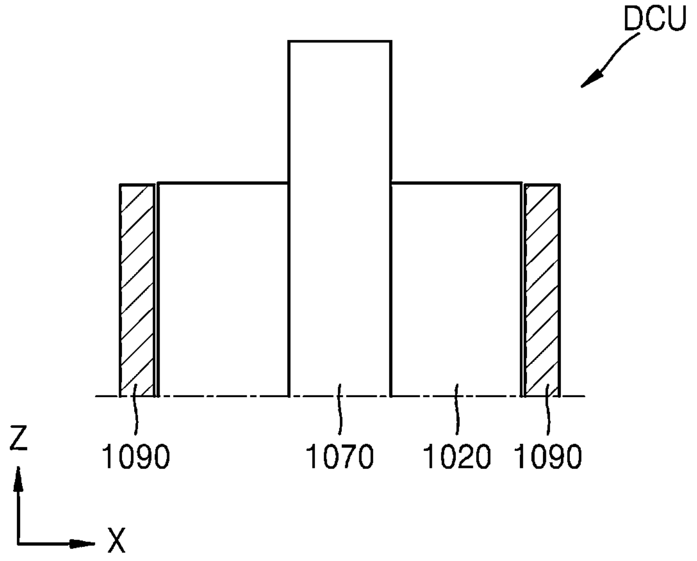
FIG. 3 is a cross-sectional view illustrating an embodiment of a driving force providing unit of the information output apparatus of FIGS. 1 and 2.

FIG. 3 is a cross-sectional view illustrating an embodiment of the driving force providing unit DCU of the information output apparatus of FIGS. 1 and 2.

The driving force providing unit DCU may include a coil 1020, and as an example, and the coil 1020 may be disposed around a driving support 1070. As a specific example, the coil 1020 may have a shape wound around the driving support 1070.

When an electric field is applied to the coil 1020, a current may flow in the coil 1020, and a magnetic field may be formed around the coil 1020. Through such a magnetic field, a driving force may be provided such that the expression unit 1110 is lifted to protrude or performs downward movement to the contrary.

The driving support 1070 includes an elongated area and may be disposed to pass through the coil 1020.

The driving support 1070 may be made of various materials and may also be made of a lightweight and durable plastic material.

As an example, the driving support 1070 may include metal.

As an alternative embodiment, the driving support 1070 may include a magnetic material, and as a specific example, the entirety thereof or one area of an upper end portion thereof may include a magnetic material. Thus, when a magnetic field is generated through the coil 1020, a magnitude of the magnetic field may be increased, and the magnetic field may be efficiently generated, thereby improving the efficiency of providing a driving force for the movement of the expression unit 1110.

As an example, the driving support 1070 may include iron. In addition, as another example, the driving support 1070 may include nickel or cobalt.

A driving force limiting member 1090 may be disposed on at least one side of the driving force providing unit DCU. For example, the driving force limiting member 1090 may be disposed at one side outside the coil 1020. As a specific example, the driving force limiting member 1090 may be disposed at each of both sides outside the coil 1020, and thus the coil 1020 may be disposed between the driving force limiting members 1090 disposed at both sides.

As an alternative embodiment, the driving force limiting member 1090 may be disposed to surround at least one area of an outer surface of the coil 1020.

In addition, as a specific example, the driving force limiting member 1090 may be formed to be elongated up to an upper end of the coil 1020 in a height direction of the coil 1020 so as to correspond thereto.

The driving force limiting member 1090 may reduce or block a driving force generated in the driving force providing unit DCU from being transmitted in one direction intersecting a direction from the driving force providing unit DCU to the expression unit 1110. Thus, the efficiency of transmitting a driving force from the driving force limiting member 1090 to the expression unit 1110 may be improved, and interference between members in adjacent areas may be reduced. As an alternative embodiment, when a plurality of driving force limiting members 1090 are disposed, the driving force limiting members 1090 may reduce or block the transmission or interference of a driving force in a direction toward each other, thereby improving the overall driving efficiency of the information output apparatus 1000, improving driving balance characteristics, and may improving a precise control ability.

In addition, in other words, the driving force providing unit DCU may use a magnetic field generated in the coil 1020. Such a magnetic field may be reduced or blocked from being transmitted to an adjacent side space, and a force of the magnetic field may be effectively directed in a direction from the coil 1020 to the expression unit 1110.

The driving force limiting member 1090 may reduce or prevent the magnetic field generated through the coil 1020 from interfering with or being interfered with by an adjacent space. For example, the interference of a magnetic field in a direction away from a side surface of the coil 1020 (X-axis direction in the drawing) may be reduced or shielded, and the directionality of the magnetic field toward the expression unit 1110 may be enhanced, thereby precisely controlling the movement of the expression unit 1110 and improving the efficiency of the movement. Thus, when another member adjacent to one driving force providing unit DCU, for example, another driving force providing unit DCU, is disposed, abnormal magnetic field interference therebetween may be reduced.

The driving force limiting member 1090 may be made of various materials and may contain, for example, a metallic material.

The driving force limiting member 1090 may be made of a material that affects a magnetic field generated in the coil 1020 and may contain, for example, a magnetic material. As a specific example, the driving force limiting member 1090 may contain iron, nickel, cobalt, and various other magnetic materials.

Figure 4:
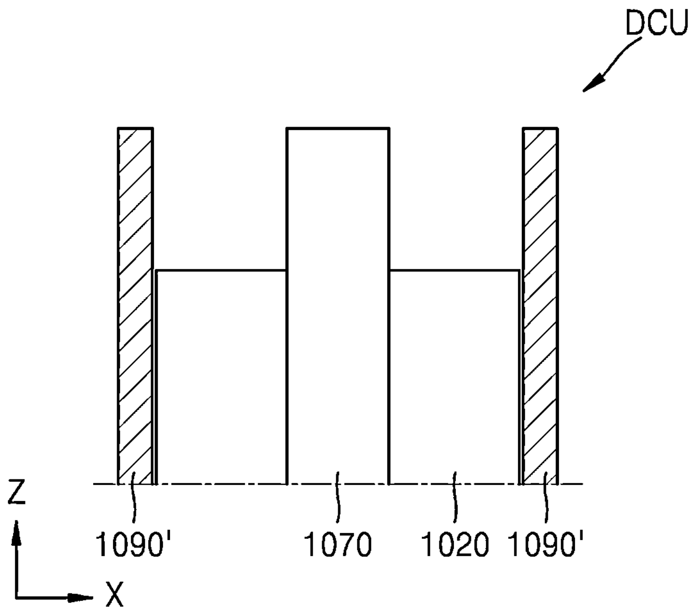
FIG. 4 is a view illustrating a modified example of FIG. 3.

FIG. 4 is a view illustrating a modified example of FIG. 3.

Referring to FIG. 4, a driving force limiting member 1090' may have a shape that extends longer than the driving force limiting member 1090 of FIG. 3. For example, the driving force limiting member 1090' may be formed to pass beyond an upper end of the coil 1020 in a height direction. As a specific example, the driving force limiting member 1090' may be formed up to an upper end of the driving support 1070 in the height direction to correspond thereto. The driving force limiting member 1090' may be formed to be elongated to pass beyond the coil 1020, thereby increasing an effect of reducing or preventing a magnetic field generated through the coil 1020 from interfering with or being interfered with by an adjacent space. In addition, the directionality of the magnetic field toward the expression unit may be enhanced, thereby precisely controlling the movement of the expression unit 1110, improving the efficiency of the movement, and improving a movement speed of the expression unit 1110.

Figure 5:
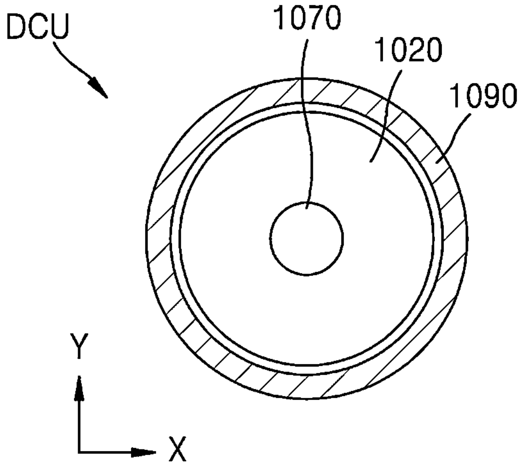
FIG. 5 is an exemplary plan view of the driving force providing unit of FIG. 3 viewed in one direction.

FIG. 5 is an exemplary plan view of the driving force providing unit DCU of FIG. 3 viewed in one direction.

For example, FIG. 5 is a plan view of FIG. 3. Referring to FIG. 5, the driving force limiting member 1090 may have a shape surrounding the coil 1020 and may have a hollow pillar shape, for a specific example, a hollow cylindrical shape.

In FIG. 5, the driving force limiting member 1090 and the coil 1020 are illustrated as being spaced apart from each other, but if necessary, according to design conditions, the driving force limiting member 1090 may also have an area in contact with the coil 1020.

Figure 6:
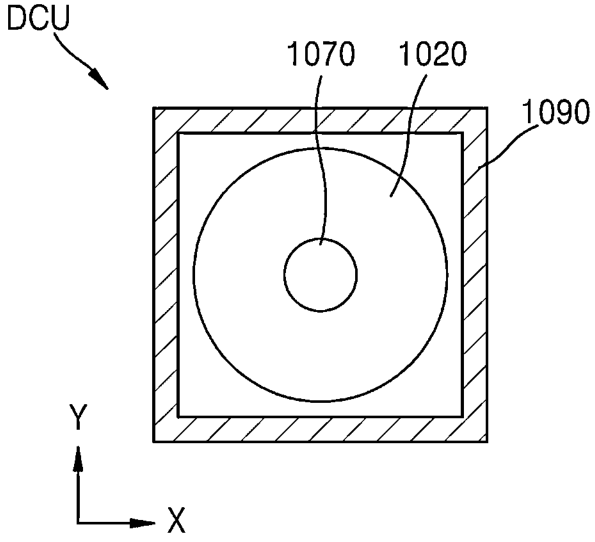
FIG. 6 is a view illustrating a modified example of FIG. 5.

FIG. 6 is a view illustrating a modified example of FIG. 5.

Referring to FIG. 6, the driving force limiting member 1090 may have a shape surrounding the coil 1020 and may have a hollow pillar shape, for example, a hollow quadrangular pillar shape. Although not shown, the driving force limiting member 1090 may have various pillar shapes or may have a hollow pillar shape with various polygonal bottom shapes.

Figure 7:
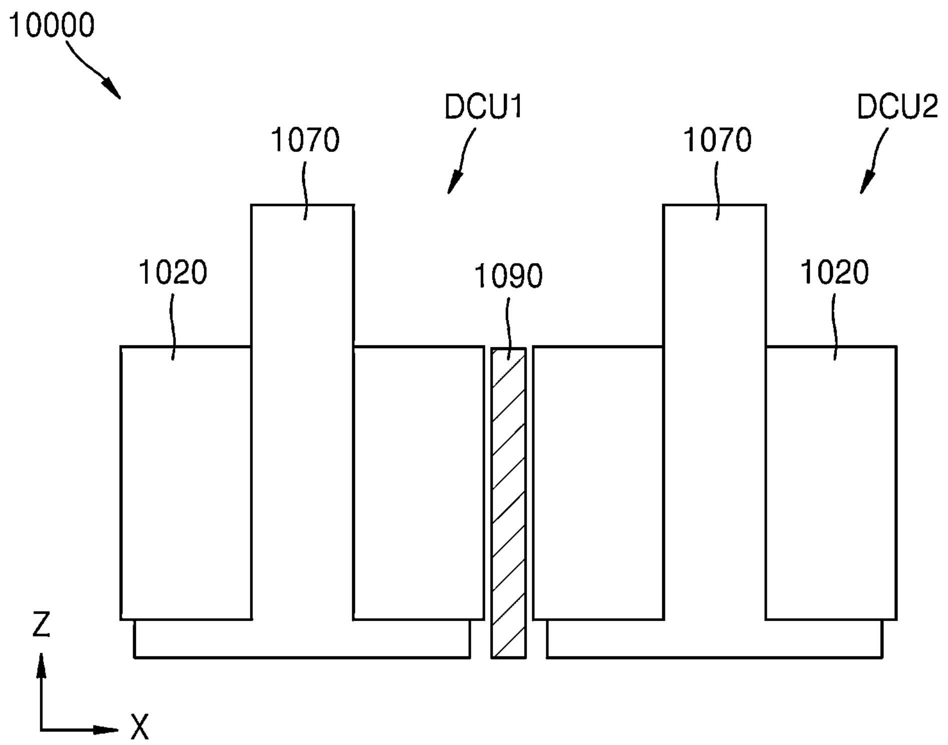
FIG. 7 is a schematic view illustrating an information output apparatus according to another embodiment of the present disclosure.

FIG. 7 is a schematic view illustrating an information output apparatus 10000 according to another embodiment of the present disclosure Referring to FIG. 7, the information output apparatus 10000 may include a plurality of driving force providing units, for example, a first driving force providing unit DCU1 and a second driving force providing unit DCU2.

Although an expression unit is not shown for convenience of description, a plurality of expression units may be disposed to respectively correspond to the first driving force providing unit DCU1 and the second driving force providing unit DCU2, and the plurality of expression units, for example, two expression units (not shown), may move by respectively receiving driving forces from the first driving force providing unit DCU1 and the second driving force providing unit DCU2.

The first driving force providing unit DCU1 and the second driving force providing unit DCU2 may each include a coil 1020, and the coil 1020 may be disposed around a driving support 1070. As a specific example, the coil 1020 may have a shape wound around the driving support 1070.

A driving force limiting member 1090 may be disposed between the first driving force providing unit DCU1 and the second driving force providing unit DCU2. For example, the driving force limiting member 1090 may be disposed between the coil 1020 of the first driving force providing unit DCU1 and the coil 1020 of the second driving force providing unit DCU2.

Figure 8:
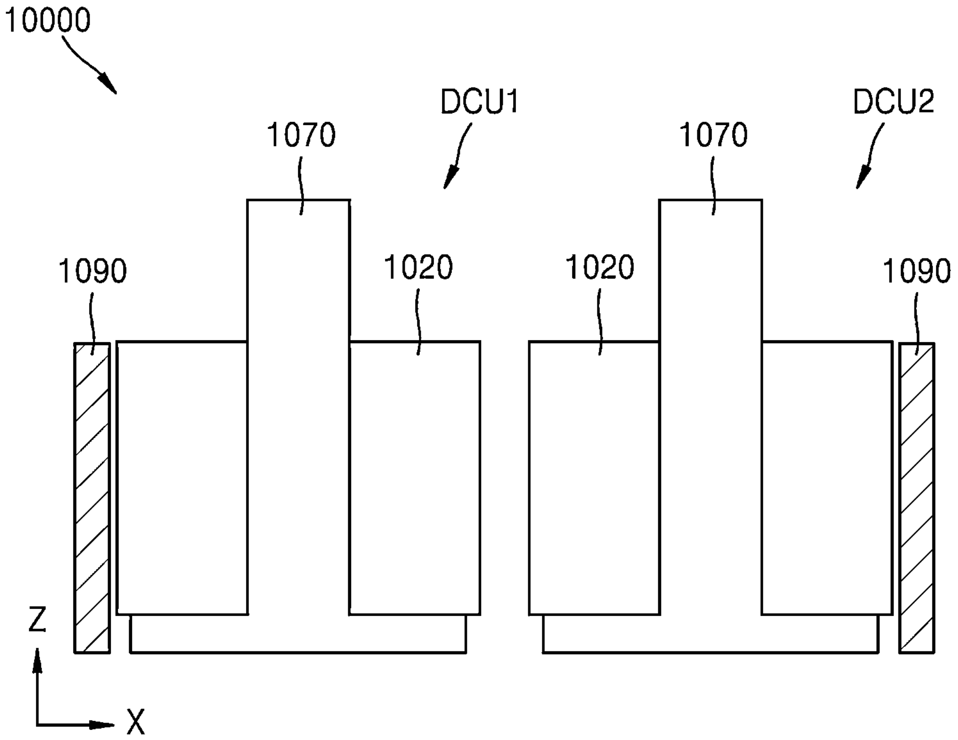
FIG. 8 is a schematic view illustrating an information output apparatus according to another embodiment of the present disclosure.

FIG. 8 is a schematic view illustrating an information output apparatus 10000 according to another embodiment of the present disclosure Descriptions will be provided based on the points that differ from FIG. 7.

Referring to FIG. 8, the information output apparatus 10000 may include a plurality of driving force providing units, for example, a first driving force providing unit DCU1 and a second driving force providing unit DCU2.

A driving force limiting member 1090 may be disposed at each of one side of the first driving force providing unit DCU1 and one side of the second driving force providing unit DCU2. For example, the driving force limiting member 1090 may be disposed between a coil 1020 of the first driving force providing unit DCU1 and a coil 1020 of the second driving force providing unit DCU2.

The coil 1020 of the first driving force providing unit DCU1 and the coil 1020 of the second driving force providing unit DCU2 may be disposed between the driving force limiting members 1090 at both sides.

Figure 9:
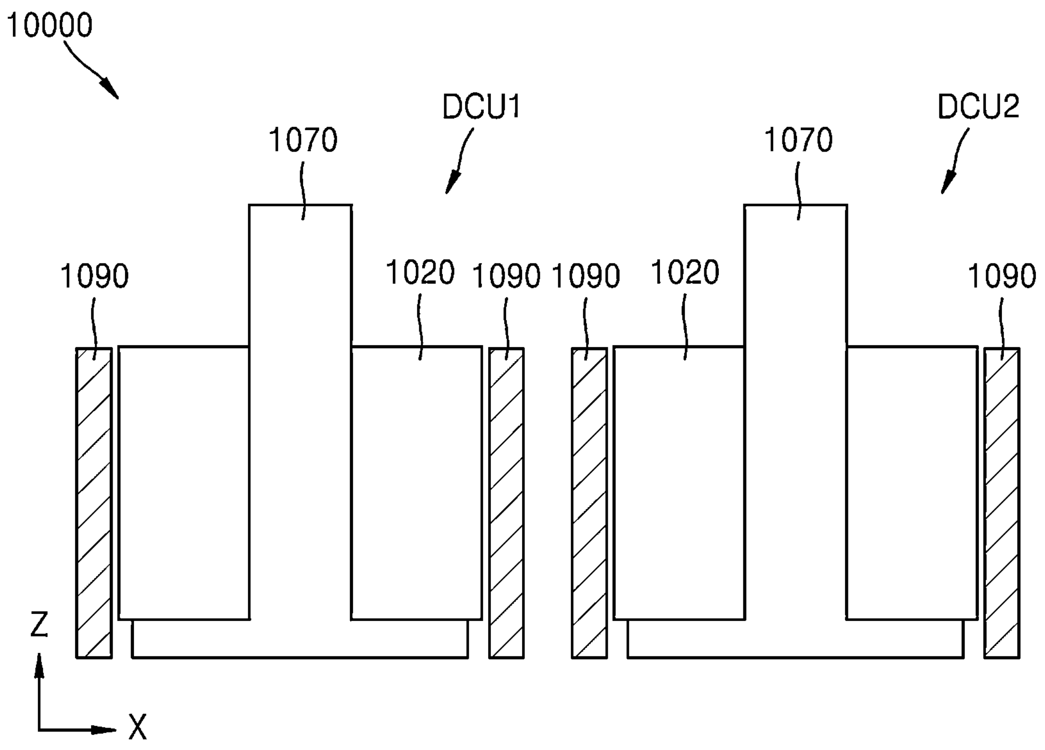
FIG. 9 is a schematic view illustrating an information output apparatus according to another embodiment of the present disclosure.

FIG. 9 is a schematic view illustrating an information output apparatus 10000 according to another embodiment of the present disclosure Descriptions will be provided based on the points that differ from FIG. 7.

Referring to FIG. 9, the information output apparatus 10000 may include a plurality of driving force providing units, for example, a first driving force providing unit DCU1 and a second driving force providing unit DCU2.

A driving force limiting member 1090 may be disposed on a side surface of the first driving force providing unit DCU1 and may be disposed to surround, for example, a coil 1020.

In addition, another driving force limiting member 1090 may be disposed on a side surface of the second driving force providing unit DCU2 and may be disposed to surround, for example, a coil 1020.

Figure 10:
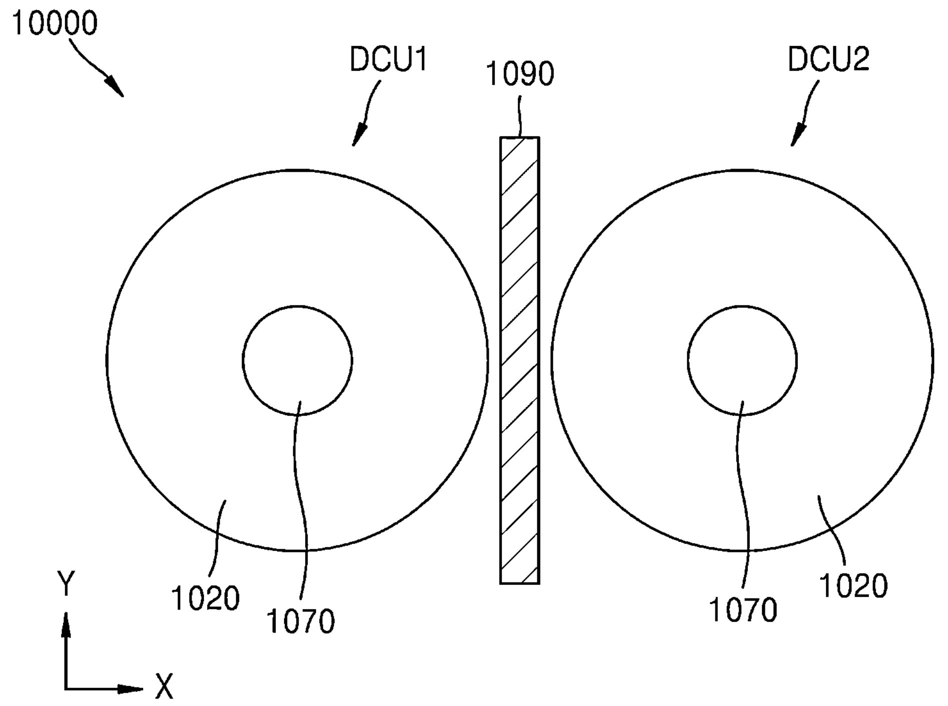
FIG. 10 is an exemplary plan view of FIG. 7 in one direction.

FIG. 10 is an exemplary plan view of FIG. 7 in one direction.

Referring to FIG. 10, the driving force limiting member 1090 may be disposed between the first driving force providing unit DCU1 and the second driving force providing unit DCU2 and may be disposed and formed to at least have a length corresponding to a width of each of the coil 1020 of the first driving force providing unit DCU1 and the coil 1020 of the second driving force providing unit DCU2 in one direction.

Figure 11:
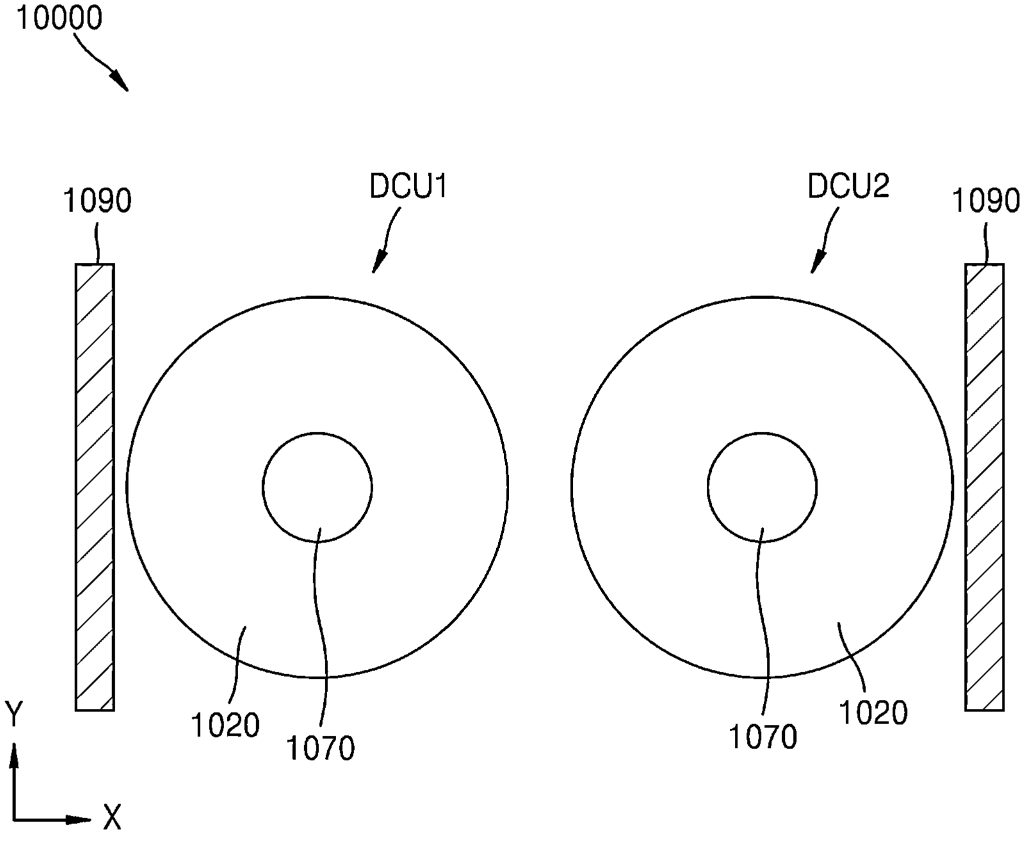
FIG. 11 is an exemplary plan view of FIG. 8 in one direction.

FIG. 11 is an exemplary plan view of FIG. 8 in one direction.

Referring to FIG. 11, the driving force limiting member 1090 may be disposed at each of both sides of the first driving force providing unit DCU1 and the second driving force providing unit DCU2, and for example, the first driving force providing unit DCU1 and the second driving force providing unit DCU2 may be disposed between the driving force limiting members 1090 at both sides. The driving force limiting members 1090 at both sides may be formed and disposed to each have a length corresponding to a width of each of the coil 1020 of the first driving force providing unit DCU1 and the coil 1020 of the second driving force providing unit DCU2 in one direction.

Although not shown, as an alternative embodiment, driving force limiting members 1090 may be respectively disposed at an upper side and a lower side to face ends of the driving force limiting members 1090 at both sides of FIG. 11. Thus, the driving force limiting members 1090 may be disposed on four side surfaces to surround the first driving force providing unit DCU1 and the second driving force providing unit DCU2.

Figure 12:
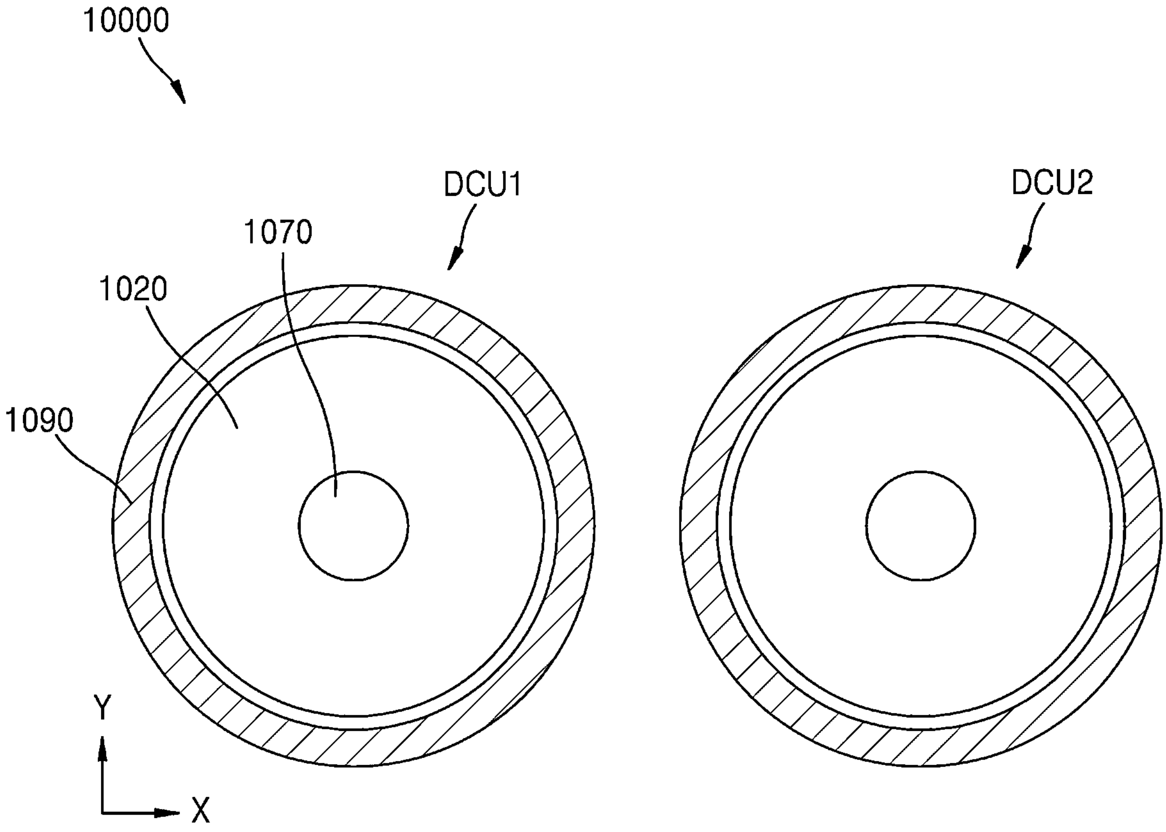
FIG. 12 is an exemplary plan view of FIG. 9 in one direction.

FIG. 12 is an exemplary plan view of FIG. 9 in one direction.

Referring to FIG. 12, one driving force limiting member 1090 may have a shape, for example, a hollow cylindrical shape, surrounding the coil 1020 of the first driving force providing unit DCU1, and another driving force limiting member 1090 may have a shape, for example, a hollow cylindrical shape, surrounding the coil 1020 of the second driving force providing unit DCU2.

Through the structures of the above-described embodiments, mutual magnetic field interference between the first driving force providing unit DCU1 and the second driving force providing unit DCU2 may be reduced, or magnetic field interference between the first and second driving force providing units DCU1 and DCU2 and other adjacent driving force providing units may be reduced, thereby improving a driving efficiency of the expression unit and improving a driving control ability.

Figure 13A:
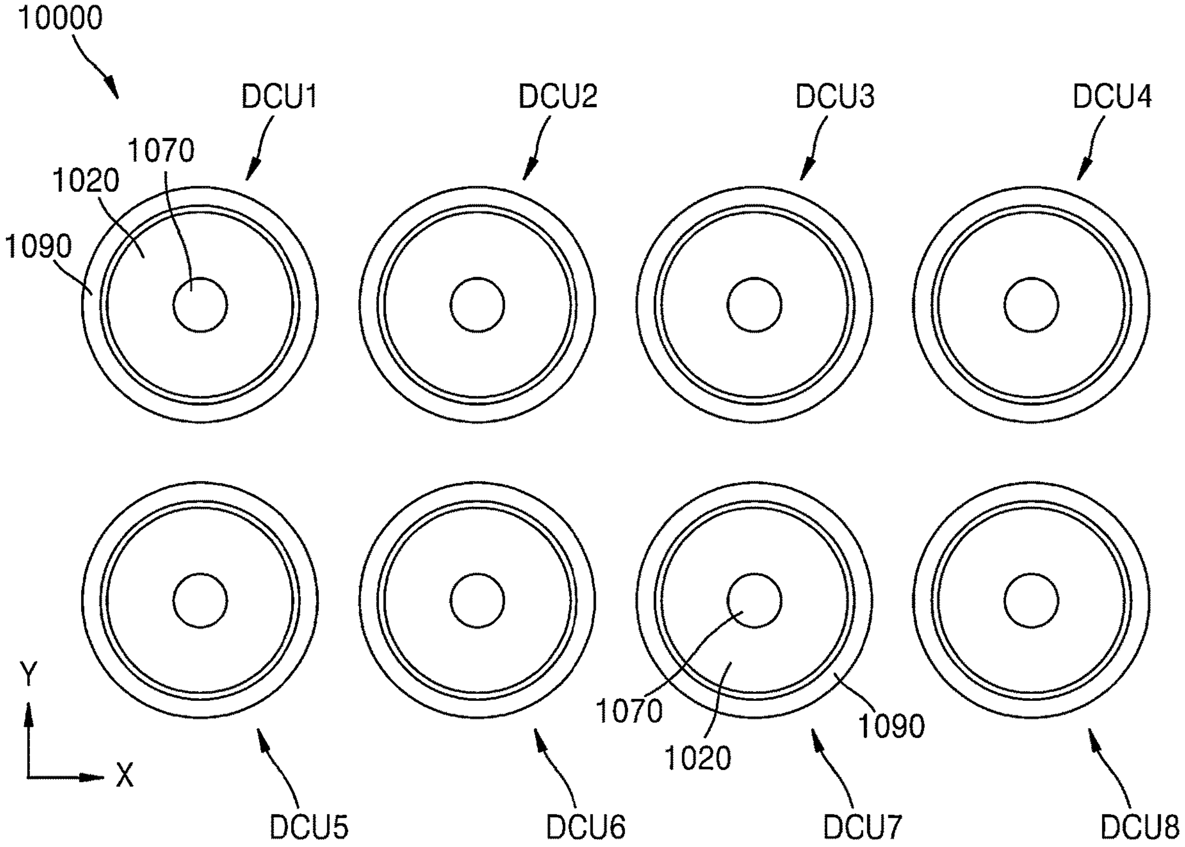
FIG. 13A is a schematic plan view illustrating an information output apparatus according to another embodiment of the present disclosure.

FIG. 13A is a schematic plan view illustrating an information output apparatus 10000 according to another embodiment of the present disclosure Referring to FIG. 13A, the information output apparatus 10000 may include eight driving force providing units, for example, a first driving force providing unit DCU1, a second driving force providing unit DCU2, a third driving force providing unit DCU3, a fourth driving force providing unit DCU4, a fifth driving force providing unit DCU5, a sixth driving force providing unit DCU6, a seventh driving force providing unit DCU 7, and an eighth driving force providing unit DCU8.

Although an expression unit is not shown for convenience of description, a plurality of expression units may be disposed to respectively correspond to the first to eighth driving force providing units DCU1 to DCU8, and the plurality of expression units, for example, eight expression units (not shown), may move by respectively receiving driving forces from the first to eighth driving force providing units DCU1 to DCU8.

The first to eighth driving force providing units DCU1 to DCU8 may each include a sphere coil 1020. As an example, the coil 1020 may be disposed around a driving support 1070. As a specific example, the coil 1020 may have a shape wound around the driving support 1070.

As an example, driving force limiting members 1090 may be disposed to respectively correspond to the first to eighth driving force providing units DCU1 to DCU8. As a specific example, the driving force limiting member 1090 may be disposed to have a shape surrounding the coil 1020 of each of the first to eighth driving force providing units DCU1 to DCU8.

Figure 13B:
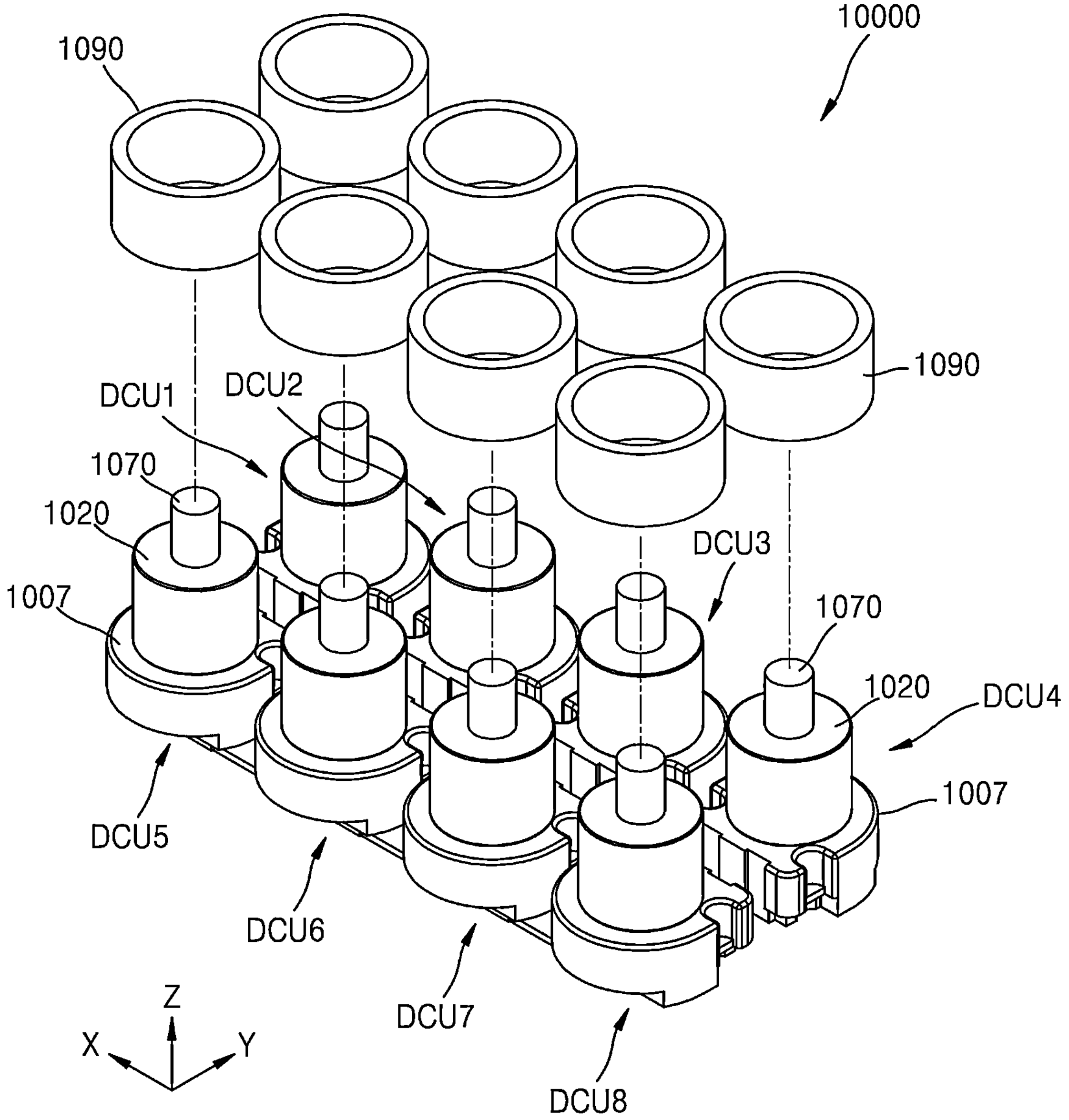
FIG. 13B is an exemplary perspective view of the information output apparatus of FIG. 13A viewed in one direction.

FIG. 13B is an exemplary perspective view of the information output apparatus 10000 of FIG. 13A viewed in one direction.

Referring to FIG. 13B, in the information output apparatus 10000, eight driving force limiting members 1090 are illustrated as respectively corresponding the first to eighth driving force providing units DCU1 to DCU8, and for example, the eight driving force limiting members 1090 having a hollow cylindrical shape are illustrated as respectively surrounding the coils 1020 of the first to eighth driving force providing units DCU1 to DCU8.

As an alternative embodiment, each of the first to eighth driving force providing units DCU1 to DCU8 may include a support 1007. The support 1007 may be formed to support the driving support 1070 and may be formed to additionally support the coil 1020. As an alternative embodiment, a terminal (not shown) may be formed in one area of the support 1007, for example, a bottom area, and may be disposed to be connected to the coil 1020.

The driving force limiting member 1090 may be disposed on the support 1007, and as an example, the driving force limiting member 1090 may also be disposed on an upper surface of the support 1007 to be supported by one area of the support 1007.

The driving force limiting member 1090 may be formed to reach an upper end of the coil 1020 in a height direction of the coil 1020. As another example, the driving force limiting member 1090 may optionally have the same shape as the above-described driving force limiting member 1090' of FIG. 4. In addition, as another example, the driving force limiting member 1090 may be formed slightly below the upper end of the coil 1020 in the height direction.

Figure 14A:
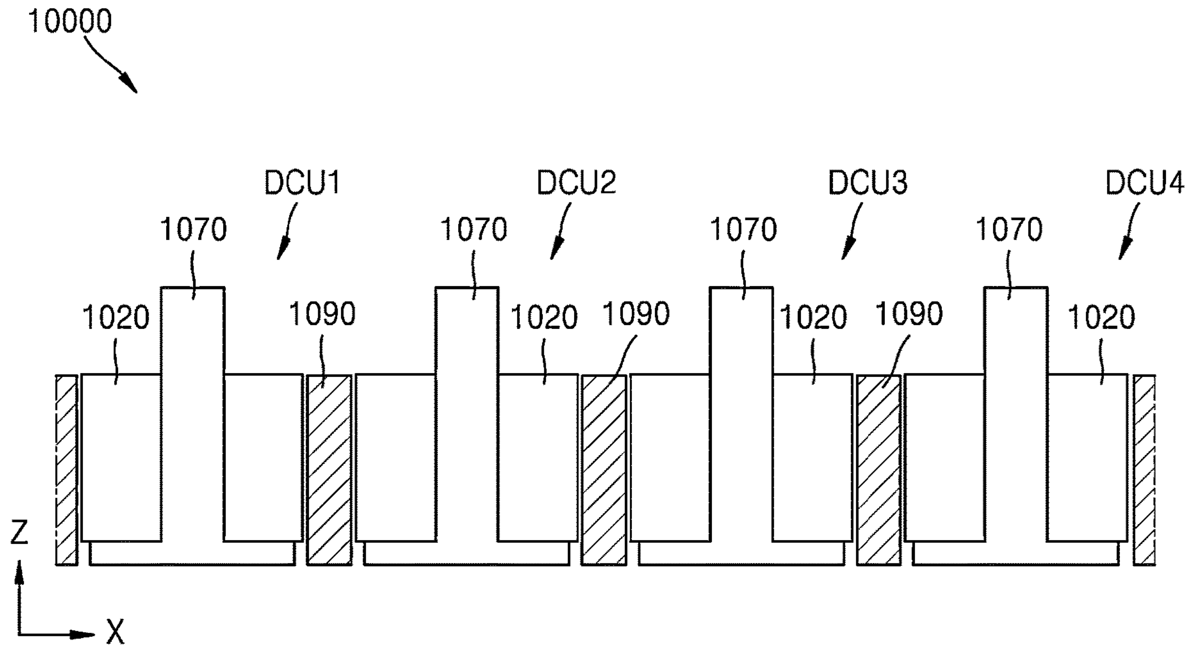
FIG. 14A is a schematic view illustrating an information output apparatus according to another embodiment of the present disclosure.

FIG. 14A is a schematic view illustrating an information output apparatus 10000 according to another embodiment of the present disclosure Referring to FIG. 14A, the information output apparatus 10000 may include a plurality of driving force providing units, for example, first to fourth driving force providing units DCU1 to DCU4. For convenience of description, descriptions will be provided based on the points that differ from the above-described embodiments.

A driving force limiting member 1090 may be integrally formed and disposed between adjacent driving force providing units, for example, between the first driving force providing unit DCU1 and the second driving force providing unit DCU2. In addition, the driving force limiting member 1090 may also be integrally disposed between the second driving force providing unit DCU2 and the second driving force providing unit DCU3 and between the third driving force providing unit DCU3 and the fourth driving force providing unit DCU4. In addition, the driving force limiting member 1090 may be disposed outside each of the first driving force providing unit DCU1 and the second driving force providing unit DCU2 which are disposed at edges, thereby reducing or preventing a magnetic field from diffusing to the outside.

Figure 14B:
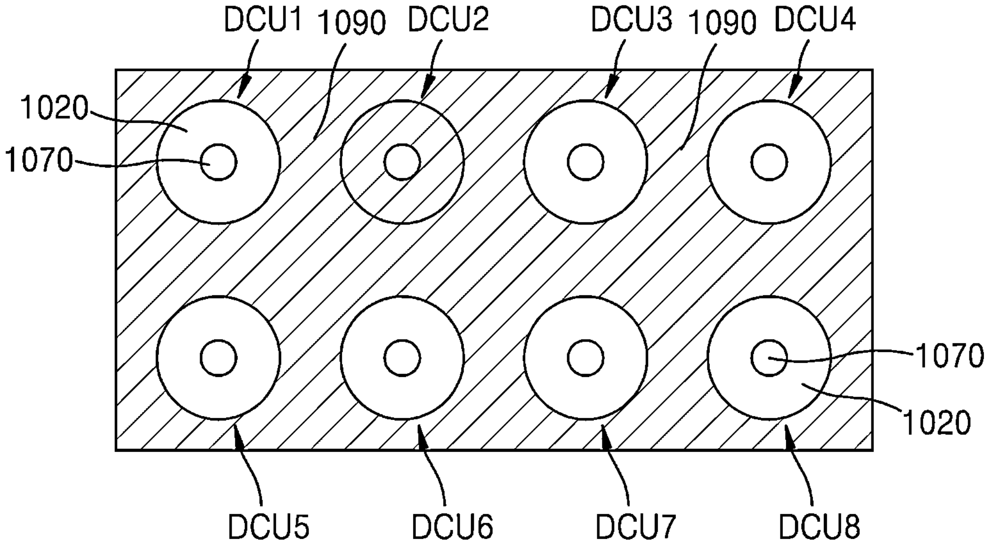
FIG. 14B is an exemplary plan view of the information output apparatus of FIG. 14A viewed in one direction.

FIG. 14B is an exemplary plan view of the information output apparatus 10000 of FIG. 14A viewed in one direction.

Referring to FIG. 14B, the information output apparatus 10000 may include the plurality of driving force providing units, for example, first to eighth driving force providing units DCU1 to DCU8. For convenience of description, descriptions will be provided based on the points that differ from the above-described embodiments.

The driving force limiting member 1090 may be integrally formed to correspond to the first to eighth driving force providing units DCU1 to DCU8.

For example, the driving force limiting member 1090 may have a shape having at least eight openings, for a specific example, a shape similar to a shape in which eight openings are formed in a widely formed plate. The driving force limiting member 1090 may have a shape in which coils 1020 of the first to eighth driving force providing units DCU1 to DCU8 are correspondingly inserted into the openings.

Although not shown, the number and shape of the openings formed in the driving force limiting member 1090 may be determined in various ways. For example, a plurality of more than nine openings may be formed in a wider plate shape.

The driving force limiting member 1090 may be integrally formed to correspond to the plurality of driving force providing units, thereby improving convenience in manufacturing the driving force limiting member 1090 and effectively reducing or preventing magnetic field interference in a space adjacent to each driving force providing unit or easily reducing or preventing a magnetic field from abnormally diffusing to a side surface.

Figure 15:
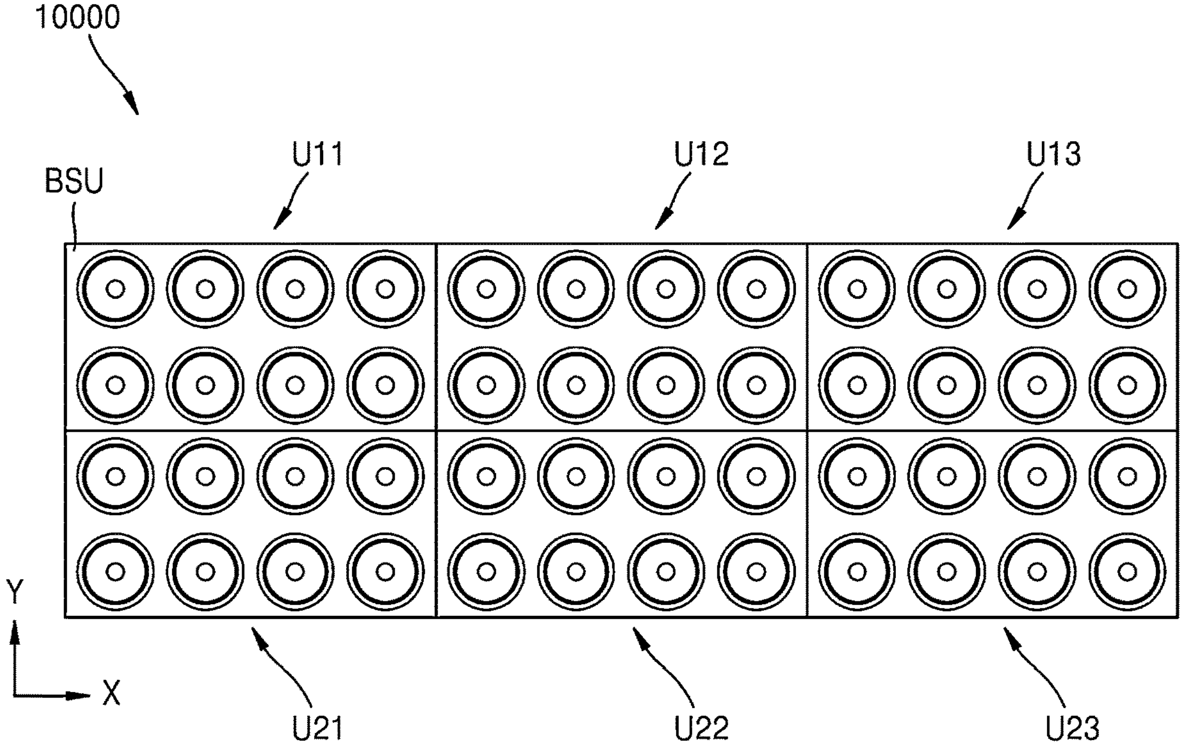
FIG. 15 is a schematic plan view illustrating an information output apparatus according to another embodiment of the present disclosure.

FIG. 15 is a schematic plan view illustrating an information output apparatus 10000 according to another embodiment of the present disclosure Referring to FIG. 15, the information output apparatus 10000 may include a plurality of information output modules, for example, six information output modules U11, U12, U13, U21, U22, and U23 arranged in one direction (X-axis direction in FIG. 15) and one direction (Y-axis direction in FIG. 15) intersecting the one direction.

In addition, although not shown, the number of information output modules arranged in one direction (X-axis direction in FIG. 15) and one direction (Y-axis direction in FIG. 15) intersecting the one direction may be determined in various ways.

As an alternative embodiment, the six information output modules U11, U12, U13, U21, U22, and U23 may be respectively disposed in base units BSU, and the base units BSU may be formed to be distinguished from adjacent base units BSU and may be formed to be coupled to or separated from each other as needed.

The six information output modules U11, U12, U13, U21, U22, and U23 may each include a plurality of driving force providing units, for example, eight driving force providing units including first to eighth driving force providing units DCU1 to DCU8, and may include eight driving force limiting members 1090 respectively corresponding to the eight driving force providing units. As a specific example, the structure of FIG. 13A or 13B may be applied.

In addition, although not shown, the six information output modules U11, U12, U13, U21, U22, and U23 may each include eight expression units respectively corresponding to the driving force providing units, for example, the eight driving force providing units including the first to eighth driving force providing units DCU1 to DCU8.

Thus, the eight expression units of each of the six information output modules U11, U12, U13, U21, U22, and U23 may be operated selectively or simultaneously to express one or more pieces of information, and the six information output modules U11, U12, U13, U21, U22, and U23 may be entirely controlled to control a plurality of expression units over a large area and quickly provide complex and various pieces of information to a user. As an alternative embodiment, an input may also be detected through a finger of a user or the like.

In addition, although not shown, the above-described driving force limiting unit of FIG. 14A or 14B may be applied when an information output apparatus including the plurality of information output modules of FIG. 15 is implemented. For example, in the case of FIG. 15, six driving force limiting units of FIG. 14B may be applied.

In addition, as an alternative embodiment, a driving force limiting unit may be made larger and applied as two or three driving force limiting units, and as another example, one driving force limiting unit may be applied to correspond to six information output modules.

Figure 16A:
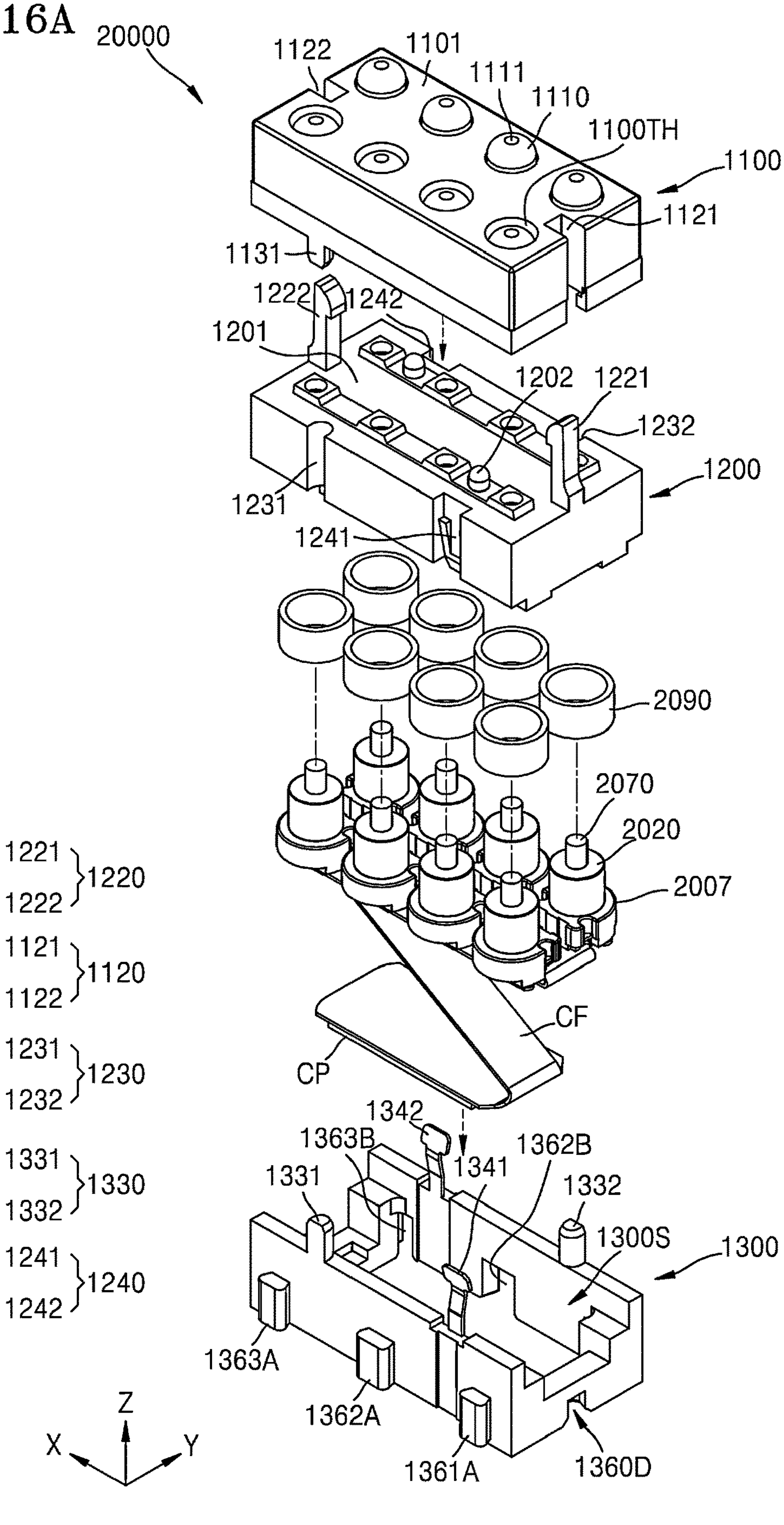
FIG. 16A is a schematic perspective view illustrating an information output apparatus according to another embodiment of the present disclosure.

FIG. 16A is a schematic perspective view illustrating an information output apparatus 20000 according to another embodiment of the present disclosure Referring to FIG. 16A, an information output apparatus 20000 may include eight driving force providing units similar to that described above with reference to FIG. 13B, each of the driving force providing units may include a coil 2020, and the coil 2020 may be disposed around a driving support 2070. As a specific example, the coil 2020 may have a shape wound around the driving support 2070.

In addition, eight driving force limiting members 2090 may be disposed to respectively correspond to the driving force providing units, for example, to surround the coils 2020.

For convenience of description, descriptions will be provided based on the points that differ from the above-described embodiments. In addition, unless otherwise stated, the structure of the present embodiment may be optionally applied to the above-described embodiments and embodiments to be described below.

The information output apparatus 20000 of the present embodiment may include an upper unit 1100, a lower unit 1200, and a base unit 1300.

The upper unit 1100, the lower unit 1200, and the base unit 1300 of the information output apparatus 20000 of the present embodiment may remain uncoupled. Thus, the convenience of management such as repair, replacement, or the like of the information output apparatus 20000 may be improved.

As an alternative embodiment, the upper unit 1100, the lower unit 1200, and the base unit 1300 of the information output apparatus 20000 may be coupled and uncoupled by using various methods, and without separate fastening or joining members being inserted between respective members, the upper unit 1100, the lower unit 1200, or the base unit 1300 may be easily uncoupled and separated by applying a bit of pressure or a force, for example, through a method of pushing or pulling at least one area.

The upper unit 1100 may be formed to accommodate one or more expression units 1110, and the expression unit 1110 may perform upward movement to protrude through an expression opening 1100TH formed in one area of an upper surface 1101 of the upper unit 1100 and may perform downward movement in a direction opposite to the upward movement. A user may detect the expression unit 1110 through the upward movement and the downward movement of the expression unit 1110. For example, the user may detect an expression surface 1111 of the expression unit 1110 by using the sense of touch, and thus an information interaction such as information detection or information input of the user may be performed. As an alternative embodiment, detection of the expression unit 1110 may also be visual detection.

As an alternative embodiment, the upper unit 1100 may accommodate a plurality of expression units 1110, for example, eight expression units 1110 which may be arranged to be distinguished from each other. The eight expression units 1110 may move individually or simultaneously to output or input various types of information.

The eight expression units 1110 may move by receiving a driving force from each driving force providing unit, and as described above, each driving force providing unit may include the coil 2020, for example, the coil 2020 wound around the driving support 2070. A driving force limiting member 2090 may be disposed to reduce each magnetic field interference and concentrate a magnetic field toward the expression unit 1110.

In addition, as an alternative embodiment, the driving force providing units may each include a support 2007. The support 2007 may be formed to support the driving support 2070 and may be formed to additionally support the coil 2020. As an alternative embodiment, a terminal (not shown) may be formed in one area of the support 2007, for example, a bottom area, and may be disposed to be connected to the coil 2020.

The lower unit 1200 may be formed to be connected to the upper unit 1100. In addition, the driving force providing unit may be disposed in the lower unit 1200, for example, eight driving supports 2070 and eight coils 2020 may be disposed, and the driving force limiting members 2090 may also be disposed. To this end, the lower unit 1200 may include an inner space in which the eight driving supports 2070, the eight coils 2020, and the driving force limiting members 2090 may be disposed.

The lower unit 1200 may include an upper surface 1201 facing the upper unit 1100, and the upper surface 1201 of the lower unit 1200 may correspond to a lower surface of the upper unit 1100. The lower surface of the upper unit 1100 may be opposite to an upper surface 1101 of the upper unit 1100.

As an alternative embodiment, the upper unit 1100 and the lower unit 1200 may be coupled by using a groove and an extension portion corresponding thereto.

For example, the upper unit 1100 may include a groove portion 1120, and a first groove 1121 and a second groove 1122 of the groove portion 1120 may correspond to a first extension portion 1221 and a second extension portion 1222 of an extension portion 1220 of the lower unit 1200. As an alternative embodiment, stepped portions may be formed in the first groove 1121 and the second groove 1122 of the groove portion 1120, locking portions may be formed in the first extension portion 1221 and the second extension portion 1222 of the extension portion 1220. Thus, after a force is applied to couple the stepped portion and the locking portion, a stable coupling force may be maintained, and when an enough force is applied to uncouple the stepped portion and the locking portion, conversely, the stepped portion and the locking portion may be easily uncoupled.

As an alternative embodiment, the upper unit 1100 may include an upper protrusion 1130 formed to face the lower unit 1200, and the upper protrusion 1130 may include a first upper protrusion member 1131 and a second upper protrusion member (not shown).

The lower unit 1200 may include a lower groove corresponding to the upper protrusion 1130, for a specific example, a first lower groove 1231 and a second lower groove 1232.

The first upper protrusion member 1131 and the second upper protrusion member (not shown) may respectively correspond to the first lower groove 1231 and the second lower groove 1232 and may have a fitted form. In this case, the first upper protrusion member 1131 and the second upper protrusion member (not shown) may be formed to be a shorter than the first lower groove 1231 and the second lower groove 1232, and thus a first base protrusion member 1331 and a second base protrusion member 1333 of the base unit 1300 may correspond to the remaining spaces of the first lower groove 1231 and the second lower groove 1232.

The lower unit 1200 may be connected to the base unit 1300. For example, the lower unit 1200 may be disposed between the upper unit 1100 and the base unit 1300. As a specific example, the lower unit 1200 may be connected to the upper unit 1100 and the base unit 1300, and as an alternative embodiment, the lower unit 1200 may be detachably coupled to the upper unit 1100 and the base unit 1300.

As an alternative embodiment, the base unit 1300 may include the base protrusion 1330 formed to face the lower unit 1200, and the base protrusion 1330 may include the first base protrusion member 1331 and the second base protrusion member 1332.

The first base protrusion member 1331 and the second lower groove 1232 of the base protrusion 1330 of the base unit 1300 may correspond to the first lower groove 1231 and the second lower groove 1232 of the lower groove 1230 of the lower unit 1200. For example, the first base protrusion member 1331 and the second lower groove 1232 may be correspondingly disposed in a fitted form.

As an alternative embodiment, the base unit 1300 may include a base extension portion 1340 formed to face the lower unit 1200, and a lower counterpart 1240 corresponding to the base extension portion 1340, for example, a first lower counterpart member 1241 and a second lower counterpart member 1242, may be formed on one surface of the lower unit 1200.

The first base extension member 1341 of the base extension portion 1340 may correspond to the first lower counterpart member 1241. The first base extension member 1341 may have elasticity to spread in a direction away from an outer surface of the base unit 1300 and thus may firmly correspond to the first lower counterpart member 1241.

Additionally, the first lower counterpart member 1241 may have the form of a groove, and a locking area such as a stepped area may be formed therein so that the first base extension member 1341 may be stably disposed therein.

The base unit 1300 may have a hollow shape to have a space 1300S at least therein. As an alternative embodiment, the base unit 1300 may have a shape with an open upper portion and an open lower portion.

At least a signal connector CF may be disposed in the space 1300S. The signal connector CF may be connected to the driving force providing unit accommodated in the lower unit 1200 and may be disposed to apply a signal, for example, to the coil 2020 around the driving support 2070.

As an alternative embodiment, the signal connector CF may include a flexible material and thus may be formed to be bendable or flexible.

As an alternative embodiment, the signal connector CF may be connected to a circuit controller CP. One or more signals may be applied to the driving force providing unit through the circuit controller CP.

The base unit 1300 may include one or more connection protrusion members 1363A, 1363B, and 1363C and one or more connection grooves 1360D, 1361B, 1362B, and 1363B.

The connection protrusion members 1363A, 1363B, and 1363C and the connection grooves 1360D, 1361B, 1362B, and 1363B of the base unit 1300 may be connected or coupled to the connection grooves 1360D, 1361B, 1362B, and 1363B and the connection protrusion members 1363A, 1363B, and 1363C of the base unit 1300 adjacent thereto in a corresponding form.

Figure 16B:
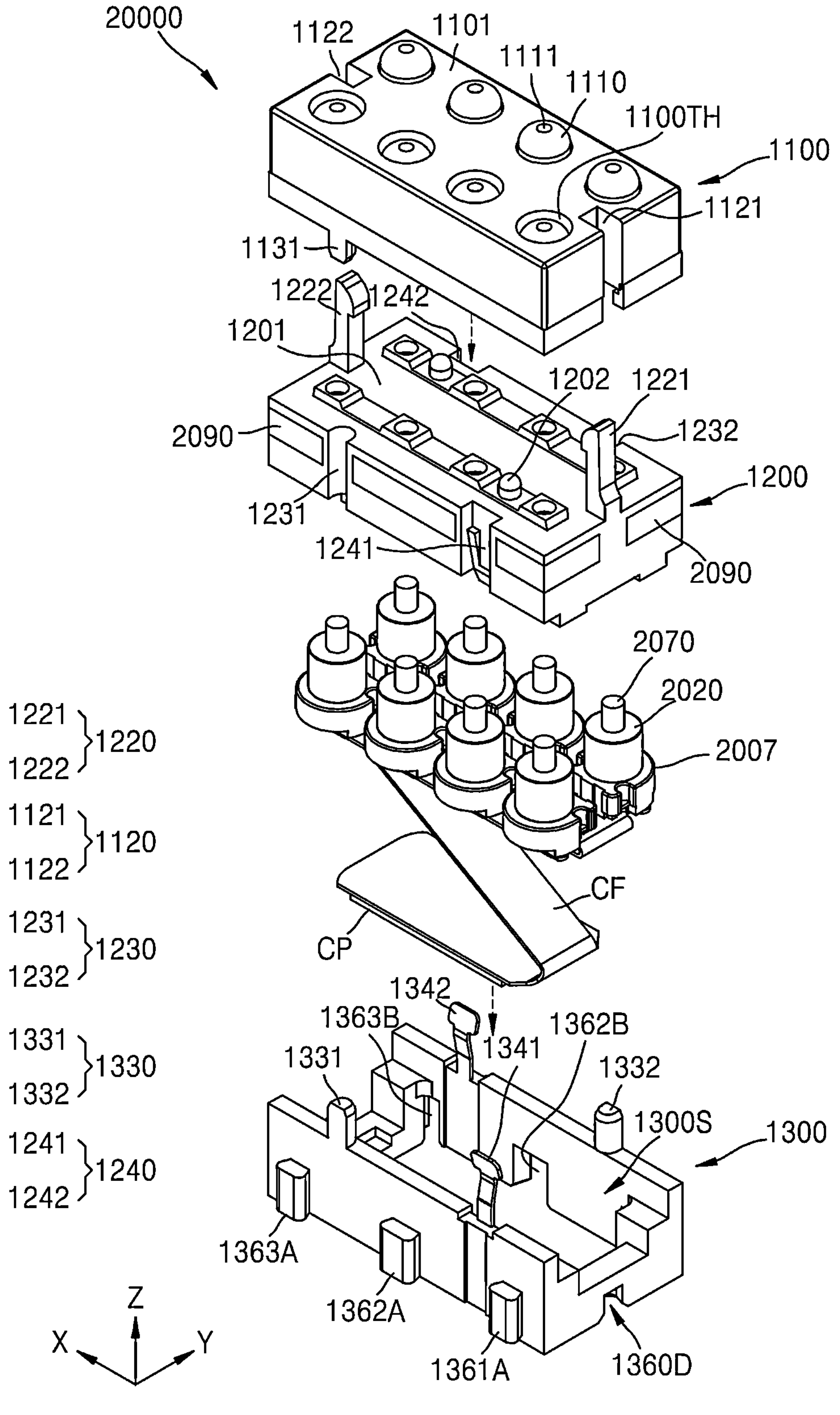
FIG. 16B is a view illustrating a modified example of FIG. 16A.

FIG. 16B is a view illustrating a modified example of FIG. 16A.

Figure 16C:
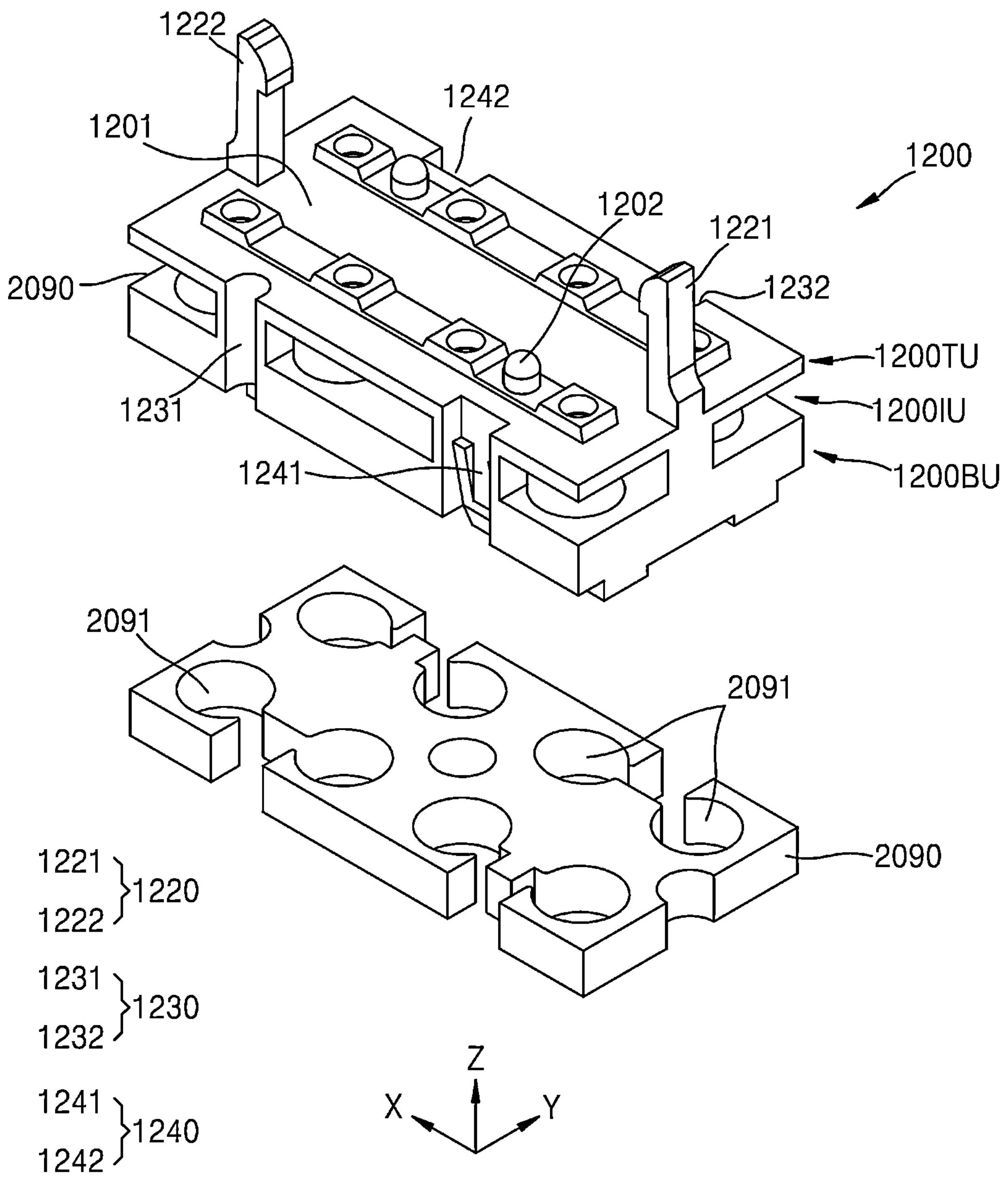
FIG. 16C is a view for describing a driving force limiting member of FIG. 16B.

FIG. 16C is a view for describing a driving force limiting member 2090 of FIG. 16B.

For convenience of description, descriptions will be provided based on the points that differ from FIG. 16A.

Referring to FIGS. 16B and 16C, the driving force limiting member 2090 may be disposed to correspond to a plurality of driving supports 2070 and a plurality of coils 2020, for example, eight driving supports 2070 and eight coils 2020.

Thus, the driving force limiting member 2090 may be integrally formed to correspond to the eight driving supports 2070 and the eight coils 2020. In addition, as an example, the integrally formed driving force limiting member 2090 may be disposed to correspond to one lower unit 1200.

The driving force limiting member 2090 may have a plate-like shape and may include a plurality of openings 2091, for example, eight openings 2091, to correspond to the eight driving supports 2070 and the eight coils 2020.

As an alternative embodiment, the driving force limiting member 2090 may be disposed to be connected in spaces between the eight driving supports 2070 and coils 2020 spaced apart from each other. In addition, as an example, the driving force limiting member 2090 may also be disposed in an area outside the eight driving supports 2070 and coils 2020. Thus, when a plurality of information output apparatuses are disposed, for example, even when a plurality of lower units 1200 are disposed and connected, by reducing or blocking the interference of a magnetic field generated from adjacent lower units 1200, the magnetic field may efficiently act to be directed from each lower unit 1200 to an expression unit, thereby improving driving efficiency and control characteristics.

The driving force limiting member 2090 may be disposed in the lower unit 1200 in various ways, for example, may also be coupled thereto.

As an example, the driving force limiting member 2090 may have a shape disposed on one surface of the lower unit 1200, and as a specific example, the driving force limiting member 2090 may have a shape connected to a lower surface of the lower unit 1200.

In addition, as another example, the driving force limiting member 2090 may have a shape coupled to the inside of the lower unit 1200. Specifically, as shown in FIG. 16C, the driving force limiting member 2090 may be fitted into a space area 1200IU between a bottom area 1200BU and a top area 1200TU of the lower unit 1200. such an arrangement may be performed in various ways, and a shape in which the lower unit 1200 and the driving force limiting member 2090 are combined may be implemented through an injection method using a molten material. In addition, after the lower unit 1200 and the driving force limiting member 2090 are separately prepared, the driving force limiting member 2090 may be fitted into the space area 1200IU of the lower unit 1200. In this case, as an alternative embodiment, the driving force limiting member 2090 may also be fitted after a member connecting the bottom area 1200BU and the top area 1200TU of the lower unit 1200 is temporarily removed or released.

Figure 17:
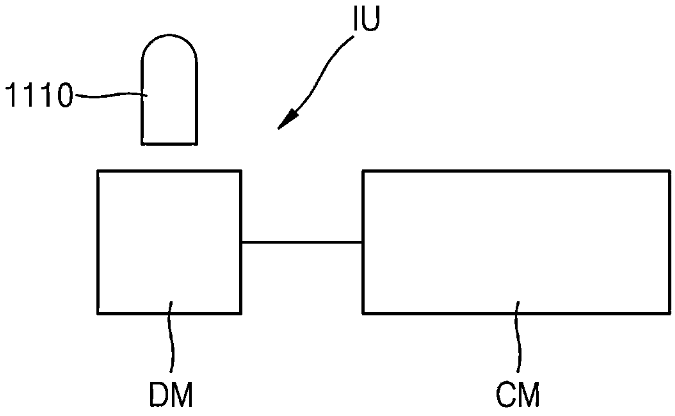
FIG. 17 is a view illustrating an example of describing driving force transmission of an information output apparatus according to an embodiment of the present disclosure.

FIG. 17 is a view illustrating an example of driving force transmission of an information output apparatus according to an embodiment of the present disclosure FIG. 17 illustrates a unit output unit IU which may correspond to one expression unit 1110. For example, the information output apparatus 10000 of FIG. 13A or 13B may be regarded to include eight unit output units IU.

Each unit output unit IU may include a driving force providing member DM positioned opposite to the expression unit 1110 and may be electrically connected to a control module CM.

The driving force providing member DM may operate according to a signal of the control module CM to generate a driving force and transmit the driving signal to the expression unit 1110, and various driving modules that cause the expression unit 1110 to reciprocate to protrude and retract may be applied.

Here, the driving force providing member DM may include the above-described driving force providing unit and driving force limiting member, and the control module CM may include a signal connector CF or a circuit controller CP.

Figure 18:
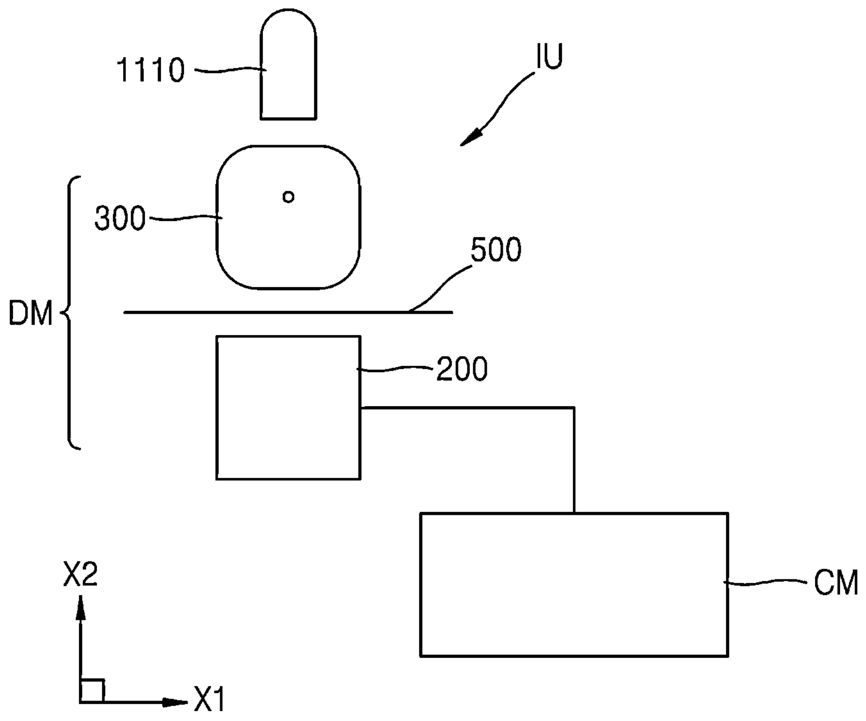
FIG. 18 is a view illustrating another example of describing driving force transmission of an information output apparatus according to an embodiment of the present disclosure.

FIG. 18 is a view illustrating another example of driving force transmission of an information output apparatus according to an embodiment of the present disclosure Referring to FIG. 18, a unit output unit IU according to an embodiment may include a driving unit 200, a movement unit 300, and an expression unit 1110.

The driving unit 200 may include the above-described driving force providing unit and driving force limiting member. In the driving unit 200, as an electrical signal is applied to the above-described coil 1020 from a control module CM, a magnetic field may be generated. The driving unit 200 may be provided to maintain a fixed state, for example, may be accommodated in the lower unit 1200 of the above-described embodiment and fixed to the lower unit 1200 even when a magnetic field is generated.

Here, the expression "electrically connected" does not necessarily mean a wired connection, but also means that an electrical signal may be transmitted through wireless communication, and includes a case in which another transmission medium is present therebetween. This may be applied equally to the embodiments of the present specification.

The movement unit 300 may be provided to move in response to the operation of the driving unit 200, more specifically, a magnetic field formed by a coil included in the driving unit 200. To this end, the movement unit 300 may include a magnetic material or magnet. According to an embodiment, the movement unit 300 may be provided to perform a rotational movement, and such rotational movement may consequently include movement in a direction from the driving unit 200 to the expression unit 1110. The movement unit 300 may move depending on the movement of the driving unit 200 and thus may not be electrically connected to the control module CM.

The expression unit 1110 may be driven by the movement unit 300 and may be lifted and lowered to move to protrude and retract through the above-described opening 100TH of the upper surface of the housing 1001 of FIG. 1 or the upper surface 1101 of the upper unit 1100 of FIG. 16A. According to one embodiment, the expression unit 1110 may be in contact with the movement unit 300. The expression unit 1110 may be coupled to the movement unit 300, but the present disclosure is not necessarily limited thereto. A transmission medium that transmits physical movement may be included between the movement unit 300 and the expression unit 1110.

According to embodiments of the present disclosure, the present disclosure is not necessarily limited thereto, and at least a portion of the expression unit 1110 may be separated from the movement unit 300. In this case, the expression unit 1110 may be in direct contact with the movement unit 300 or may perform upward or downward movement in conjunction with the movement of the movement unit 300 indirectly through a link mechanism (not shown) or a motion transmission mechanism (not shown) that is separate from the movement unit 300.

Optionally, when a position of the unit output unit IU is changed, such as being turned over, in a state in which power is not applied to the driving unit 200, in order to prevent the expression unit 1110 and/or the movement unit 300 from protruding to the outside of the upper surface 1101 of the upper unit 1100, a separate device (not shown) may be interposed between the expression unit 1110 and/or the movement unit 300 and the inside of the upper surface 1101 of the upper unit 1100. Such a device may be an elastic member, and when a magnetic force of the driving unit 200 exceeds an elastic force of the elastic member, the expression unit 1110 may protrude outward from the upper surface 1101. These embodiments may be applied to all embodiments in the present specification.

Meanwhile, a partition wall 500 may be interposed between the driving unit 200 and the movement unit 300, and the driving unit 200 and the movement unit 300 may be provided to be physically separated from each other. Since the driving unit 200 and the movement unit 300 are physically separated in this way, as an alternative embodiment, the driving unit 200 may be sealed from moisture to achieve a more improved waterproof structure, and also, even when the movement unit 300 is in an environment exposed to moisture, the environment may not affect the driving unit 200.

In the above-described embodiment, the partition wall 500 may correspond to a lower boundary of the upper unit 1100 or an upper boundary of the lower unit 1200.

Figure 19:
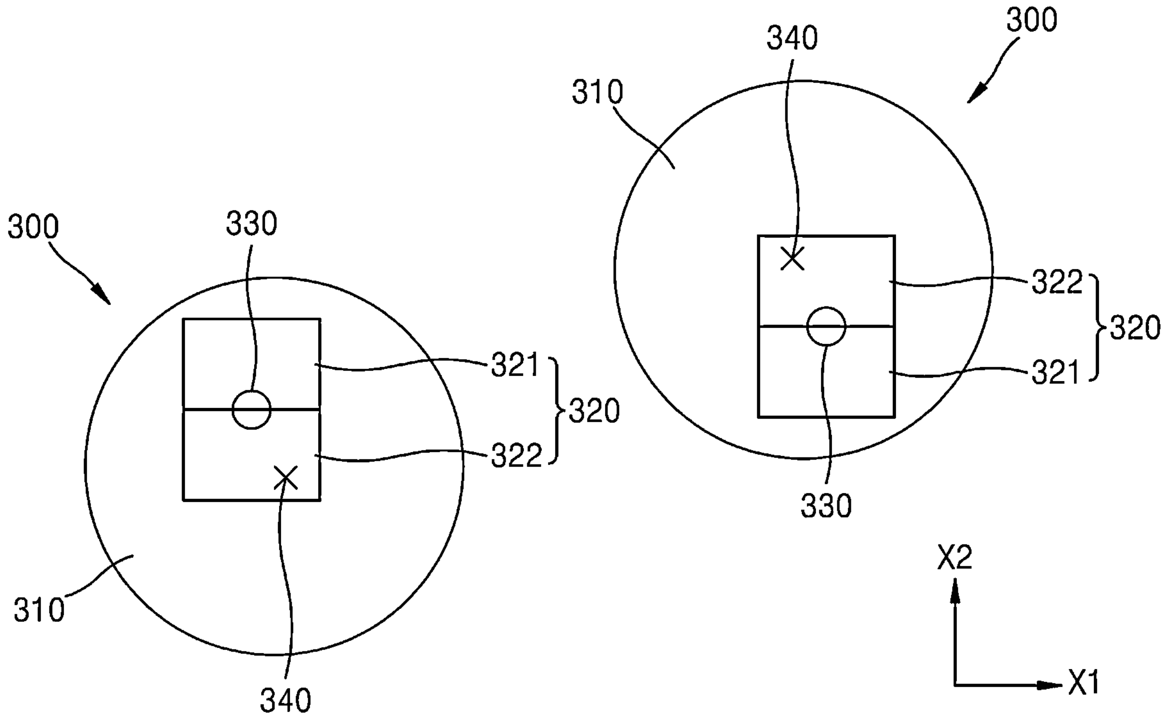
FIG. 19 shows views illustrating an example of a movement unit of FIG. 18.
Figure 20:
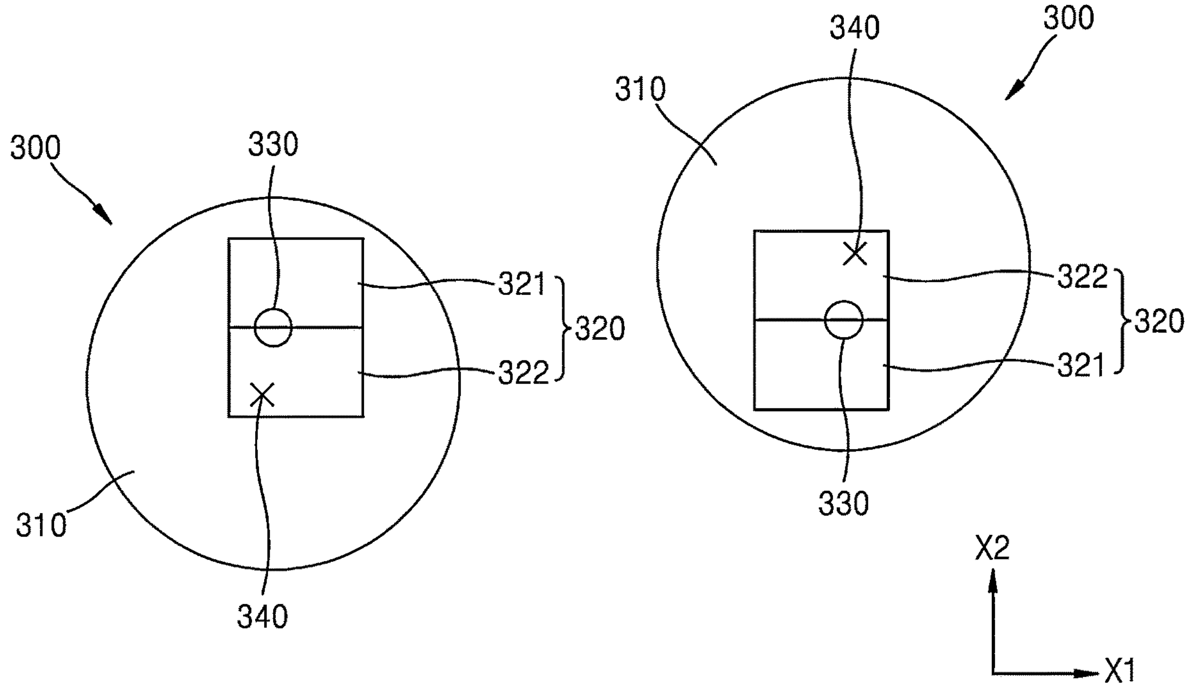
FIG. 20 shows views illustrating a modified example of FIG. 19.

FIG. 19 shows views illustrating an example of the movement unit 300 of FIG. 18. FIG. 20 shows views illustrating a modified example of FIG. 19.

Referring to FIG. 19, the movement unit 300 may include a body 310 provided to be rotatable, and the body 310 may be provided in a circular plate shape. However, the present disclosure is not necessarily limited thereto, and the body 310 may have various shapes capable of transmitting power to a pin as the body 310 rotates around a rotation shaft 330.

The body 310 of the movement unit 300 may rotate around the rotation shaft 330, and the rotation shaft 330 may be positioned to be spaced apart from a center of the movement unit 300, more specifically, a center 340 of the body 310. Accordingly, when the body 310 rotates around the rotation shaft 330, an effect in which the body 310 moves in a second direction X2 as shown in the right state of FIG. 19 may be obtained. As the body 310 rotates and moves in the second direction X2 in this way, the movement may also be transmitted to an expression unit 1110, and thus the expression unit 1110 may also move in the second direction X2.

The movement unit 300 may include a magnetic member 320. Optionally, a center of the magnetic member 320 may also be positioned to be spaced apart from the center of the movement unit 300, specifically, the center 340 of the body 310. Accordingly, when the body 310 of the movement unit 300 rotates under the influence of a magnetic field generated by a coil of a driving unit 200, the body 310 may efficiently rotate with less force.

The magnetic member 320 may be embedded in the body 310, and a permanent magnet may be used. However, the present disclosure is not necessarily limited thereto, and a magnetic material having an N pole 321 and an S pole 322 formed in the second direction X2 may be used.

As in the embodiment shown in FIG. 19, the center of the magnetic member 320 may be positioned at the same position as the rotation shaft 330 of the body 310. However, the present disclosure is not necessarily limited thereto, and as in the embodiment shown in FIG. 20, the center of the magnetic member 320 may be spaced apart from the rotation shaft 330 of the body 310. A positional relationship between the center of the magnetic member 320 and the rotation shaft 330 of the body 310 may be adjusted in this way, thereby maximizing the rotation efficiency of the body 310.

Meanwhile, the rotation shaft 330 of the body 310 may be formed in various shapes.

Figure 21:
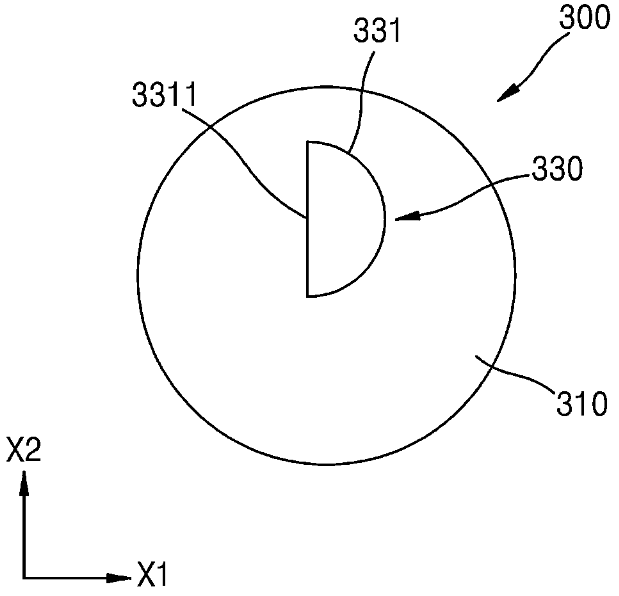
FIG. 21 is a view illustrating a modified example of the movement unit of FIG. 19.
Figure 22:
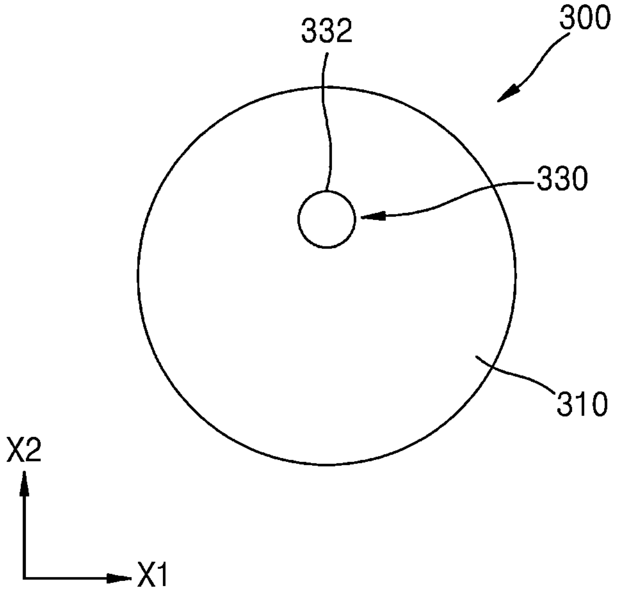
FIG. 22 is a view illustrating another modified example of the movement unit of FIG. 19.

FIG. 21 is a view illustrating a modified example of the movement unit 300 of FIG. 19. FIG. 22 is a view illustrating another modified example of the movement unit 300 of FIG. 19.

As can be seen in FIG. 21, the rotation shaft 330 may include a first rotation shaft 331. The first rotation shaft 331 may be formed in a semicircular shape and may include, for example, a straight portion 3311 extending in the second direction X2. The straight portion 3311 may be positioned close to the center of rotation.

According to another embodiment shown in FIG. 22, the rotation shaft 330 may include a second rotation shaft 332. The second rotation shaft 332 may have a circular shape.

At least one area or the entirety of the movement unit 300 of the above-described embodiments may be accommodated in an upper unit 1100. When the movement unit 300 is accommodated in the upper unit 1100, a holder area corresponding to the movement unit 300 may be formed inside the upper unit 1100. This will be described.

Figure 23:
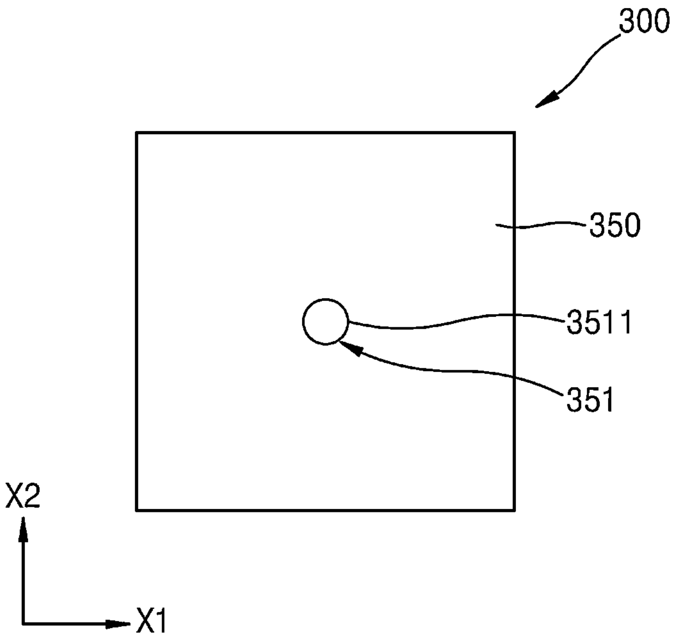
FIG. 23 is a view illustrating an example of a holder area for a movement unit.

FIG. 23 is a view illustrating an example of a holder area 350 for the movement unit 300.

Figure 24:
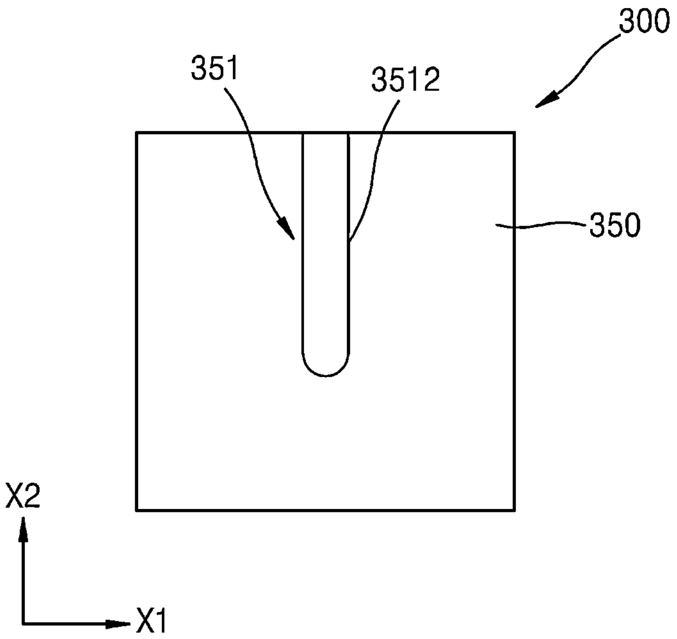
FIG. 24 is a view illustrating another example of a holder area for a movement unit.

FIG. 24 is a view illustrating another example of the holder area 350 for the movement unit 300.

Figure 25:
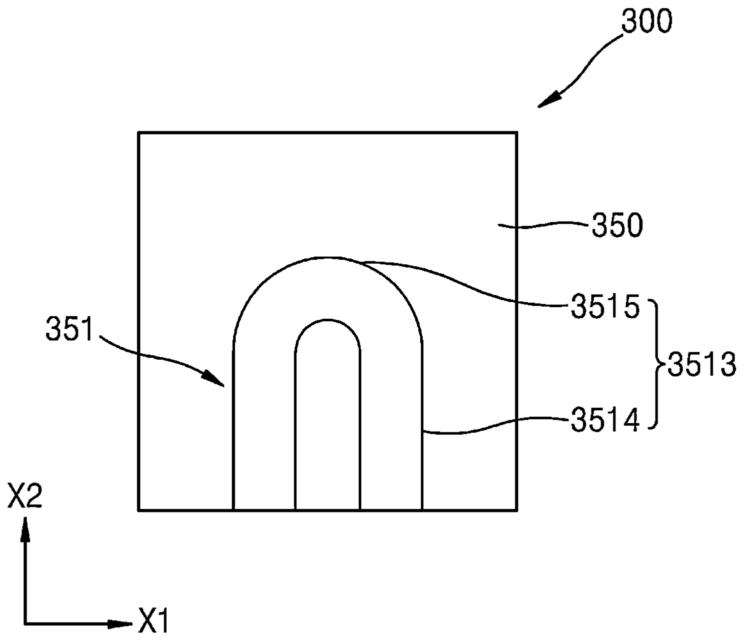
FIG. 25 is a view illustrating another example of a holder area for a movement unit.

FIG. 25 is a view illustrating another example of the holder area 350 for the movement unit 300.

A body 310 of the movement unit 300 may be mounted in the holder area 350 shown in FIG. 23, the body 310 may be accommodated inside the holder area 350, and the holder area 350 may include a support groove 351 in which the rotation shaft 330 is supported. The holder area 350 may have a sufficient space therein such that the body 310 may rotate in a state in which the rotation shaft 330 is supported in the support groove 351.

The support groove 351 as described above may be formed in various shapes. According to the embodiment shown in FIG. 23, the support groove 351 may include a first support groove 3511 formed in a circular shape. Accordingly, the body may rotate in a state in which a position of the rotation shaft 330 mounted in the support groove 351 remains unchanged.

According to another embodiment shown in FIG. 24, the support groove 351 may include a second support groove 3512. The second support groove 3512 may be formed in a straight line. This second support groove 3512 may extend in a second direction X2. Accordingly, the position of the rotation shaft 330 mounted in the second support groove 3512 may be shifted in the second direction X2. As such, as the position of the rotation shaft 330 is shifted in the second direction X2, the body 310 may rotate to move in the second direction X2, which enables the body 310 to move an expression unit 1110 with only a small force. In addition, as the body 310 rotates in the second direction X2 to move toward the expression unit 1110, the expression unit 1110 may remain fixed even in a state in which electricity is cut off at a coil.

Such a straight shape may be provided as various shapes. According to the embodiment shown in FIG. 25, the support groove 351 may include a third support groove 3513 formed in an inverted U shape. The third support groove 3513 may include a straight section 3514 and a curved section 3515. Accordingly, as the body 310 rotates, the rotation shaft 330 positioned in the straight section 3514 may pass through the curved section 3515 to reach another straight section. Accordingly, a distance between a magnetic member and the coil may be maintained constant in a state in which the expression unit 1110 is lifted to the outside of an expression surface and a state in which the expression unit 1110 is lowered from the outside, and thus the expression unit 1110 may be moved with low power.

Various embodiments of the movement unit 300 as described above may be applied in combination to all embodiments of the present specification.

In addition, as an optional example, the holder area 350 may include an area formed in an inner space of an upper unit 1100, and for example, the holder area 350 may be formed integrally with the inside of the upper unit 1100.

Figure 26:
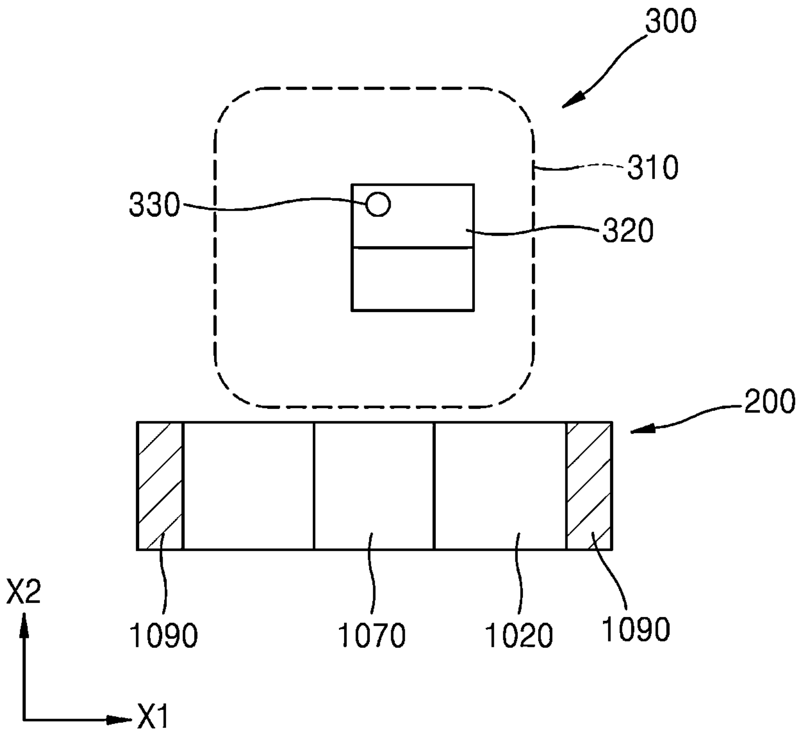
FIG. 26 is a view illustrating an example of a driving unit of FIG. 18.

FIG. 26 is a view illustrating an example of the driving unit 200 of FIG. 18.

Figure 27:
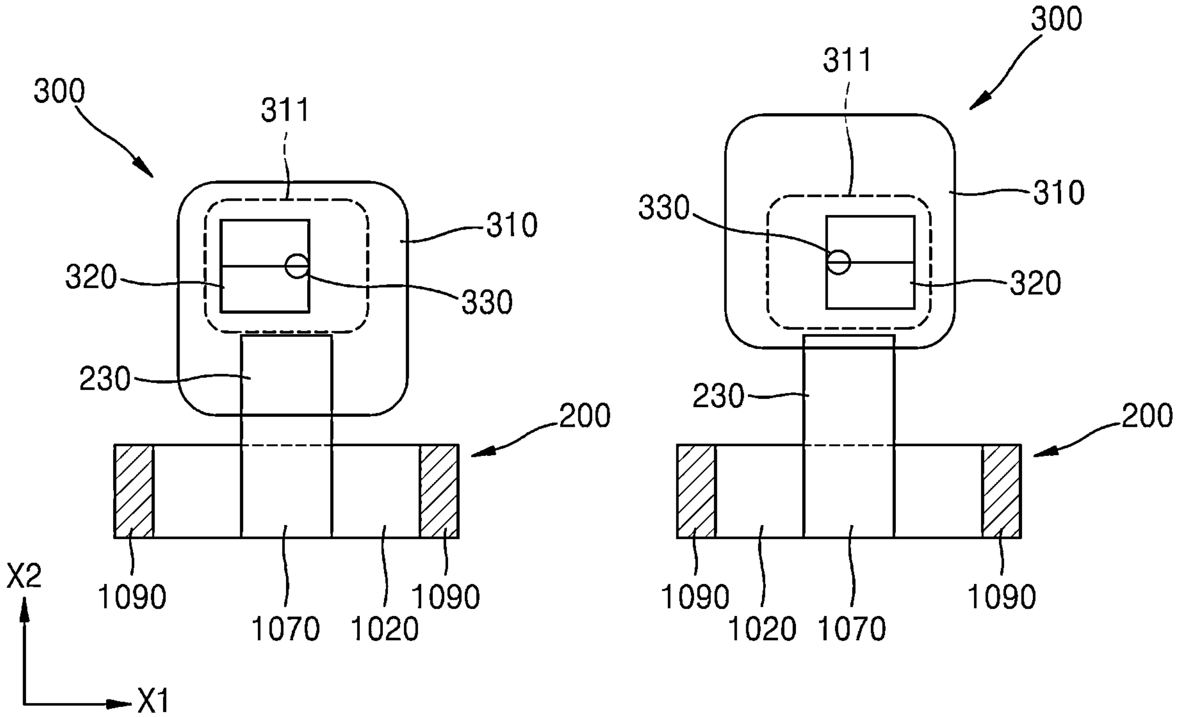
FIG. 27 shows views illustrating a modified example of FIG. 26.

FIG. 27 shows views illustrating a modified example of FIG. 26.

According to the embodiment shown in FIG. 26, the driving unit 200 may include the driving support 1070 and the coil 1020 of the above-described embodiment. The driving support 1070 may extend in a second direction X2, and the coil 1020 may be wound around the driving support 1070. A driving force limiting member 1090 may be disposed around the coil 1020.

As an electrical signal is applied to the coil 1020, the coil 1020 may form a magnetic field in the second direction X2. The magnetic field may change a magnetic polarity in the second direction X2 according to a type of an electrical signal, and as a magnetic member 320 reacts to such a change in magnetic polarity, a body 310 may rotate around a rotation shaft 330.

As an alternative embodiment, according to the embodiment shown in FIG. 26, the coil 1020 may be wound around the entire length of the driving support 1070.

However, the coil 1020 may be wound only around a portion of the driving support 1070. According to another embodiment shown in FIG. 27, the driving unit 200 may further include a support 230 protruding toward a movement unit 300. The support 230 may be coupled to the driving support 1070 to extend in the second direction X2. When the driving support 1070 is made of a magnetic material, the driving support 1070 and the support 230 may also be integrally formed. However, the present disclosure is not necessarily limited thereto, and only the driving support 1070 may be made of a magnetic material, and the support 230 may be made of a non-magnetic material.

According to the embodiment shown in FIG. 27, the body 310 may include a magnetic member accommodation portion 311 in which the magnetic member 320 is accommodated. The magnetic member accommodation portion 311 may be positioned to be spaced inward apart from an outer edge of the body 310. The support 230 may be provided to protrude to reach the inside of the body 310 and extend to a position adjacent to the magnetic member accommodation portion 311.

Figure 28:
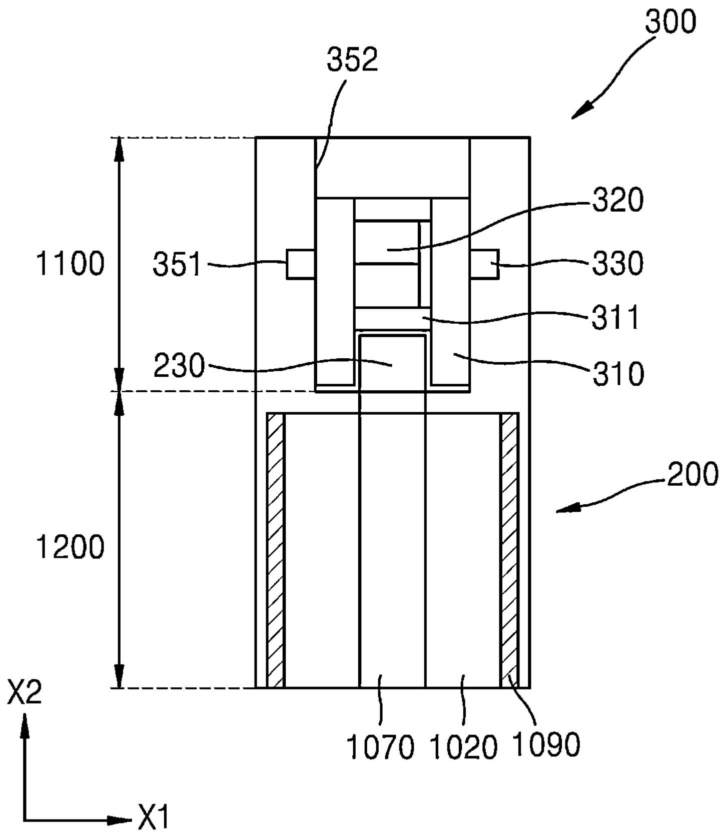
FIG. 28 is a view illustrating an embodiment of an assembly of a driving unit and a movement unit.

FIG. 28 is a view illustrating an embodiment of an assembly of a driving unit and a movement unit 300.

Figure 29:
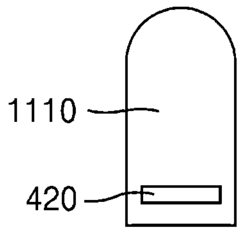
FIG. 29 is a schematic view illustrating another embodiment of an expression unit.

FIG. 29 is a schematic view illustrating another embodiment of an expression unit 1110.

As shown in FIG. 28, a magnetic member accommodation portion 311 is provided between a pair of bodies 310 so that, even when a support 230 (or a driving support 1070) is drawn into the body 310, the support 230 or the driving support 1070 may be prevented from being interfered with by the rotation of the body 310. In this case, the body 310 may sufficiently rotate in an inner space 352 of a holder area. In this way, the support 230 (or the driving support 1070) may protrude up to the inside of the body 310 to extend to a position adjacent to the magnetic member accommodation portion 311, and thus when the body 310 rotates, the support 230 (or the driving support 1070) may support the body 310, for example, the magnetic member accommodation portion 311. Accordingly, the body 310 may stably rotate.

Since the support 230 (or the driving support 1070) is elongated, the support 230 (or the driving support 1070) and a magnetic member 320 may maintain a short distance. When the support 230 (or the driving support 1070) is made of a magnetic material, the support 230 (or the driving support 1070) has a certain polarity due to a magnetic force formed by a coil 1020. Accordingly, even a small magnetic force may more effectively affect the magnetic member 320. Therefore, low-power driving may also be possible. In addition, even when electricity is cut off after being applied to the coil 1020, the support 230 (or the driving support 1070 may maintain magnetism, and thus the body 310 may maintain a fixed state without being reversely rotated again even in a state as shown in the right of FIG. 17. Accordingly, the expression unit 1110 may maintain a protruding state even when power is not applied. Therefore, electricity does need to be continuously applied to the coil 1020 so as to maintain the expression unit 1110 in a protruding state. Thus, there may be an effect of lowering the operating power and/or power consumption of the entire apparatus.

Here, as shown in FIG. 28, as an alternative embodiment, in a state the above-described upper unit 1100 and lower unit 1200 are connected, the driving support 1070 may maintain a fixed state while being disposed in the lower unit 1200, and at least a portion of the movement unit 300, for example, the pair of bodies 310, may move in an inner space of the upper unit 1100. The upper unit 1100 and lower unit 1200 described and shown in the present embodiment and embodiments described below are exemplarily described for convenience of description. That is, for convenience of description, the upper unit 1100 and the lower unit 1200 of FIG. 16A of the above-described embodiment are described as examples. Since the upper unit 1100 and lower unit 1200 of FIG. 16A are not applied to the present embodiment and the embodiments described below in a limited basis, of course, the forms of covers, housings, and accommodation portions having various structures may be applied.

As can be seen in FIG. 29, a magnetic material member 420 may be further positioned in the expression unit 1110. The magnetic material member 420 may be formed in a plate shape or a shape having a certain volume. In addition, although not shown in the drawing, the magnetic material member 420 may be applied onto the expression unit 1110 in a film shape or may be mixed when the expression unit 1110 is formed.

In addition, as an alternative embodiment, the magnetic material member 420 may have a spherical shape.

Since the expression unit 1110 includes the magnetic material member 420, even when power is not applied, the expression unit 1110 may be prevented from excessively protruding to the outside of an upper surface 1101 of the upper unit 1100. After the expression unit 1110 protrudes through upward movement, when the expression unit 1110 is driven down to the inside of the upper unit 1100 again, the expression unit 1110 may be driven down more easily by an attractive force between the magnetic material member 420 and the magnetic member 320 as well as dead load of the expression unit 1110.

As an example, the magnetic material member 420 may include metal, for a specific example, iron.

As an alternative embodiment, it is not desirable for a magnetic force between the magnetic material member 420 and the magnetic member 320 to be large to such an extent as to limit the movement of the movement unit 300.

Such ease of down-driving and a function of preventing protrusion of a pin may be achieved without the application of power, and thus the low-power driving of the entire apparatus may be possible. The above embodiment may be applied to all embodiments of the present disclosure FIG. 30 is a view illustrating another embodiment of an assembly of a driving unit and a movement unit 240.

Figure 30:
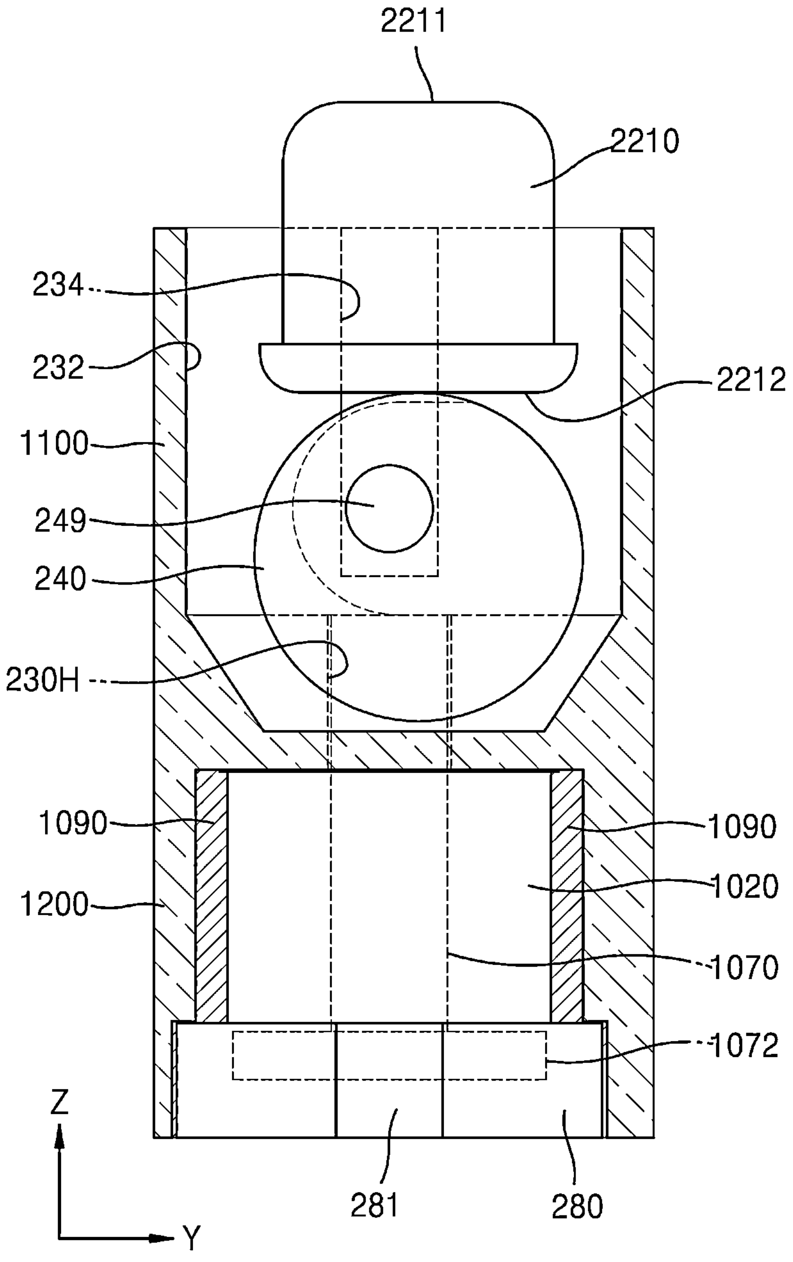
FIG. 30 is a view illustrating another embodiment of an assembly of a driving unit and a movement unit.
Figure 31:
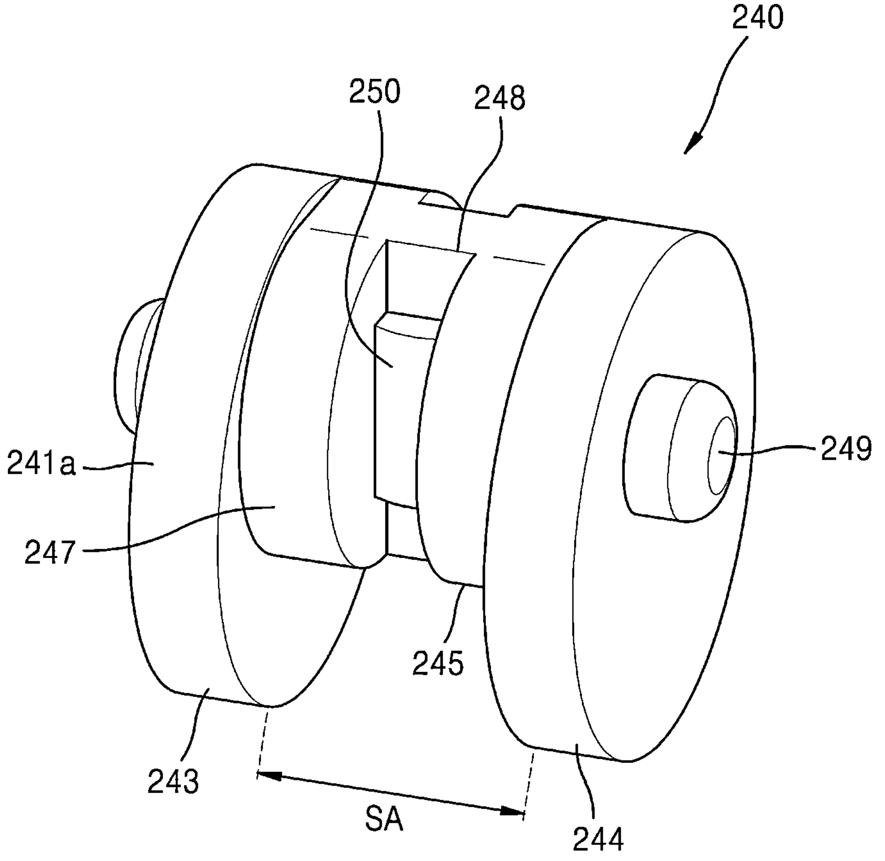
FIG. 31 is a schematic perspective view for describing the movement unit of FIG. 30.

FIG. 31 is a schematic perspective view for describing the movement unit 240 of FIG. 30.

Figure 32:
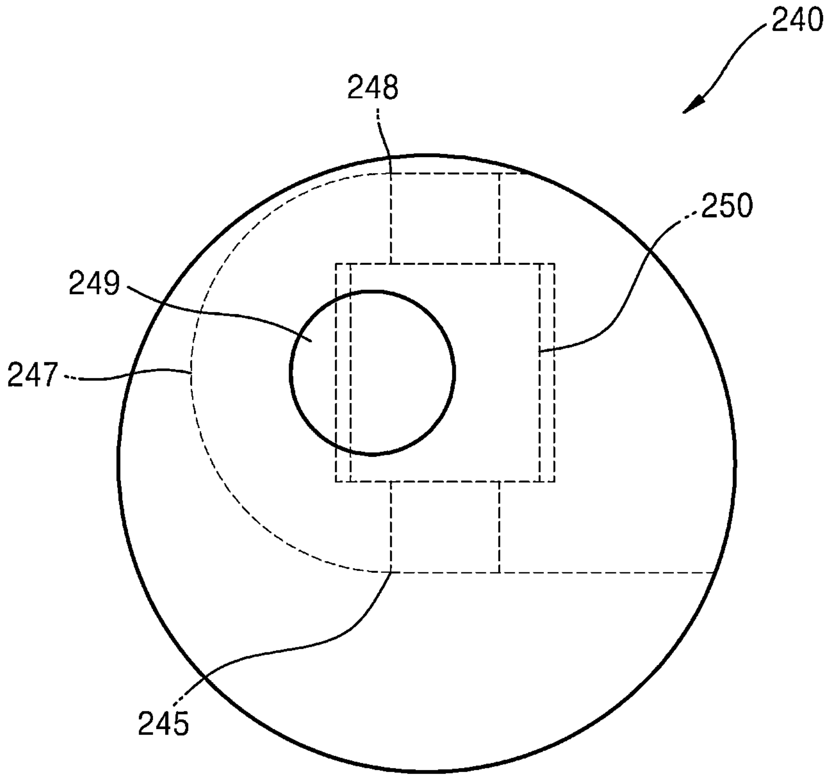
FIG. 32 is a front view of FIG. 31 viewed in one direction.

FIG. 32 is a front view of FIG. 31 viewed in one direction.

Figure 33:
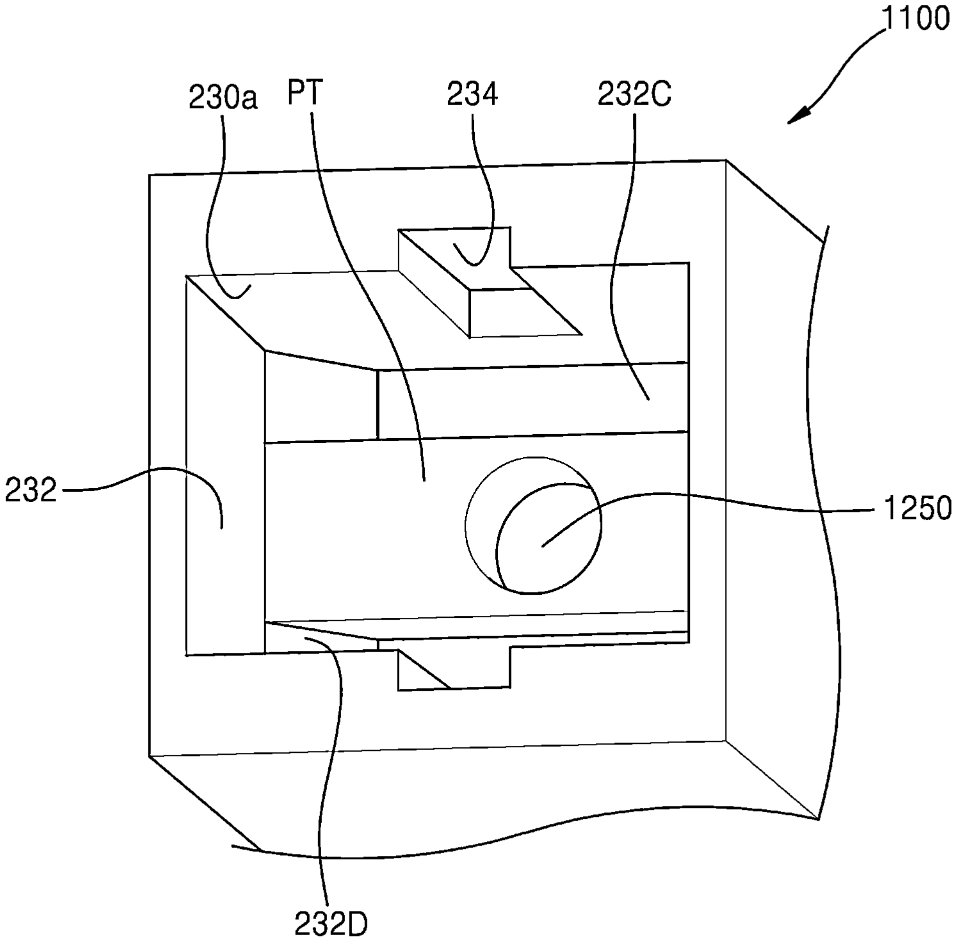
FIG. 33 is a partial perspective view of FIG. 30 viewed in one direction.

FIG. 33 is a partial perspective view of FIG. 30 viewed in one direction.

Referring to FIG. 30, an expression unit 2210 may move according to the movement of the movement unit 240 to be described below, and a position thereof may be at least shifted upward and downward in a longitudinal direction of the expression unit 2210. For example, the expression unit 2210 may move in one direction toward a coil 1020 and a direction opposite to the one direction.

Thus, the expression unit 2210 may move to protrude in one direction, and a user may tactually or visually detect the movement of the expression unit 2210.

The expression unit 2210 may include an expression surface 2211 and a support surface 2212.

The support surface 2212 may be a surface facing the movement unit 240 among areas of the expression unit 2210, may form a lower area of the expression unit 2210, may be disposed separately from the movement unit 240, and may come into contact with the movement unit 240 in at least one time point. The movement unit 240 may transmit a force to the expression unit 2210 through the support surface 2212.

The expression surface 2211 may be an outermost area of the expression unit 2210, for example, an area that is furthest away from the coil 1020. The expression surface 2211 may include an area recognized by a user.

For example, the user may recognize the entire area of the expression unit 2210, but may also recognize only the expression surface 2211. For example, the user may detect the movement of the expression unit 2210 through contact with the expression surface 2211, and the user may also easily detect the movement of the expression unit 2210 by visually detecting the expression surface 2211.

As an alternative embodiment, the expression surface 2211 may include a curved surface.

The expression unit 2210 may have various shapes and may include a pillar-shaped area.

In addition, as an alternative embodiment, a protruding area of the expression unit 2210 may have a curved surface, and corners thereof may also have a curved surface.

The expression unit 2210 may include various materials and may be made of an insulating material that is a light-weight and durable material. For example, the expression unit 2210 may contain a resin-based organic material. As another example, the expression unit 2210 may include an inorganic material such as a ceramic materials.

In addition, as another alternative embodiment, the expression unit 2210 may be made of a material such as metal or glass.

In addition, the expression unit 2210 may be optionally applied throughout the present specification.

As described above, when a magnetic field is generated by a current flowing in the coil 1020, a driving force may be transmitted to the expression unit 2210 through the generated magnetic field, and for example, the driving force is transmitted to the expression unit 2210 through the movement of the movement unit 240.

As an alternative embodiment, one end portion of a driving support 1070 may be elongated to support the movement unit 240, and as an alternative embodiment, the movement unit 240 may be moved while being supported on the one end portion of the driving support 1071.

In an alternative embodiment, the driving support 1070 may be connected to a driving support body 1072, and for example, the driving support 1070 and the driving support body 1072 may have shapes integrated with each other.

As an alternative embodiment, a support 280 may be further disposed and may be disposed to surround the driving support body 1072. As an alternative embodiment, the support 280 may include a protrusion 281 in one area, and the handling thereof may be facilitated through one area of the protrusion 281. In addition, a driving force limiting member 1090 may be disposed on one area of the support 280. As an alternative embodiment, the driving force limiting member 1090 may be supported by the support 280.

As an alternative embodiment, an inner accommodation area 232 may be formed in the upper unit 1100 of the above-described embodiment and may include the above-described holder area.

As an alternative embodiment, a driving groove 234 may be formed in the inner accommodation area 232. For example, the driving groove 234 may be formed in each of both opposite side surfaces of an inner surface of the inner accommodation area 232. As an alternative embodiment, the driving groove 234 may have a shape extending in one direction, for example, in a direction away from the coil 1020.

As an alternative embodiment, the driving groove 234 may be formed in a groove shape or may be formed as a through-area pierced to the outside. The driving groove 234 may be formed in a groove shape that is not pierced to the outside and is formed by removing one internal area.

The movement unit 240 may be disposed in the inner accommodation area 232. The movement unit 240 may be spaced apart from the coil 1020 in a state of being disposed in the inner accommodation area 232.

The movement unit 240 may be disposed adjacent to the coil 1020 and may be driven by a current flowing in the coil 1020 to perform angular movement or rotational movement. Through the movement of the movement unit 240, the expression unit 2210 may perform upward or downward movement, for example, may move in one direction toward the coil 1020 and a direction opposite to the one direction.

As an alternative embodiment, a magnetic portion 250 may be disposed in the movement unit 240, for example, in an inner space. For example, the magnetic portion 250 may contain a magnetic material, for example, a permanent magnet.

The magnetic portion 250 may have a first area (for example, an N-pole or S-pole) and a second area (for example, an S-pole or N-pole), wherein the first area and the second area have different polarities. The first and second areas having different polarities may be arranged in a direction from the coil 1020 to the expression unit 2210 at one point during rotation of the movement unit 240, for example, in a Z-axis direction.

For example, the first and second areas of the magnetic portion 250 having different polarities may be arranged in a direction from the coil 1020 to the expression unit 2210, for example, in the Z-axis direction.

The movement unit 240 may include a driving surface 241*a* on at least an outer surface, and the driving surface 241*a* may be formed to support the expression unit 2210 and may provide a driving force for the upward or downward movement of the expression unit 2210.

As an alternative embodiment, the driving surface 241*a* of the movement unit 240 may include a curved surface as an outer surface. As a more specific example, the driving surface 241*a* of the movement unit 240 may include a boundary line having a shape similar to a circle.

The movement unit 240 may include a movement control part 249.

The driving position of the movement unit 240 may be controlled through the movement control part 249. For example, when the movement unit 240 is moved by the coil 1020, the movement unit 240 may perform angular or rotational movement around the movement control part 249.

As an alternative embodiment, a central axis of the movement unit 240 and the movement control part 249 may not coincide with each other and may be eccentric to each other.

In addition, as an alternative embodiment, the magnetic portion 250 may not coincide with the central axis of the movement unit 240 and may be disposed to overlap, for example, one area of the movement control part 249.

Thus, a torque force for the movement unit 240 may be easily generated, and the movement unit 240 may perform angular movement or rotational movement to efficiently move the expression unit 2210, thereby improving the precise expression power of an information output apparatus. In addition, power consumption of the information output apparatus may be reduced.

The movement unit 240 will be described in more detail with respect to FIGS. 31 to 33.

Referring to FIGS. 31 and 32, the movement unit 240 may include a first movement member 243 and a second movement member 244 and may include a separation space SA therebetween.

At least one surface of outer surfaces of the first movement member 243 and the second movement member 244 may include the driving surface 240*a* to support the expression unit 2210 and supply a driving force to the expression unit 2210 when the movement unit 240 moves.

As an alternative embodiment, the outer surfaces of the first movement member 243 and the second movement member 244 may each include a curved surface. For example, the first movement member 243 and the second movement member 244 may have a shape similar to a rotating body or may each have a shape similar to a disc.

Thus, when the first movement member 243 and the second movement member 244 perform rotational or angular movement, a natural driving force may be provided to the support surface 2212 of the expression unit 2210, thereby allowing the expression unit 2210 to efficiently perform continuous and natural movement.

The movement control part 249 may be disposed on at least one side surface of each of the first movement member 243 and the second movement member 244, for example, on each of surfaces opposite to facing side surfaces of the first movement member 243 and the second movement member 244.

As an alternative embodiment, the movement control part 249 may have a protruding shape, and such a protruding shape may correspond to the driving groove 234 formed in the inner accommodation area 232 of the upper unit 1100.

For example, the movement unit 240 may be moved by a magnetic field generated by the coil 1020, and as a specific example, the movement unit 240 may perform upward or downward movement due to a repulsive force and an attractive force acting on the magnetic portion 250 in the movement unit 240. In this case, the movement unit 240 may perform upward or downward movement while performing rotational movement around the movement control part 249, and the movement control part 249 of the movement unit 240 may perform rotational movement in a state of being disposed in the driving groove 234. For example, the movement control part 249 may perform rotational movement in the driving groove 234. In addition, as an alternative embodiment, the movement control part 249 may slightly perform upward or downward movement while performing rotational movement.

A first movement area 245 and a second movement area 248 may be disposed in the separation space SA between the first movement member 243 and the second movement member 244.

The first movement area 245 and the second movement area 248 may be areas that respectively serve as criteria for the lowest and highest points when the movement unit 240 moves.

For example, when the first movement area 245 is disposed at the lowest portion, that is, in an area closest to the coil 1020, the movement unit 240 may be placed at the lowest point, and thus the expression unit 2210 may also be placed at the lowest point, specifically, a level by which the expression unit 2210 protrudes from the upper unit 1100 may be the lowest.

In addition, when the second movement area 248 is disposed at the lowest portion, that is, in the area closest to the coil 1020, the movement unit 240 may be placed at the highest point, and thus the expression unit 2210 may also be placed at the highest point, specifically, a level by which the expression unit 2210 protrudes from the upper unit 1100 may be the highest.

As an alternative embodiment, the first movement area 245 and the second movement area 248 may be supported by the above-described driving support 1070. That is, when the movement unit 240 moves, the driving support 1070 is arranged to correspond to the separation space SA between the first movement member 243 and the second movement member 244, thereby supporting the first movement area 245 and the second movement area 248 over time.

As an alternative embodiment, a connection area 247 may be disposed between the first movement area 245 and the second movement area 248, and the connection area 247 may include a curved surface.

When the movement unit 240 performs rotational movement, the driving support 1070 may support the first movement area 245 and then support at least one area of the connection area 247 before supporting the second movement area 248. Therefore, the movement unit 240 moves naturally, and thus the resulting movement of the expression unit 2210 may be precisely controlled.

A distance between the driving surface 241*a* and the first movement area 245 may be different from a distance between the driving surface 241*a* and the second movement area 248. For example, the distance between the driving surface 241*a* and the first movement area 245 may be longer than the distance between the driving surface 241*a* and the second movement area 248.

As an alternative embodiment, a distance between a morphologic central axis of the movement unit 240 and the first movement area 245 may be shorter than a distance between the morphologic central axis of the movement unit 240 and the second movement area 248.

As an alternative embodiment, a distance from the movement control part 249 to the first movement area 245 may be the same or similar to a distance from the movement control part 249 to the second movement area 248, and as a further alternative embodiment, a distance from the movement control part 249 to the first movement area 245 may also be the same or similar thereto.

For example, the connection area 247 may correspond to at least one area of a circle having a radius centered on a center point of the movement control part 249. Thus, when the movement unit 240 performs rotational movement around the movement control part 249, and the driving support 1070 supports the first movement area 245, the second movement area 248, and the connection area 247, the movement control part 249 may maintain the same or similar position.

In addition, when supported by the driving support 1070, the connection area 247 may include a curved surface or a surface close to an arc, and thus the movement unit 240 may efficiently perform smooth and gentle movement.

Referring to FIG. 33, the inner accommodation area 232 of the upper unit 1100 may include a first groove 232C and a second groove 232D. As described above, the upper unit 1100 is merely an example for convenience of description and may include various types of covers, housings, or outer wall portions.

The first groove 232*c* and the second groove 232*d* may have a shape deeply recessed toward the coil 1020. The first movement member 243 and the second movement member 244 may be disposed to correspond to the first groove 232C and the second groove 232D, respectively, and thus, when a driving force is transmitted to the movement unit 240 through the coil 1020, in a state in which the first movement member 243 and the second movement member 244 of the movement unit 240 are disposed to correspond to the first groove 232C and the second groove 232D, the movement unit 240 may perform angular movement or rotational movement and may also perform upward or downward movement. Accordingly, the movement unit 240 may stably move, thereby easily performing precise movement control on the expression unit 2210.

As an alternative embodiment, a protruding area PT may be formed between the first groove 232C and the second groove 232D. For example, the protruding area PT may be formed to be connected to a through-portion 1250. As a specific example, the driving support 1070 may protrude through the through-portion 1250 and reach the protruding area PT.

In this case, as an alternative embodiment, the driving support 1070 may protrude further than the protruding area PT, and in this case, the driving support 1070 may support the first movement area 245 and the second movement area 248 over time. As an example, the first movement area 245 may be supported by an upper end of the driving support 1070, for example, through contact. Thus, a state in which the expression unit 2210 is placed at the lowest point may include a state in which the expression unit 2210 is implemented by being physically latched by the upper end of the driving support 1070. In addition, the second movement area 248 may be supported by the upper end of the driving support 1070, for example, through contact. Thus, a state in which the expression unit 2210 is placed at a position different from the lowest point, or as an alternative embodiment, is placed at the highest point, may include a state in which the expression unit 2210 is implemented by being physically latched by the upper end of the driving support 1070.

As an alternative embodiment, the driving support 1070 may not protrude further than the protruding area PT, and in this case, the protruding area PT may support the first movement area 245 and the second movement area 248 of the movement unit 240 over time.

For example, a state in which the first movement area 245 is supported by an upper surface of the protruding area PT, and the expression unit 2210 is placed at the lowest point may include a state in which the expression unit 2210 is implemented by being physically latched by the upper surface of the protruding area PT.

In addition, a state in which the second movement area 248 is supported by the upper surface of the protruding area PT, and the expression unit 2210 is placed at the highest point may include a state in which the expression unit 2210 is implemented by being physically latched by the upper surface of the protruding area PT.

In addition, as an alternative embodiment, the driving support 1070 or the protruding area PT may not support the movement unit 240 or may only temporarily support the movement unit 240. In this case, the movement control part 249 may be supported by one area of the inner accommodation area 232 of the upper unit 1100, for example, by a boundary surface of the driving groove 234.

Figure 34:
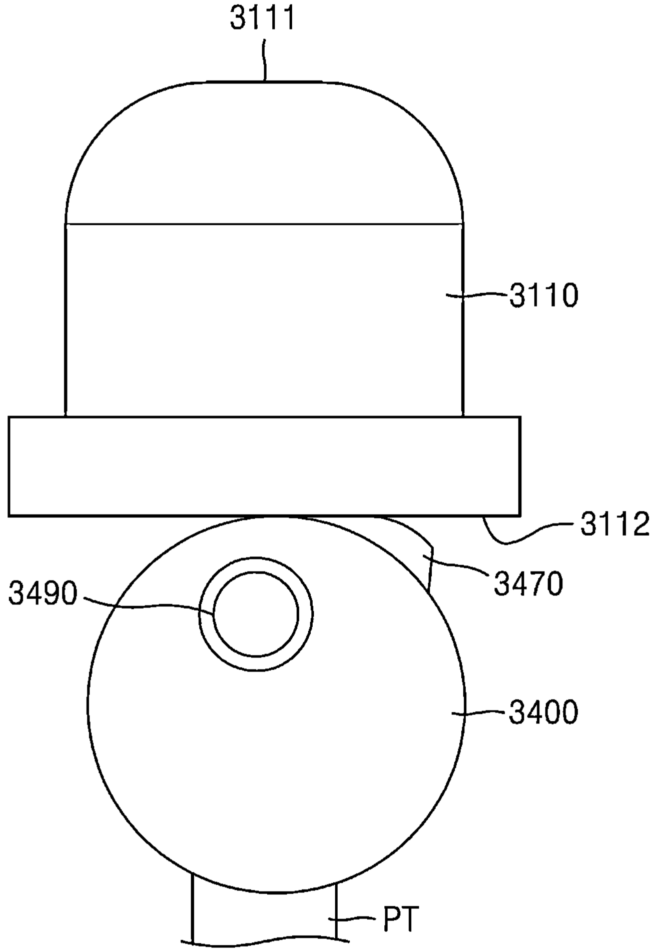
FIGS. 34 and 35 are views for describing a relationship between a movement unit and an expression unit according to another embodiment of the present disclosure.
Figure 35:
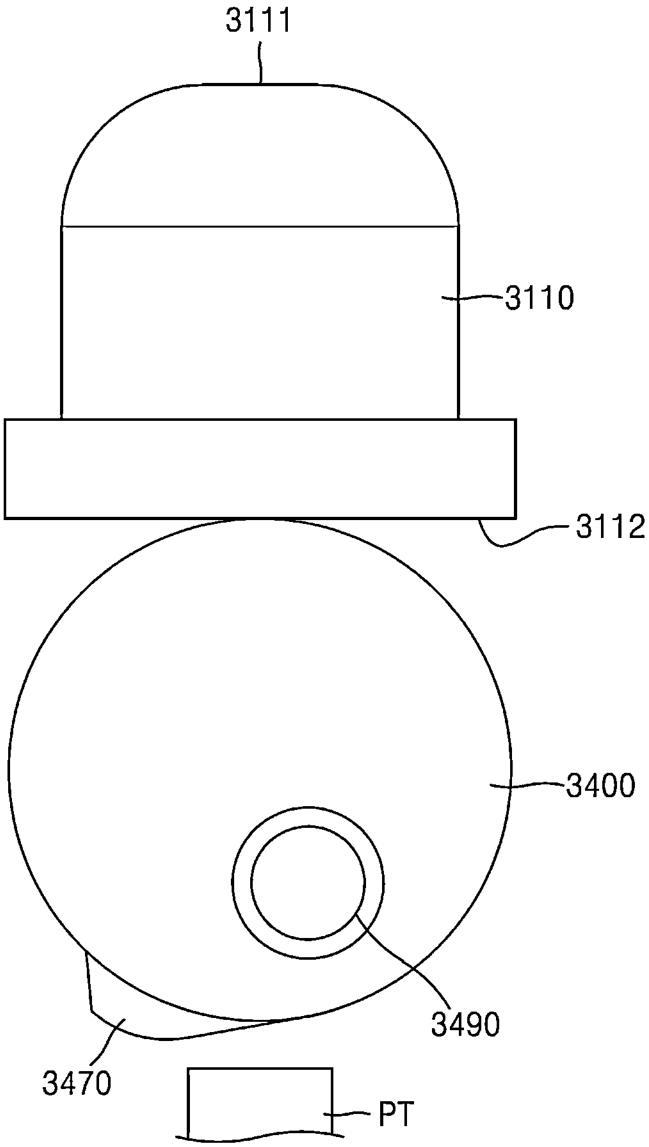

FIGS. 34 and 35 are views for describing a relationship between a movement unit 3400 and an expression unit 3110 according to another embodiment of the present disclosure Referring to FIGS. 34 and 35, an information output apparatus may include the movement unit 3400 and the expression unit 3110. For convenience of description, members of the above-described embodiments, such as the coil, are not shown, but those described in the above-described embodiments may be applied by being modified identically or similarly within an appropriate range.

The expression unit 3110 may be moved according to the movement of the movement unit 3400, and a position thereof may be at least shifted upward and downward in a longitudinal direction of the expression unit 3110.

The expression unit 3110 may include an expression surface 2111 and a support surface 3112.

In addition, although not shown, the expression unit 3110 may include a magnetic material (not shown) therein.

As an alternative embodiment, the expression unit 3110 may have a space formed therein, and the space may have a shape that is open toward the movement unit 3400.

The movement unit 3400 may move, for example, through a magnetic field generated by a current flowing in a coil as described in the above-described embodiments.

In addition, during movement, the movement unit 3400 may be supported by a protruding area PT. Although not shown, the movement unit 3400 may be supported by the driving support 1070 described in the above-described embodiment.

As an alternative embodiment, the movement unit 3400 may include driving control parts 3490, for example, one or more driving control parts 3490 on side surfaces thereof, for example, on both opposite side surfaces.

As an alternative embodiment, the movement unit 3400 may perform angular movement or rotational movement around the driving control part 3490.

A stopper 3470 may be formed in one area of the movement unit 3400. The stopper 3470 may have a shape that has a height by protruding from a driving surface of the movement unit 3400, for example, an outer surface having a closed curve having a shape similar to a circle.

Thus, as shown in FIGS. 34 and 35, the stopper 3470 may serve as a barrier to a member adjacent to the stopper 3470.

For example, as shown in FIG. 34, the stopper 3470 may serve as a barrier to the support surface 3112 of the expression unit 3110 to provide resistance to continuous angular movement of the movement unit 3400 in one direction, and as shown in FIG. 35, the stopper 3470 may serve as a barrier to the protruding area PT to provide resistance to continuous angular movement of the movement unit 3400 in one direction.

In addition, although not shown, during angular movement of the movement unit 3400, the stopper 3470 may serve as various barriers while being supported by adjacent members according to design conditions.

Through the stopper 3470, unnecessary continuous angular movement or rotational movement of the movement unit 3400 may be controlled, thereby reducing tremors or vibrations of the expression unit 3110 and effectively performing precise movement control on the expression unit 3110.

In addition, the movement unit 3400 may be effectively controlled to reduce power required to drive the movement unit 3400.

Figure 36:
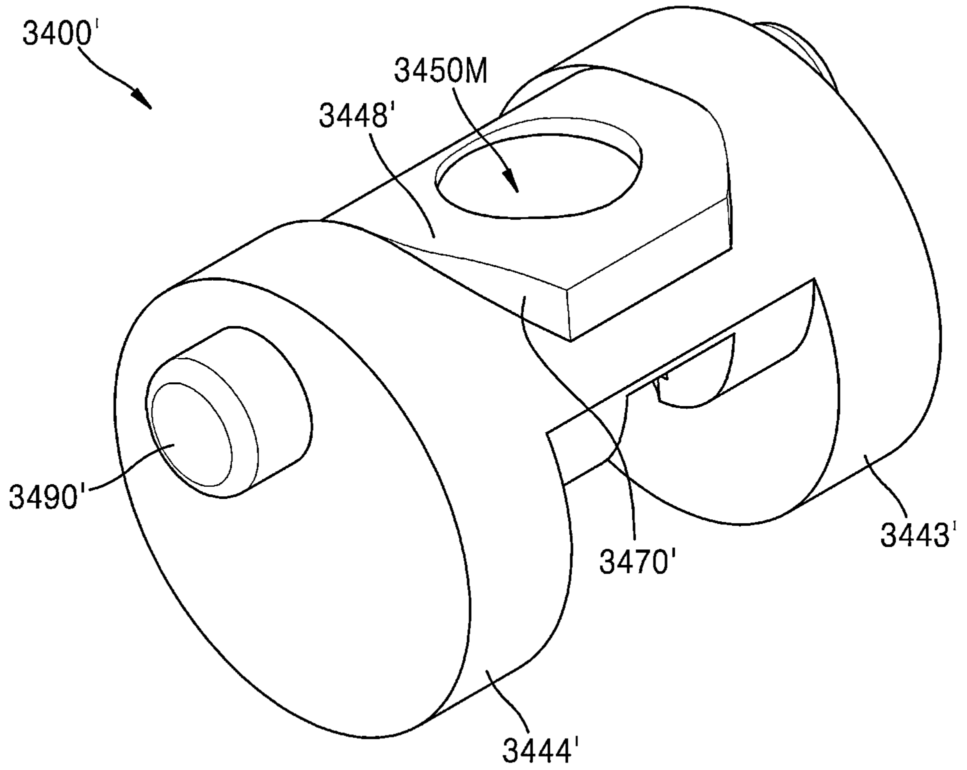
FIGS. 36 and 37 are perspective views for describing an alternative embodiment of a driving unit of FIGS. 34 and 35.
Figure 37:
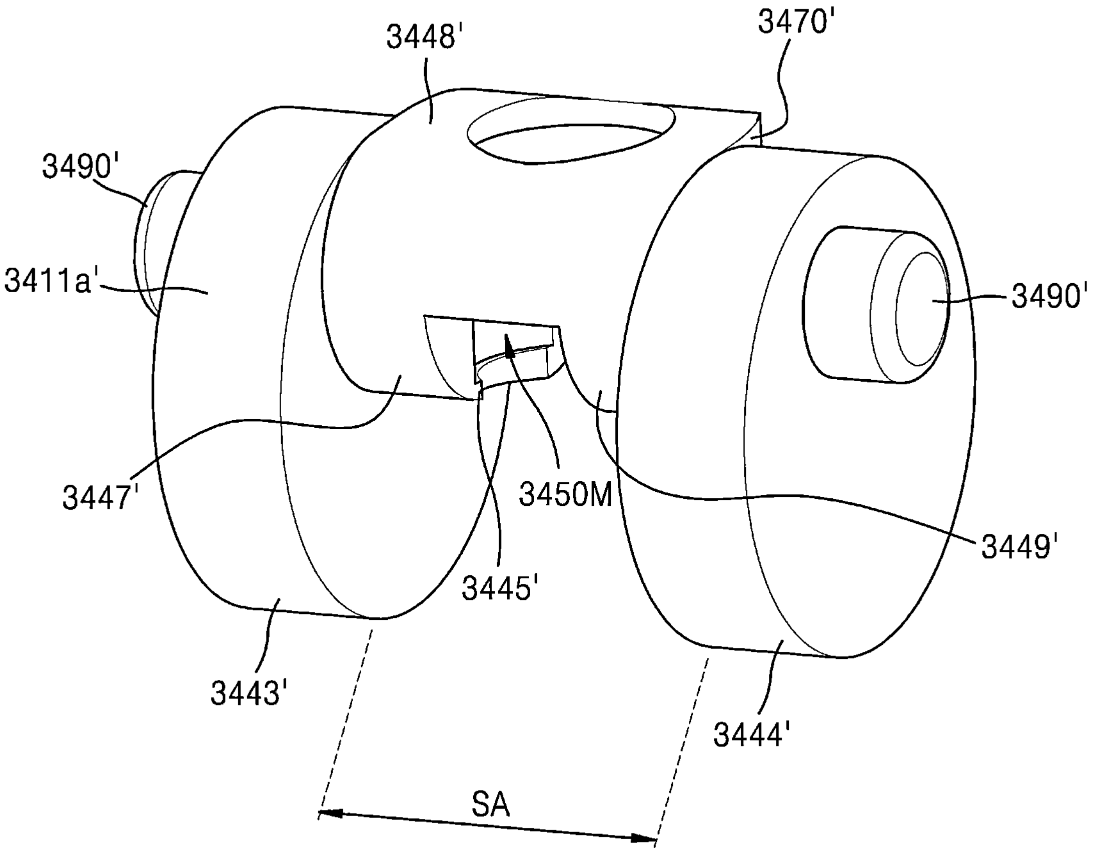

FIGS. 36 and 37 are perspective views for describing an alternative embodiment of the driving unit of FIGS. 34 and 35.

Referring to FIGS. 36 and 37, a movement unit 3400' may include a first movement member 3443' and a second movement member 3444', and the first movement member 3443' and the second movement member 3444' may be spaced apart from each other to form a separation space SA.

At least one surface of outer surfaces of the first movement member 3443' and the second movement member 3444' may include a driving surface 3441*a'* to support an expression unit 3110 and supply a driving force to the expression unit 3110 when the movement unit 3440' moves.

As an alternative embodiment, the outer surfaces of the first movement member 3443' and the second movement member 3444' may each include a curved surface. For example, the first movement member 3443' and the second movement member 3444' may have a shape similar to a rotating body or may each have a shape similar to a disc.

A movement control part 3490' may be disposed on at least one side surface of each of the first movement member 3443' and the second movement member 3443', for example, on each of surfaces opposite to facing side surfaces of the first movement member 3443' and the second movement member 3444'.

A first movement area 34435' and a second movement area 3448' may be disposed in the separation space SA between the first movement member 3443' and the second movement member 3444'.

As an alternative embodiment, during movement of the expression unit 3110, the expression unit 3110 may be lifted and lowered through the first movement area 3445' and the second movement area 3448'.

For example, the first movement area 3445' and the second movement area 3448' may be areas that serve as criterion for the lowest and highest points of the expression unit 3110.

As an alternative embodiment, the first movement area 3445' and the second movement area 3448' may be supported by a protruding area PT. As another example, the first movement area 3445' and the second movement area 3448' may be supported by the driving support 1070 described in the above-described embodiment.

As an alternative embodiment, a connection area 247 may be disposed between the first movement area 3445' and the second movement area 3448', and the connection area 247 may include a curved surface.

As an alternative embodiment, although not shown, a magnetic portion (not shown) may be disposed in the movement unit 3400', for example, in an inner space 3450M' of the movement unit 3400'. For example, the magnetic portion (not shown) may contain a magnetic material, for example, a permanent magnet. A stopper 3470' may be formed in one area of the movement unit 3400'. For example, the stopper 3470' may have a shape that protrudes from the driving surface 3411*a'* to have at least a height. As a specific example, at least one area of the stopper 3470' may have a shape protruding from the outer surfaces of the first movement member 3443' and the second movement member 3444' to have a height.

As an alternative embodiment, the stopper 3470' may be formed adjacent to the outer surfaces of the first movement member 3443' and the second movement member 3444'. For example, the stopper 3470' may be connected to the second movement area 3448'.

As an alternative embodiment, the stopper 3470' may have a height based on the outer surfaces of the first movement member 3443' and the second movement member 3444' and may include areas having different heights.

For example, among the areas of the stopper 3470; a height of the area of the stopper 3470' that is further away from the second movement area 3448' may be greater than a height of the area connected to the second movement area 3448'.

Through such a form, the stopper 3470' may serve to provide effective resistance during angular movement of the movement unit 3400'.

During angular movement of the movement unit 3400' in the present embodiment, once a force is applied until the movement unit 3400' reaches a critical point, after the critical point, without any additional force being applied, the movement unit 3400' may additionally perform angular movement.

Thus, only for a partial time of the entire time of an operation process of the movement unit 3400', a current may be applied to a coil, and power may be consumed.

As an alternative embodiment, when a current is applied to the coil only at an initial stage including a beginning stage of the operation of the movement unit 3400', and thus the movement unit 3400' starts to move, the movement unit 3400' may perform angular movement by a torque force through such eccentricity.

In addition, as an example, one area of the movement unit 3400' may be supported by an upper end or protruding area of the driving support 1070, or for a specific example, through contact, and thus, a state in which the expression unit 3110 is placed at the lowest point may include a state in which the expression unit 3110 is implemented by being physically latched.

Figure 38:
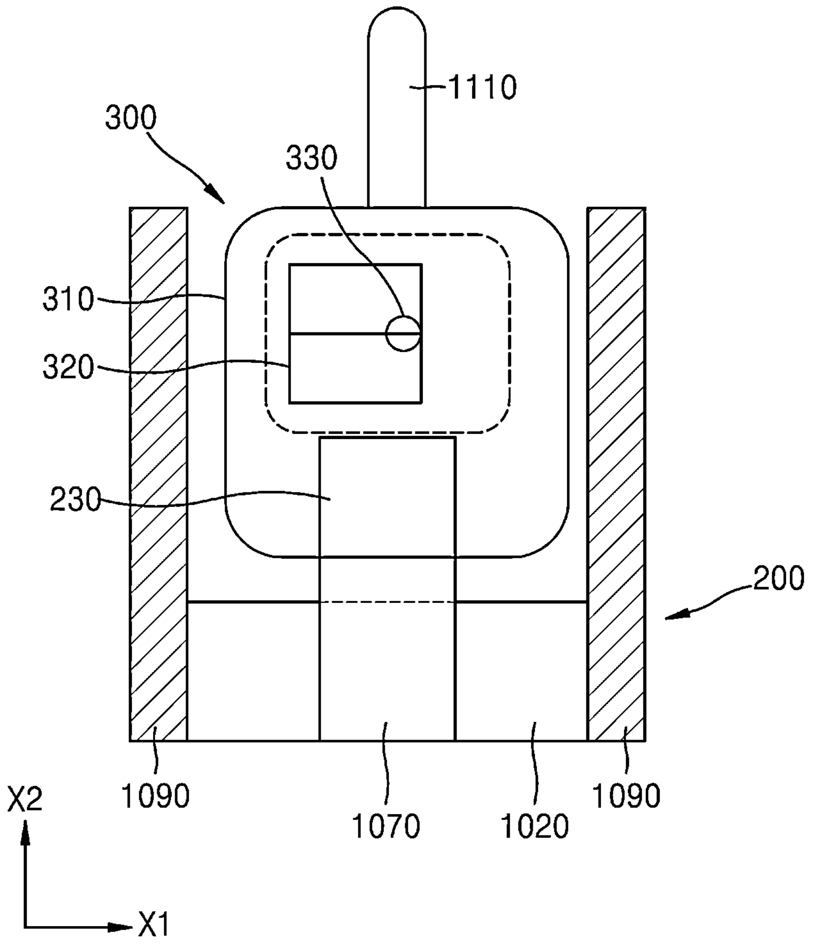
FIG. 38 is a schematic cross-sectional view illustrating an information output apparatus according to another embodiment of the present disclosure.

FIG. 38 is a schematic cross-sectional view illustrating an information output apparatus according to another embodiment of the present disclosure.

Referring to FIG. 38, the information output apparatus according to the present embodiment may include the expression unit 1110, the driving force providing unit DCU, and the movement unit 300 of the above-described embodiments, or the expression unit 1110, the driving force providing unit 200, and the movement unit 300 may be modified and used.

Therefore, hereinafter, differences from the above-described embodiments will be mainly described, and the same contents as the above-described embodiments or contents, which may be easily modified by those skilled in the art from the above-described embodiments, will be briefly described or omitted.

The expression unit 1110 may move in at least one direction to be detectable by a user. Specifically, the expression unit 1110 may move in a second direction X2, and through the movement, a user may tactually detect the expression unit 1110.

The driving force providing unit 200 may include the driving force providing unit 200 of the above-described embodiments, for a specific example, the driving force providing unit 200 described with reference to FIGS. 26 and 27.

The driving force providing unit 200 may include a driving support 1070 and a coil 1020. The driving support 1070 may be formed to extend in the second direction X2, and the coil 1020 may be wound around the driving support 1070. A driving force limiting member 1090 may be disposed around the coil 1020.

As an electrical signal is applied to the coil 1020, the coil 1020 may form a magnetic field in the second direction X2. The magnetic field may change a magnetic polarity in the second direction X2 according to a type of an electrical signal, and as a magnetic member 320 reacts to such a change in magnetic polarity, a body 310 may rotate around a rotation shaft 330.

The coil 1020 may be wound around at least a portion of the driving support 1070. For example, the coil 1020 may be wound around the entire length of the driving support 1070, and as another example, the coil 1020 may be wound around only a portion of the driving support 1070.

The driving force providing unit 200 may further include a support 230 protruding toward the movement unit 300. The support 230 may be coupled to the driving support 1070 to extend in the second direction X2. When the driving support 1070 is made of a magnetic material, the driving support 1070 and the support 230 may also be integrally formed. However, the present disclosure is not necessarily limited thereto, and only the driving support 1070 may be made of a magnetic material, and the support 230 may be made of a non-magnetic material.

The movement unit 300 may be disposed at one side of the expression unit 1110 and may be formed to be rotatable in at least one direction. While at least a portion of the movement unit 300 rotates, the movement unit 300 may rotate the expression unit 1110 in at least one direction.

Specifically, the movement unit 300 may be formed to be rotatable in at least one direction by a magnetic field formed by the coil 1020 when an electric field is applied to the coil 1020.

The movement unit 300 may include the body 310, and the body 310 may include a magnetic member accommodation portion 311 in which the magnetic member 320 is accommodated. Accordingly, when a magnetic field is formed by the coil 1020, the body 310 may rotate in at least one direction and thus may rotate the expression unit 1110 disposed at one side of the movement unit 300.

The information output apparatus shown in FIG. 38 may further include the driving force limiting member 1090. The driving force limiting member 1090 may be formed to reduce or restrict a driving force generated in the driving force providing unit 200 from being transmitted in a direction different from a direction from the driving force providing unit 200 to the expression unit 1110.

Specifically, the driving force limiting member 1090 may reduce or prevent the magnetic field generated through the coil 1020 from interfering with or being interfered with by an adjacent space. In addition, the driving force limiting member 1090 may reduce or prevent the magnetic member 320 included in the movement unit 300 from interacting with the coil 1020 or other adjacent magnetic members.

For example, the driving force limiting member 1090 may reduce or shield the interference of the magnetic field in a direction away from a side surface of the coil 1020 (X-axis direction in the drawing) and may allow the directionality of the magnetic field toward the expression unit 1110 to be enhanced, thereby precisely controlling the movement of the expression unit 1110 and improving the efficiency of the movement.

In addition, in other words, the driving force providing unit 200 may use a magnetic field generated in the coil 1020, and the movement unit 300 may include the magnetic member 320 that is magnetic. Thus, a magnetic field may be prevented or blocked from being transmitted to such an adjacent side space, and a force of the magnetic field may be allowed to be effectively directed in a direction from the coil 1020 to the expression unit 1110.

The driving force limiting member 1090 may be disposed on at least one side of the driving force providing unit 200.

For example, the driving force limiting member 1090 may be disposed at one side outside the coil 1020. Specifically, the driving force limiting member 1090 may be disposed to overlap at least a portion of the coil 1020.

As an alternative embodiment, the driving force limiting member 1090 may be formed to have a height up to a position at which at least a portion of the driving force limiting member 1090 overlaps the movement unit 300. Referring again to FIG. 38, it can be confirmed that the driving force limiting member 1090 is disposed outside the movement unit 300.

In a desirable embodiment, the driving force limiting member 1090 may be formed to extend to have a length up to a position corresponding to the uppermost end of the movement unit 300. In other words, the driving force limiting member 1090 may be formed to extend from the coil 1020 to cover the entire movement unit 300.

The driving force limiting member 1090 may be disposed at each of both sides outside the coil 1020 and the movement unit 300. As another example, the driving force limiting member 1090 may be disposed to surround at least one area of an outer surface of each of the coil 1020 and the movement unit 300.

The driving force limiting member 1090 may be made of various materials and may contain, for example, a metal material.

The driving force limiting member 1090 may be made of a material that affects a magnetic field generated in the coil 1020 and may contain, for example, a magnetic material. As a specific example, the driving force limiting member 1090 may contain iron, nickel, cobalt, and various other magnetic materials.

Figure 39:
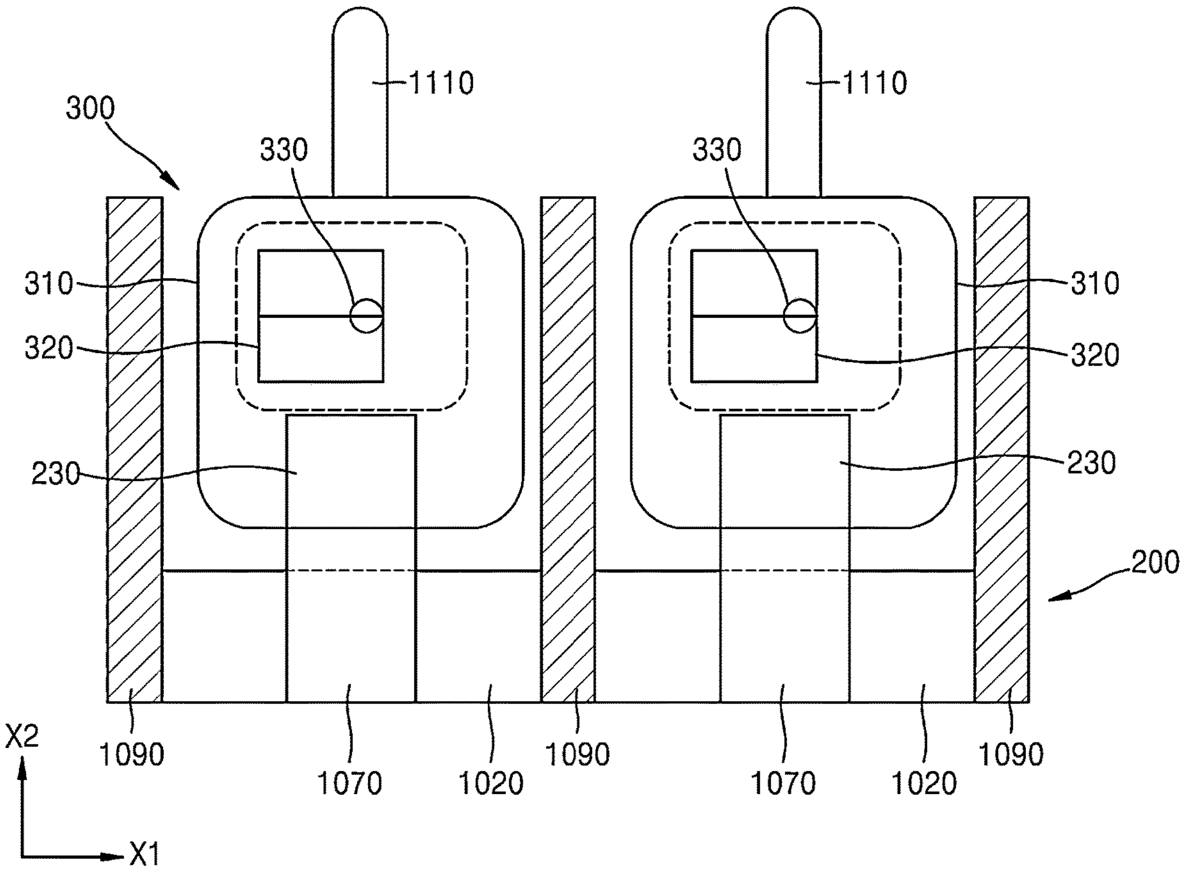
FIG. 39 is a schematic cross-sectional view illustrating an information output apparatus according to another embodiment of the present disclosure.

FIG. 39 is a schematic cross-sectional view illustrating an information output apparatus according to another embodiment of the present disclosure.

Referring to FIG. 39, the information output apparatus according to the present embodiment may include a plurality of driving force providing units 200 and a plurality of movement units 300.

Meanwhile, an expression unit 1110 may be disposed at one side of each of the plurality of movement units 300.

Each driving force providing unit 200 may include a coil 1020, and the coil 1020 may be disposed around a driving support 1070. As a specific example, the coil 1020 may have a shape wound around the driving support 1070.

A driving force limiting member 1090 may be disposed between the driving force providing units 200 and between the movement units 300. For example, the driving force limiting member 1090 may be disposed between the driving force providing unit 200 and the movement unit 300 at the left side of FIG. 39 and the driving force providing unit 200 and the movement unit 300 at the right side of FIG. 39.

Accordingly, when the plurality of driving force providing units 200 and movement units 300 are disposed adjacent to each other, the driving force limiting member 1090 may serve to prevent the plurality of driving force providing units 200 and movement units 300 from interfering or interacting with each other.

In addition, in this case, the driving force limiting member 1090 may be formed to have a length. Specifically, the driving force limiting member 1090 may be disposed such that at least a portion thereof overlaps the coil 1020 and a portion thereof overlaps the movement unit 300. Desirably, the driving force limiting member 1090 may be formed to extend from a position corresponding to the lowermost end of the coil 1020 to a position corresponding to the uppermost end of the movement unit 300.

Figure 40:
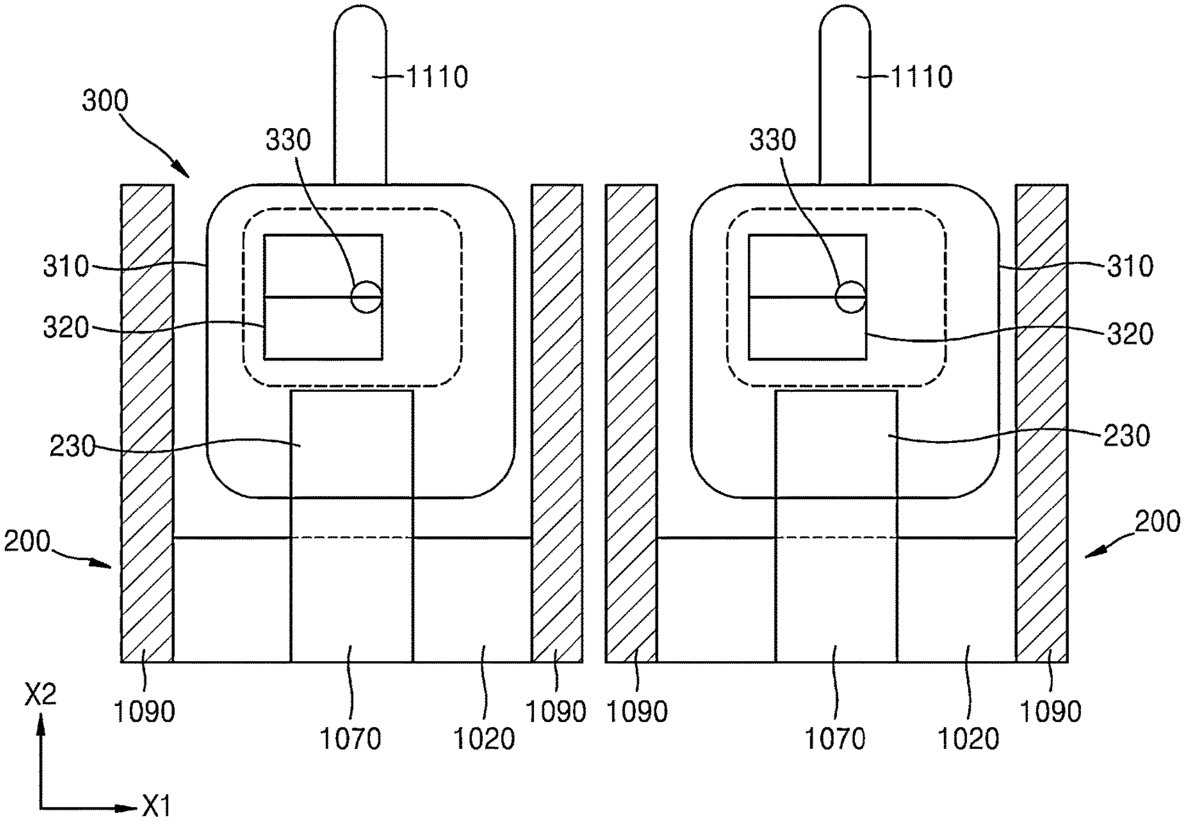
FIG. 40 is a schematic cross-sectional view illustrating an information output apparatus according to another embodiment of the present disclosure.

FIG. 40 is a schematic cross-sectional view illustrating an information output apparatus according to another embodiment of the present disclosure.

Referring to FIG. 40, the information output apparatus according to the present embodiment may include a plurality of driving force providing units 200 and a plurality of movement units 300.

Meanwhile, an expression unit 1110 may be disposed at one side of each of the plurality of movement units 300.

Each driving force providing unit 200 may include a coil 1020, and the coil 1020 may be disposed around a driving support 1070. As a specific example, the coil 1020 may have a shape wound around the driving support 1070.

The driving force limiting member 1090 may be disposed outside each driving force providing unit 200 and each movement unit 300. In other words, each driving force providing unit 200 and each movement unit 300 may be formed to be surrounded by the driving force limiting member 1090 at the outside thereof.

Accordingly, when the plurality of driving force providing units 200 and movement units 300 are disposed adjacent to each other, the driving force limiting member 1090 may serve to prevent the plurality of driving force providing units 200 and movement units 300 from interfering or interacting with each other.

In addition, in this case, the driving force limiting member 1090 may be formed to have a length. Specifically, the driving force limiting member 1090 may be disposed such that at least a portion thereof overlaps the coil 1020 and a portion thereof overlaps the movement unit 300. Desirably, the driving force limiting member 1090 may be formed to extend from a position corresponding to the lowermost end of the coil 1020 to a position corresponding to the uppermost end of the movement unit 300.

Figure 41:
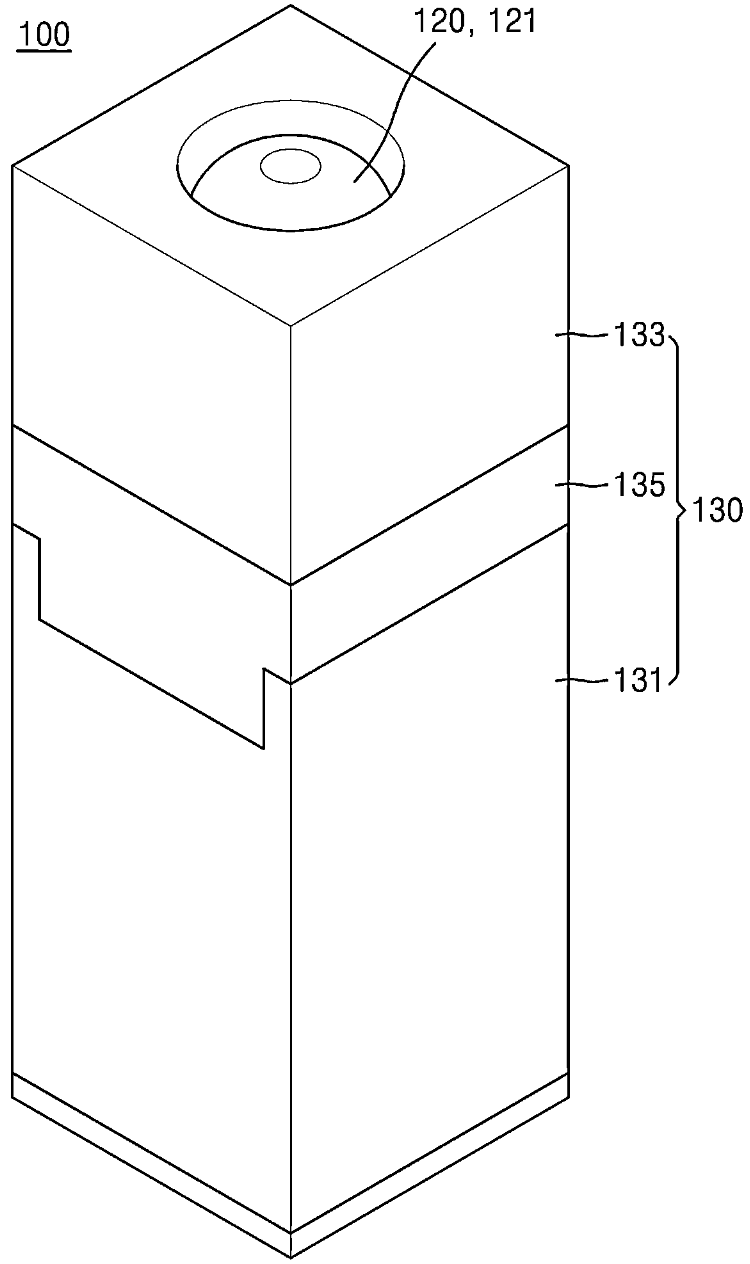
FIG. 41 is a perspective view illustrating an information output apparatus according to an embodiment of the present disclosure.
Figure 42:
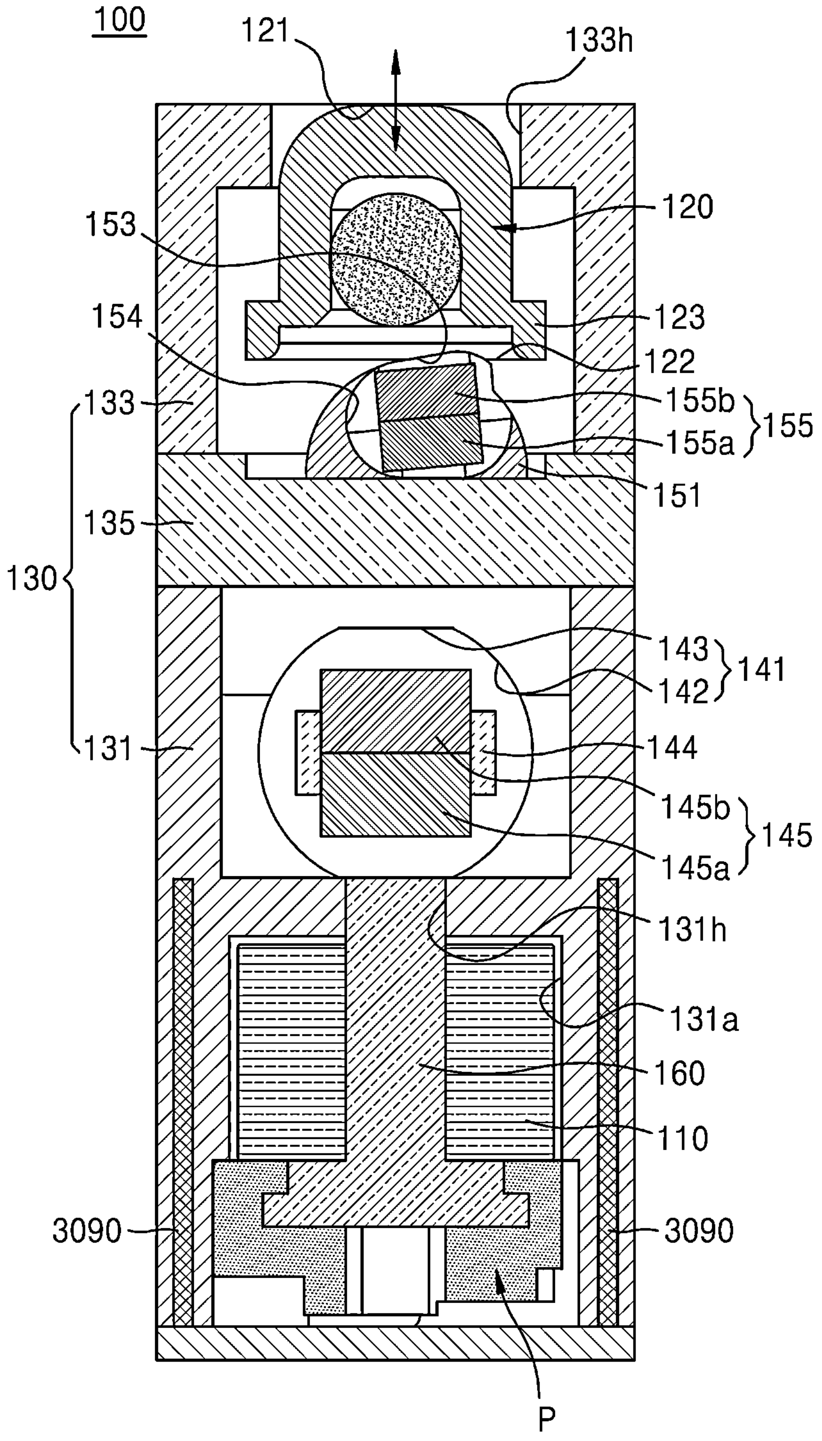
FIG. 42 is a cross-sectional view illustrating the information output apparatus according to the embodiment of FIG. 41.

FIG. 41 is a perspective view illustrating an information output apparatus 100 according to an embodiment of the present disclosure. FIG. 42 is a cross-sectional view illustrating the information output apparatus 100 according to the embodiment of FIG. 41.

Referring to FIGS. 41 and 42, the information output apparatus 100 according to an embodiment of the present disclosure may include a driving source 110, an expression unit 120, a base unit 130, a first driving unit 140, a second driving unit 150, and a support 160.

The driving source 110 according to an embodiment of the present disclosure may be connected to a power source P and disposed to allow a current to flow therethrough and may be formed of a coil. Since the driving source 110 is formed of the coil, when a current flows, a magnetic field may be formed around the driving source 110.

The driving source 110 may have various shapes, may have a shape in which a circuit wire is wound a plurality of times, and may be formed by varying the number of times by which the circuit wire is wound. The first driving unit 140 and the second driving unit 150, which will be described below, may be driven through a magnetic field generated by a current flowing in the driving source 110.

In addition, the first driving unit 140 and the second driving unit 150 may be driven to provide a driving force for the movement of the expression unit 120 that is in direct or indirect contact therewith.

The support 160 to be described below may be disposed inside the driving source 110 according to an embodiment of the present disclosure.

The support 160 according to an embodiment of the present disclosure may include an area formed to be elongated and may be disposed to pass through the driving source 110. As a specific example, the driving source 110 formed of the coil may be formed to have a shape wound around the area, which is formed to be elongated in the support 160, a plurality of times.

Although not shown in the drawing, one end portion of the support 160 may be elongated to support the first driving unit 140, and the first driving unit 140 may be moved in a state of being supported by the one end portion of the support 160.

The support 160 may correspond to a passage hole 131*h* formed in a first accommodation portion 131 and may be disposed to pass through the passage hole 131*h*.

The support 160 according to an embodiment of the present disclosure may include a magnetic material, and thus when a magnetic field is generated through the driving source 110, a magnitude of the magnetic field may be increased, and the magnetic field may be efficiently generated, thereby obtaining an effect of reducing the power consumption of the information output apparatus 100 and increasing a driving force.

The expression unit 120 according to an embodiment of the present disclosure may be formed and disposed to be detected by a user H and may be moved according to the movements of the first driving unit 140 and the second driving unit 150, which will be described below, and a position thereof may be shifted at least upward or downward (see FIG. 42) in a longitudinal central axis of the expression unit 120.

The expression unit 120 may move in a first direction (downward in FIG. 42) to approach the driving source 110 or may move in a direction opposite to the first direction (upward in FIG. 42) to move away from the driving source 110.

The expression unit 120 may be exposed to the outside through an inlet hole 133*h* formed in a second accommodation portion 133 which will be described below. Since the expression unit 120 is exposed to the outside, the user H may tactually or visually detect the movement of the expression unit 120.

The expression unit 120 according to an embodiment of the present disclosure may include an expression surface 121, a support surface 122, and a peripheral portion 123.

The expression surface 121 according to an embodiment of the present disclosure may be the outermost area of the expression unit 120, specifically, an area that is furthest away from the driving source 110, and may include an area recognized by the user H.

The user H may recognize the expression unit 120 through the entire area of the expression unit 120, but may also recognize only the expression surface 121. For example, the user H may detect the movement of the expression unit 120 through contact with the expression surface 121 and may easily detect the movement of the expression unit 120 by visually detecting the expression surface 121.

The expression surface 121 according to an embodiment of the present disclosure may be formed to be convex toward the outside and may include a curved surface. However, the present disclosure is not limited thereto, and the expression surface 121 may include a pillar-shaped area, for example, an area with a shape similar to a cylinder.

The expression surface 121 according to an embodiment of the present disclosure may be variously modified and implemented in such a manner that an upper surface (see FIG. 42) is formed to be flat and only a corner portion is formed to have a certain radius of curvature.

The support surface 122 may be a surface facing the second driving unit 150 among areas of the expression unit 120, may form a lower area of the expression unit 120, and may come into contact with the second driving unit 150.

The second driving unit 150 may transmit a force to the expression unit 120 through the support surface 122. Specifically, in a state in which a second driving body 151 is in contact with the support surface 122, the support surface 122 may be moved in the first direction (upward in FIG. 42), and the expression surface 121 may be exposed to the outside and recognized by the user H.

The peripheral portion 123 according to an embodiment of the present disclosure may be connected to the support surface 122 and may be formed to have the relatively longest length from the longitudinal central axis of the expression unit 120.

Specifically, an outer diameter of the peripheral portion 123 may be greater than an inner diameter of the inlet hole 133*h* formed in the second accommodation portion 133. Thus, there may be an effect of preventing the expression unit 120 disposed inside the second accommodation portion 233, specifically, the peripheral portion 123, from passing through the inlet hole 133*h* to be separated to the outside.

The expression unit 120 according to an embodiment of the present disclosure may be made of various materials and may be made of an insulating material that is a lightweight and durable material. Specifically, the expression unit 120 may contain a resin-based organic material and may include an inorganic material such as a ceramic material.

However, the present disclosure is not limited thereto, and the expression unit 120 may be variously modified and implemented to be made of a material such as metal or glass.

The base unit 130 according to an embodiment of the present disclosure may accommodate the driving source 110 and the expression unit 120 and may include the first accommodation portion 131, the second accommodation portion 133, and a third accommodation portion 135.

The base unit 130 according to an embodiment of the present disclosure may have an elongated shape to accommodate the driving source 110, the first driving unit 140, and the second driving unit 150 and may formed to entirely surround the driving source 110, the first driving unit 140, and the second driving unit 150.

The first accommodation portion 131 according to an embodiment of the present disclosure may accommodate the driving source 110 and the first driving unit 140, and the driving source 110 and the support 160 may be disposed at one side (a lower side of FIG. 42) of the first accommodation portion 131.

A layer portion (not shown) in which the passage hole 131*h* is formed may be disposed at a preset level of the first accommodation portion 131 according to an embodiment of the present disclosure, and the driving source 110 and the support 160 may be disposed in a space formed by the layer portion and inner walls 131*a* of the first accommodation portion 131.

A locking groove may be formed at an upper side with respect to the layer portion formed in the first accommodation portion 131, and the first driving unit 140 may be placed therein to perform angular movement or rotational movement.

The second accommodation portion 133 according to an embodiment of the present disclosure may be disposed opposite to the first accommodation portion 131 and may accommodate the expression unit 120, and the passage hole 131*h* may be formed in one surface thereof facing the expression surface 121 such that the expression unit 120, specifically, the expression surface 121, protrudes, passes therethrough, and is exposed to the outside.

The first accommodation portion 131 and the second accommodation portion 133 according to an embodiment of the present disclosure may be disposed adjacent to each other and may be disposed not to overlap each other.

The third accommodation portion 135 may be disposed between the first accommodation portion 131 and the second accommodation portion 133 according to an embodiment of the present disclosure, and preset areas of the first driving unit 140 and the second driving unit 150 may be disposed in the third accommodation portion 135.

The third accommodation portion 135 may cover a pair of locking grooves 131*b* formed in the first accommodation portion 131 to face each other and may prevent the first driving unit 140 seated in the locking grooves 131*b* from being separated.

A groove may be formed in a lower end portion of the second accommodation portion 133 (see FIG. 42), and when the second accommodation portion 133 is disposed on the third accommodation portion 135 to cover the third accommodation portion 135, the second driving unit 150 may be rotatably seated in the groove. The second accommodation portion 133 and the third accommodation portion 135 may be coupled, thereby preventing the second driving unit 150 from being separated.

In addition, the second accommodation portion 133 and the third accommodation portion 135 may connected so that a longitudinal central axis of the second driving unit 150 may be maintained, and the second accommodation portion 133 and the first accommodation portion 131 may be connected so that a longitudinal central axis of the first driving unit 140 may be maintained.

One side (upper side in FIG. 41) of the third accommodation portion 135 according to an embodiment of the present disclosure may be connected to the second accommodation portion 133, and the other side (lower side in FIG. 41) opposite to the one side may be connected to the first accommodation portion 133.

The second driving unit 150 to be described below may be disposed in the third accommodation portion 135 according to an embodiment of the present disclosure, and the third accommodation portion 135 may include a driving support 136 and a driving groove 137.

The third accommodation portion 135 may have open upper and lower sides, the driving groove 137 may be formed, and the driving support 136 may connects facing inner walls 131*a* of the open third accommodation portion 135 and may be formed integrally with the third accommodation portion 135.

A rotation center of the second driving unit 150, specifically, a rotation center of the second driving body 151, may be formed at a point deviating from a center of the second driving body 151, and the rotation center of the second driving body 151 may be eccentric. Thus, there may be an effect in which, as a first movement area 152, a second movement area 153, and a connection area 154, in which a position of a second magnetic portion 155, which will be described below, is fixed, are rotated, the second driving body 151 may come into contact with the expression unit 20, and the expression unit 120 may be moved in the first direction (upward in FIG. 42).

The first driving unit 140 according to an embodiment of the present disclosure may be disposed inside the base unit 130, specifically, inside the first accommodation portion 131 and the third accommodation portion 135, and may include a first driving body 141, a magnet holder 144, a first magnetic portion 145, and a first driving control part 149.

The first driving unit 140 may be spaced apart from the driving source 110 disposed in the first accommodation portion 131. The first driving unit 140 may be disposed adjacent to the driving source 110 and may be driven by a current flowing in the driving source 110 to perform angular movement or rotational movement.

The movement of the first driving unit 140 may be transmitted to the second driving unit 150, and when the second driving unit 150 receives power from the first driving unit 140 to perform angular movement or rotational movement, the expression unit 120 may be lifted or lowered to move in the first direction (downward in FIG. 42) toward the driving source 110 and a direction opposite to the first direction.

The first driving control part 149 may be formed to protrude from each of both sides of the first driving unit 140. The first driving unit 140 may perform angular movement or rotational movement around the first driving control part 149.

As an alternative embodiment, a central axis of the first driving unit 140 and the first driving control part 149 may not coincide with each other and may be eccentric to each other.

As an alternative embodiment, the first driving control part 149 may not be formed to protrude, and the first driving body 141 may be formed in a spherical shape.

The first driving body 141 according to an embodiment of the present disclosure may include a flat portion 143 and a curved portion 142, and the flat portion 143 may be formed in a preset section so that polarities formed in the first magnetic portion 145 may be correctly arranged in a vertical direction (see FIG. 42).

The first driving unit 140 according to an embodiment of the present disclosure may be provided with a pair of first driving bodies 141 with respect to a central portion thereof, the magnet holder 144 may be positioned between the pair of first driving bodies 141, and the first magnetic portion 145 may be accommodated in the magnet holder 144.

The first magnetic portion 145 according to an embodiment of the present disclosure may contain a magnetic material, for example, a permanent magnet. The first magnetic portion 145 may have a relatively greater magnetic force than a second magnetic portion 155 provided in the second driving unit 150 which will be described below.

As a result, in a situation in which an external force applied by the user H may be applied to the expression unit 120, and thus the second driving unit 150 may not rotate, after the external force applied to the expression unit 120 is removed, the second magnetic portion 155 and the second driving unit 150 in which the second magnetic portion 155 is disposed may be rotated by a magnetic force of the first magnetic portion 145, thereby moving the expression unit 120 in the first direction and a direction opposite to the first direction.

That is, even when power, which is supplied only for a relatively short time from the power source P, may not be transmitted to the second driving unit 150 through the first driving unit 140 due to the external force applied to the expression unit 120, the first driving unit 140 may perform angular movement or rotational movement by power received from the driving source 110 to have a polarity in a preset direction, and when the external force applied to the expression unit 120 is removed, there may be an effect in which the second driving unit 150 may perform angular movement or rotational movement by the first driving unit 140.

The first magnetic portion 145 according to an embodiment of the present disclosure may have a first magnetic area 145*a* (N-pole or S-pole) and a second magnetic area 145*b* (S-pole or N-pole) having different polarities, respectively. The first magnetic area 145*a* and the second magnetic area 145*b* having different polarities may be arranged in a direction from the driving source 110 to the expression unit 120 at one point during rotation of the first driving unit 140, for example, a Z-axis direction (see FIG. 41).

The second driving unit 150 according to an embodiment of the present disclosure may be disposed between the first driving unit 140 and the expression unit 120, may perform angular movement or rotational movement according to the driving of the first driving unit 140, and may be formed to move the expression unit 120 in the first direction downward in FIG. 42) toward the first driving unit 140 and a direction (upward in FIG. 42). opposite to the first direction.

The second driving unit 150 according to an embodiment of the present disclosure may include the second driving body 151, and one surface of the second driving body 151 may be formed to support the expression unit 120 and provide a driving force for upward or downward movement of the expression unit 120.

One surface of the second driving body 151 according to an embodiment of the present disclosure may include a curved surface. As a more specific embodiment, the one surface of the second driving body 151 may include a boundary line with a shape similar to a circle.

As a result, while the second driving unit 150 and the second driving body 151 move, an outer surface of the second driving body 151 may transmit power to the expression unit 120, specifically, the support surface 122. The expression unit 120 may move in the first direction (downward in FIG. 42) toward the first driving unit 140 and a direction (upward in FIG. 42) opposite to the first direction.

The second driving bodies 151 according to an embodiment of the present disclosure may have various shapes and may each be variously modified and implemented to have a shape similar to a rotating body or a disc-like shape.

As a result, a natural driving force may be provided to the support surface 122 of the expression unit 120 during the angular movement or rotational movement of the second driving body 151, thereby allowing the expression unit 120 to efficiently perform continuous and natural movement.

A connection portion according to an embodiment of the present disclosure may be connected to the first driving body 141, and the second magnetic portion 155 may be accommodated therein.

The second driving unit 150 according to an embodiment of the present disclosure may include a pair of second driving bodies 151, and a separation space SA may be formed between the pair of second driving bodies 151. The connection portion (not shown) may be disposed in the separation space SA.

The second magnetic portion 155 may be accommodated in the connection portion according to an embodiment of the present disclosure. The second magnetic portion 155 may contain a magnetic material, for example, a permanent magnet. The second magnetic portion 155 may be formed to have a relatively smaller magnetic force than the first magnetic portion 145.

As a result, a magnetic area formed in the second magnetic portion 155 may be changed by a magnetic force of the first magnetic portion 145, and the second driving unit 150, in which the second magnetic portion 155 is accommodated, may move. However, a change in magnetic area formed in the first magnetic portion 145 may be prevented due to a magnetic force of the second magnetic portion 155.

In other words, in a situation in which an external force applied by the user H may be applied to the expression unit 120, and thus the second driving unit 150 may not rotate, after the external force applied to the expression unit 120 is removed, the second magnetic portion 155 and the second driving unit 150 in which the second magnetic portion 155 is disposed may be rotated by a magnetic force of the first magnetic portion 145, thereby moving the expression unit 120 in the first direction and a direction opposite to the first direction.

That is, even when power, which is supplied only for a relatively short time from the power source P, may not be transmitted to the second driving unit 150 through the first driving unit 140 due to the external force applied to the expression unit 120, the first driving unit 140 may perform angular movement or rotational movement by power received from the driving source 110 to have a polarity in a preset direction, and when the external force applied to the expression unit 120 is removed, there may be an effect in which the second driving unit 150 may perform angular movement or rotational movement by the first driving unit 140.

The second magnetic portion 155 according to an embodiment of the present disclosure may have a first magnetic area (N-pole or S-pole) and a second magnetic area (S-pole or N-pole) having different polarities, respectively. The first magnetic area and the second magnetic area having different polarities may be arranged in the direction from the driving source 110 to the expression unit 120 at one point during rotation of the first driving unit 140, for example, the Z-axis direction (see FIG. 41).

The second magnetic portion 155 according to an embodiment of the present disclosure may not coincide with a central axis of the second driving unit 150, specifically, a central axis of the second driving body 151. For example, the second magnetic portion 155 may be disposed to overlap one area of the second driving control part 159.

As a result, a torque force for the second driving unit 150 may be easily generated, and the second driving unit 150 may perform angular movement or rotational movement, thereby obtaining an effect of efficiently moving the expression unit 120 and improving the precise expression power of the information output apparatus 100.

In addition, since the torque force for the second driving unit 150 is easily generated, the power consumption of the information output apparatus 100 may be reduced.

The second driving unit 150 according to an embodiment of the present disclosure may be driven by receiving power from the first driving unit 140 which receives power from the driving source 110. Specifically, the second driving unit 150 may be moved by a magnetic field generated by the first driving unit 140.

That is, the second driving unit 150 may be moved, specifically, due to a repulsive force and an attractive force acting on the second magnetic portion 155 accommodated in the connection portion. The first driving unit 140, specifically, the first magnetic portion 145 accommodated in the magnet holder 144, may be moved by a magnetic field generated by the driving source 110. As the first magnetic portion 145 moves, the second magnetic portion 155 of the second driving unit 150 may perform rotational movement.

The support 160 may be disposed inside the driving source 110 according to an embodiment of the present disclosure.

The support 160 according to an embodiment of the present disclosure may include an area formed to be elongated and may be disposed to pass through the driving source 110. As a specific example, the driving source 110 formed of a coil may be formed to have a shape wound around the area, which is formed to be elongated in the support 160, a plurality of times.

The support 160 may correspond to the passage hole 131*h* formed in the first accommodation portion 131 and may be disposed to pass through the passage hole 131*h*.

The support 160 according to an embodiment of the present disclosure may include a magnetic material, and thus when magnetic field is generated through the driving source 110, a magnitude of the magnetic field may be increased, and the magnetic field may be efficiently generated, thereby reducing the power consumption of the information output apparatus 100 and increasing a driving force.

The operating principle and effects of the information output apparatus 100 according to an embodiment of the present disclosure as described above will be described.

The information output apparatus 100 according to an embodiment of the present disclosure may include the driving source 110, the expression unit 120, the base unit 130, the first driving unit 140, the second driving unit 150, and the support 160.

The driving source 110 according to an embodiment of the present disclosure may be formed of the coil, and when a current is applied from the power source P, a magnetic field may be formed. A repulsive force or an attractive force may be applied to the first driving unit 140 by the magnetic field formed in the driving source 110.

A normal position state of the information output apparatus 100 is shown. When a current is applied to the driving source 110, a magnetic field may be formed. Specifically, when a repulsive force is applied to the first magnetic area 145*a*, the first magnetic area 145*a* mat try to move to a position away from the driving source 110, and the second magnetic area 145*b* moves to a position closer to the driving source 110 due to an attractive force.

Due to the movement of the first magnetic portion 145, the first driving unit 140, in which the first magnetic portion 145 is accommodated, may move.

The first driving unit 140, specifically, the first driving body 141, may have the curved portion 142 and the flat portion 143 which are formed along an outer peripheral surface, and the curved portion 142 allows the first driving unit 140 to rotate stably. When a position of the first magnetic portion 145 accommodated in the magnet holder 144 is shifted to a final position as the first magnetic area 145*a* and the second magnetic area 145*b* move, there may be an effect in which the flat portion 143 may maintain its position stably by coming into surface contact with one surface of the first accommodation portion 131, which faces the flat portion 143.

After the movement of the first driving unit 140 is completed, the first driving unit 140 may transmit power to the second driving unit 150 to cause the second driving unit 150 to perform angular movement or rotational movement. The second driving unit 150 according to an embodiment of the present disclosure may move by receiving power from the first driving unit 140 and may move by a repulsive force or attractive force with the first driving unit 140.

When the first magnetic area 145*a* of the first magnetic portion 145, which is accommodated in the first driving unit 140, specifically, the magnet holder 144, receives power from the driving source 110 to be disposed on the second magnetic area 145*b*, the second driving unit 150, which has an attractive force with the first magnetic area 145*a*, specifically, a second magnetic area 155*b* of the second magnetic portion 155, may move to be positioned closer to the first driving unit 140.

Due to the movement of the second magnetic portion 155, the second driving unit 150 may move using the second driving control part 159 as a rotation center. In this case, the second movement area 153 may be moved to a position closer to the first driving unit 140 and may be supported by the driving support 136 formed in the third accommodation portion 135.

Since a distance from the rotation center to the first movement area 152 is longer than a distance from the rotation center to the second movement area 153 of the second driving body 151, when the first movement area 152 faces the expression unit 120, specifically, the support surface 122, the second driving body 151 may support the support surface 122 of the expression unit 120 to push the support surface 122 upward (see FIG. 41).

That is, since the first driving unit 140 and the second driving unit 150 do not support each other in direct contact with each other, but are placed in the separate first and third accommodation portions 131 and 135, respectively, the first driving unit 140 and the second driving unit 150 may not be affected by an external force and may move by a magnetic field of the driving source 110. When an external force is removed, a position of the second magnetic portion 155 may be changed due to a repulsive force or an attractive force by the first magnetic portion 145 of the first driving unit 140, of which a position has already been determined, and the second driving unit 1500 may move to move the expression unit 120 upward or downward.

As an example, the information output apparatus 100 according to the preset embodiment may further include a driving force limiting member 3090.

The driving force limiting member 3090 may serve to reduce or prevent a magnetic field of the driving source 110 from interfering or interacting with other external elements.

For example, the driving force limiting member 3090 may reduce or shield the interference of the magnetic field in a direction away from a side surface of the driving source 110 (X-axis direction in the drawing) and may allow the directionality of the magnetic field toward the expression unit 120 to be enhanced, thereby precisely controlling the movement of the expression unit 120 and improving the efficiency of the movement.

In addition, in other words, the information output apparatus 100 may use a magnetic field generated by the driving source 110, and the first driving unit 140 and the second driving unit 150 may also include the first magnetic portion 145 and the magnetic portion 155 so that the transmission of such a magnetic field to adjacent side spaces may be reduced or blocked, and a force of the magnetic field may be effectively directed in the direction from the driving source 110 to the expression unit 120.

The driving force limiting member 3090 may be disposed on at least one side of the driving source 110. For example, the driving force limiting member 3090 may be disposed at one side outside a coil 1020. Specifically, the driving force limiting member 3090 may be disposed to overlap at least a portion of the coil 1020.

The arrangement of the driving force limiting member 3090 may be the same as the above-described embodiments or may be easily modified and adopted from the above-described embodiments.

Figure 43:
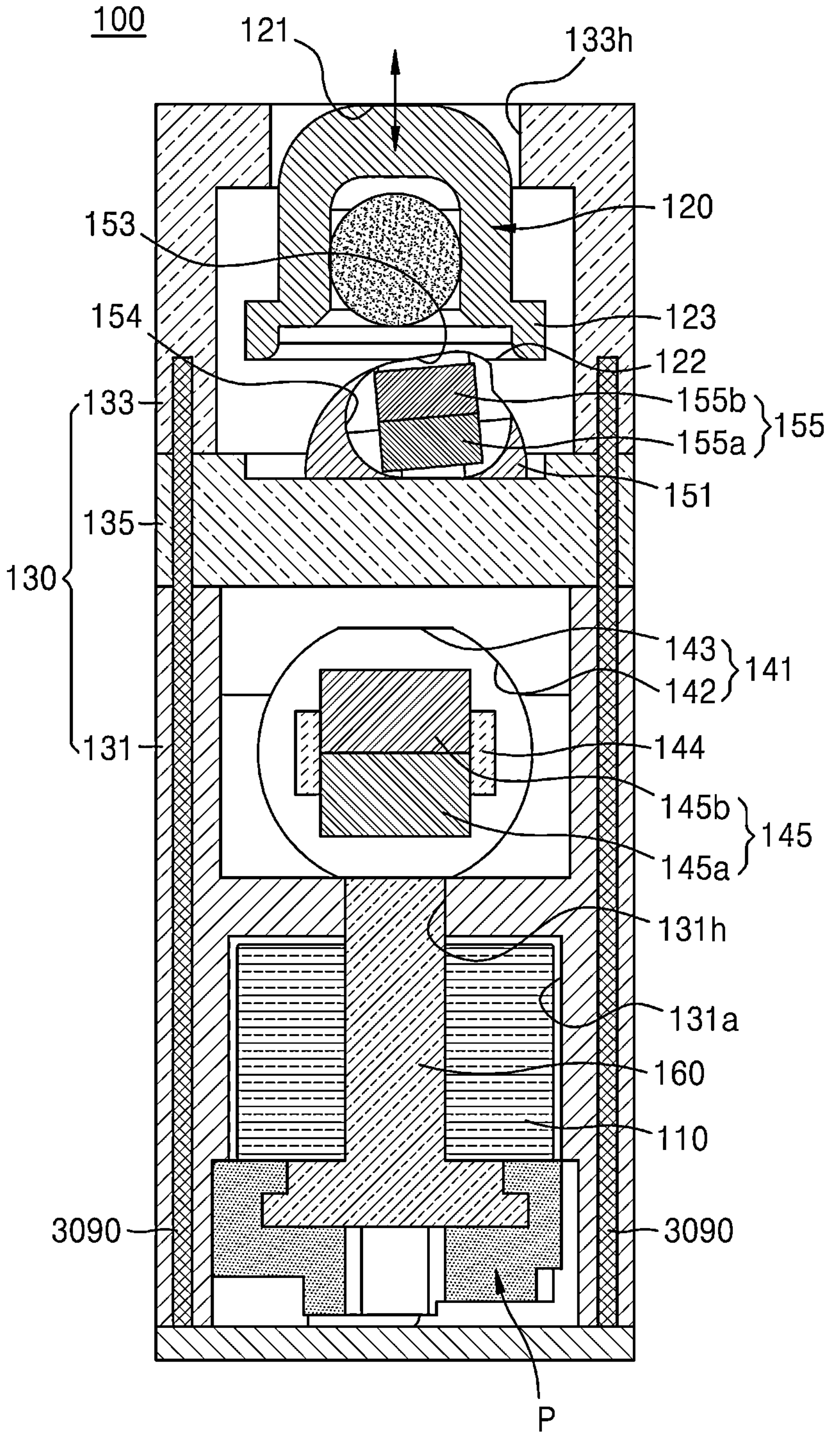
FIG. 43 is a view illustrating a modified example of FIG. 42.

FIG. 43 is a view illustrating a modified example of FIG. 42.

Referring to FIG. 43, a driving force limiting member 3090 may be formed to extend to have a length.

As a specific embodiment, the driving force limiting member 3090 may be formed to extend so as to overlap at least one area of each of a first driving unit 140 and a second driving unit 150.

In a desirable embodiment, the driving force limiting member 3090 may be formed to extend from the lowermost end of a driving source 110 to a portion corresponding to the uppermost end of the second driving unit 150 in FIG. 43.

In other words, the driving force limiting member 3090 may be formed to extend from the driving source 110 to cover both the first driving unit 140 and the second driving unit 150.

Figure 44:
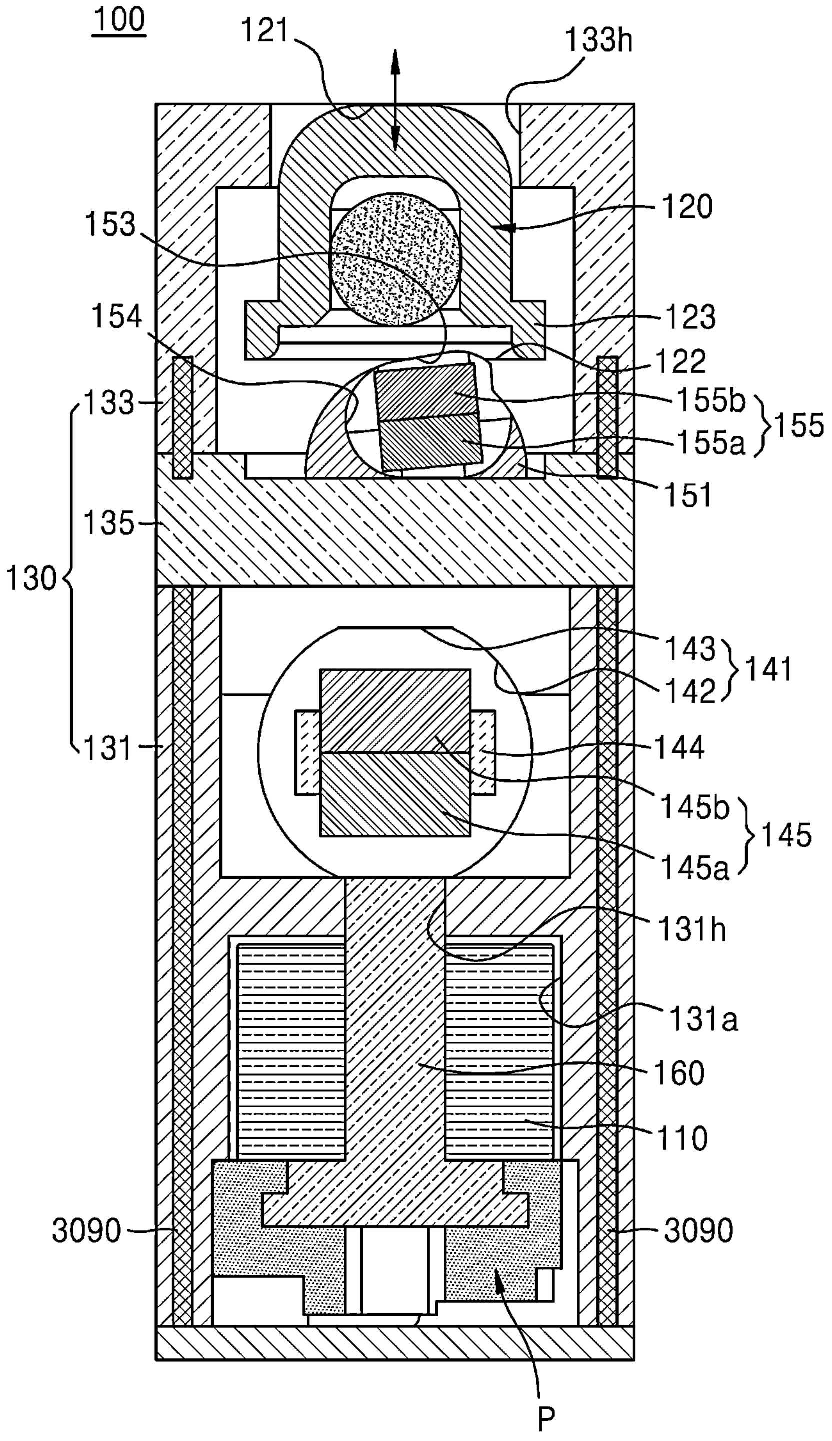
FIG. 44 is a view illustrating another modified example of FIG. 42.

FIG. 44 is a view illustrating another modified example of FIG. 42.

Referring to FIG. 44, a driving force limiting member 3090 may be formed to extend to have a length and may be provided as a plurality of driving force limiting members 3090.

As a specific example, the driving force limiting member 3090 may extend from a driving source 110 to cover a first driving unit 140. In addition, a driving force limiting member 3090 may be additionally provided, and the driving force limiting member 3090 may be disposed to cover a second driving unit 150.

In other words, the driving force limiting member 3090 may be divided into an element extending from the driving source 110 to a level at which the driving force limiting member 3090 may cover the first driving unit 140, and an element covering the second driving unit 150.

In other words, the driving force limiting member 3090 may be expressed as being provided at an upper side and a lower side with respect to a third accommodation portion 135.

Figure 45:
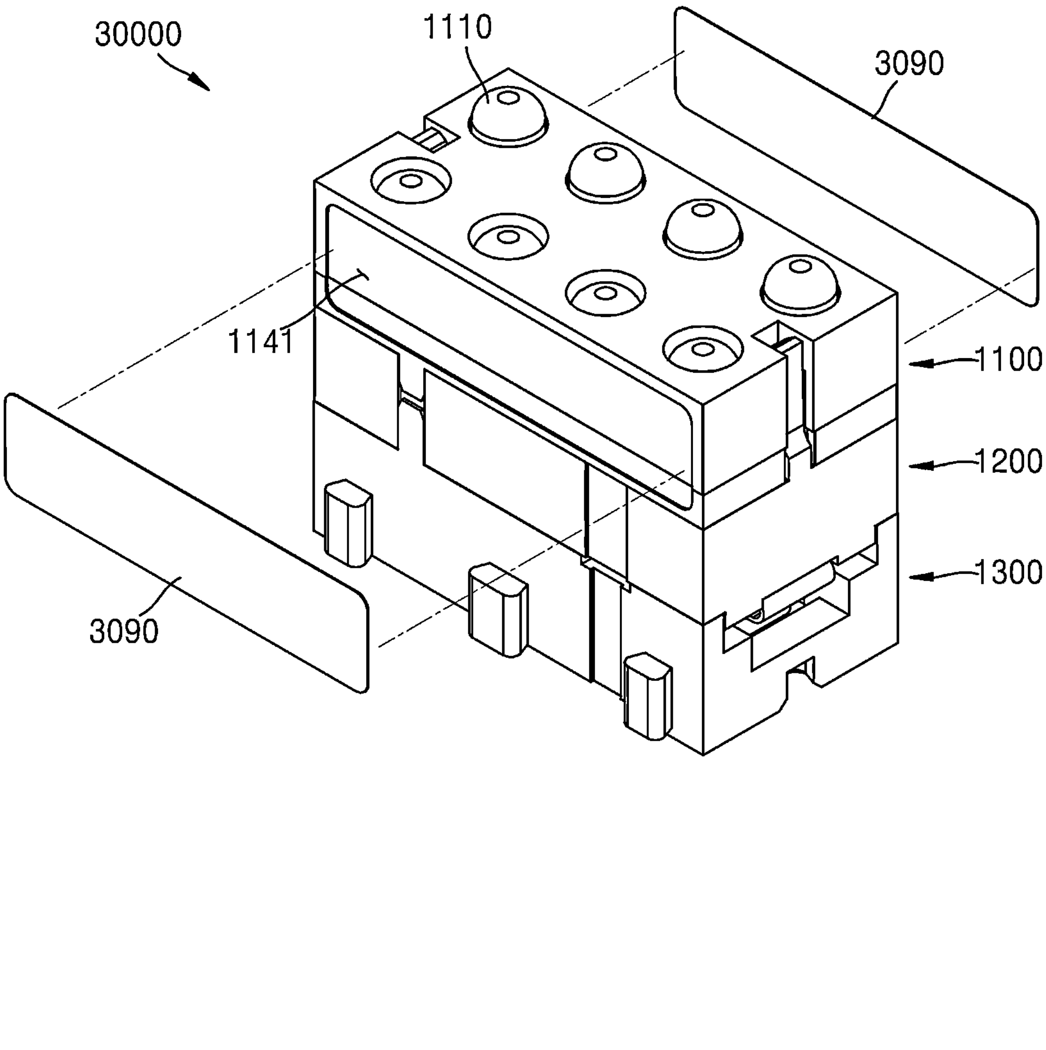
FIG. 45 is an exploded perspective view illustrating an information output apparatus according to an embodiment of the present disclosure.

FIG. 45 is an exploded perspective view illustrating an information output apparatus 30000 according to an embodiment of the present disclosure.

The output apparatus 30000 of the embodiment shown in FIG. 45 differs from that of the embodiment described with reference to FIGS. 16A to 16C in that the information output apparatus 30000 further includes a driving force limiting member 3090.

Therefore, hereinafter, differences from the above-described embodiments will be mainly described, and the same contents as the above-described embodiments or contents, which may be easily modified by those skilled in the art from the above-described embodiments, will be briefly described or omitted.

Referring to FIG. 45, the information output apparatus 30000 according to the present embodiment may include an upper unit 1100, a lower unit 1200, and a base unit 1300.

In this case, at least a partial space 1141 may be formed in a side surface of the upper unit 1100.

The driving force limiting member 3090 may be accommodated in the space 1141 formed in the upper unit 1100. The driving force limiting member 3090 according to the present embodiment may be formed in a plate shape and may be formed in a shape corresponding to the space 1141 formed in the upper unit 1100.

The driving force limiting member 3090 may be accommodated in the space 1141 formed in the side surface of the upper unit 1100 so that a movement unit disposed inside the upper unit 1100 may be reduced or prevented from interacting with or interfering with a driving force providing unit or other movement units adjacent to each other.

Figure 46:
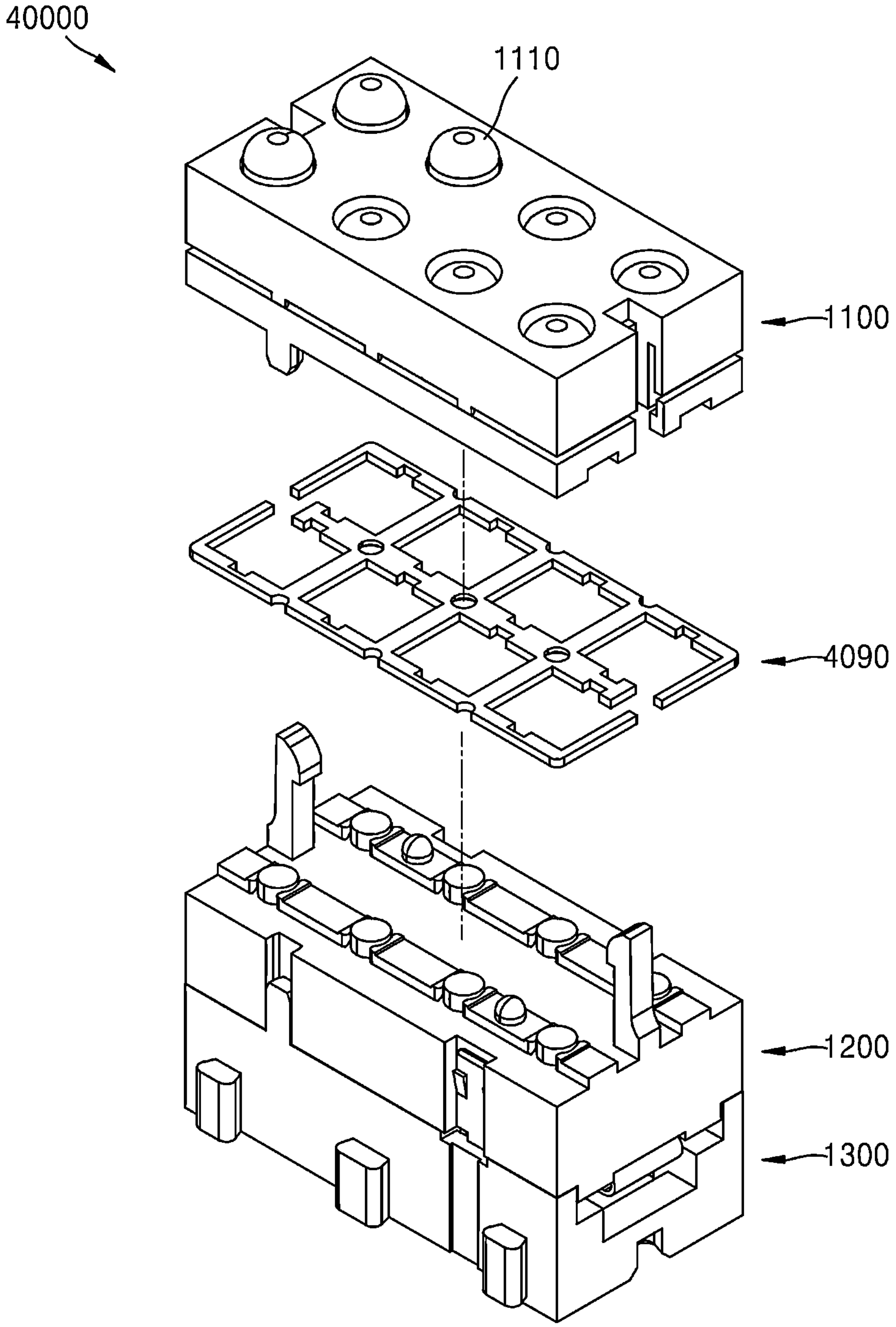
FIG. 46 is an exploded perspective view illustrating an information output apparatus according to another embodiment of the present disclosure.

FIG. 46 is an exploded perspective view illustrating an information output apparatus 40000 according to another embodiment of the present disclosure.

The information output apparatus 40000 of the embodiment shown in FIG. 46 differs from that of the embodiment described with reference to FIGS. 16A to 16C in that the information output apparatus 40000 further includes a driving force limiting member 3090.

Therefore, hereinafter, differences from the above-described embodiments will be mainly described, and the same contents as the above-described embodiments or contents, which may be easily modified by those skilled in the art from the above-described embodiments, will be briefly described or omitted.

Referring to FIG. 46, the information output apparatus 40000 according to the present embodiment may include an upper unit 1100, a lower unit 1200, and a base unit 1300.

In this case, the driving force limiting member 3090 may be further disposed between the upper unit 1100 and the lower unit 1200.

The driving force limiting member 3090 may be disposed between the upper unit 1100 and the lower unit 1200 so that a movement unit disposed inside the upper unit 1100 may be reduced or prevented from interacting with or interfering with a driving force providing unit or other movement units adjacent to each other.

As an embodiment, the driving force limiting member 3090 may be formed in a shape of a tray. As a specific example, the driving force limiting member 3090 may include a plurality of grooves. When a plurality of movement units are provided, the movement units may be accommodated in the grooves, respectively. Accordingly, when the plurality of movement units are respectively accommodated to correspond to the grooves, the respective movement units may not interact or interfere with each other by the driving force limiting member 3090.

Figure 47:
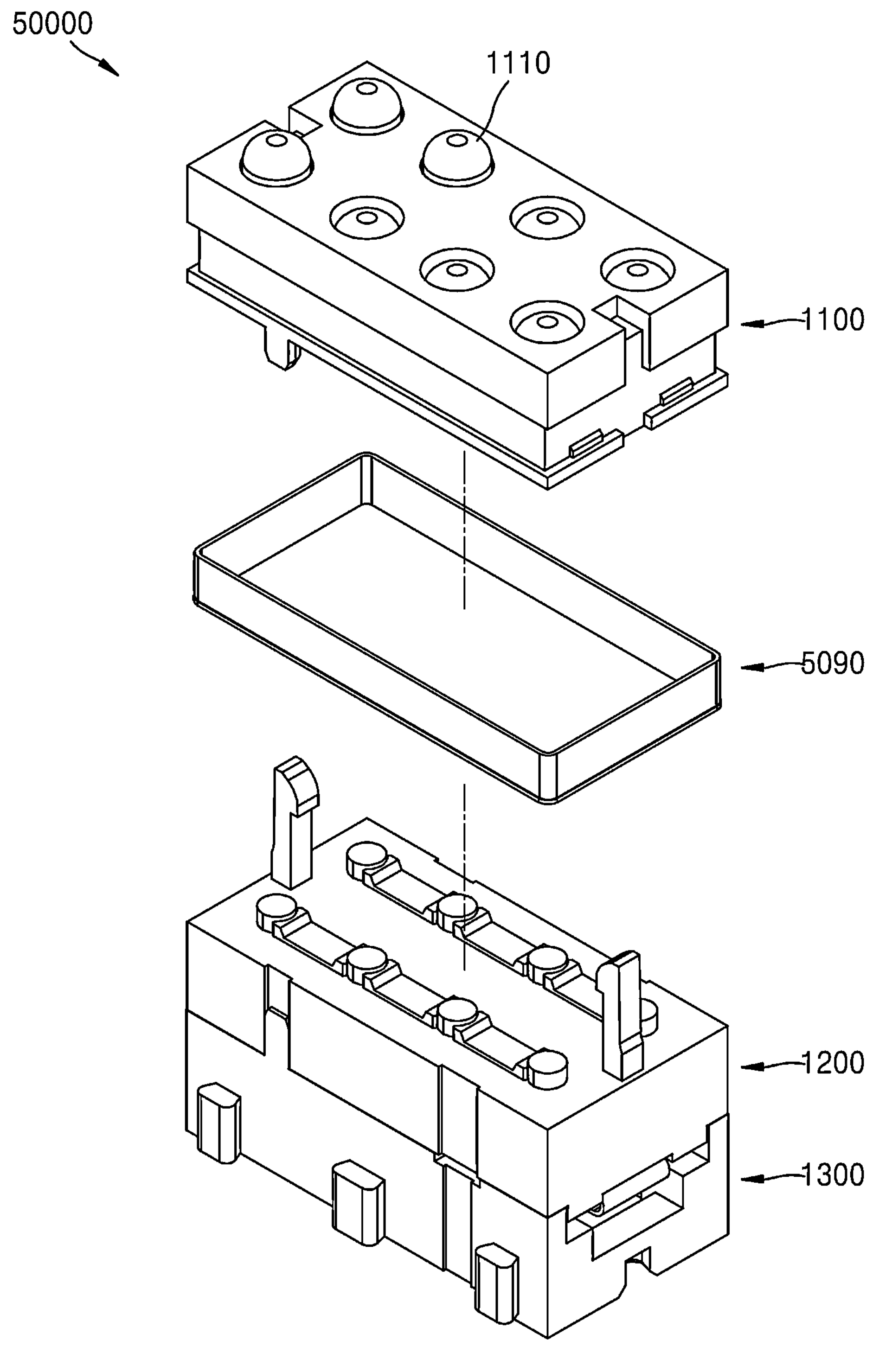
FIG. 47 is an exploded perspective view illustrating an information output apparatus according to another embodiment of the present disclosure.

FIG. 47 is an exploded perspective view illustrating an information output apparatus 50000 according to another embodiment of the present disclosure.

The information output apparatus 50000 of the embodiment shown in FIG. 47 differs from that of the embodiment described with reference to FIGS. 16A to 16C in that the information output apparatus 50000 further includes a driving force limiting member 3090.

Therefore, hereinafter, differences from the above-described embodiments will be mainly described, and the same contents as the above-described embodiments or contents, which may be easily modified by those skilled in the art from the above-described embodiments, will be briefly described or omitted.

Referring to FIG. 47, the information output apparatus 50000 according to the present embodiment may include an upper unit 1100, a lower unit 1200, and a base unit 1300.

In this case, the information output apparatus 50000 may further include the driving force limiting member 3090 formed to surround a periphery of the upper unit 1100.

The driving force limiting member 3090 may be formed in a ring shape to surround an outer periphery of the upper unit 1100. For example, when the upper unit 1100 is formed in a box shape, the driving force limiting member 3090 may be formed in a ring shape capable of surrounding a box.

The driving force limiting member 3090 may surround the periphery of the upper unit 1100, thereby reducing or preventing a movement unit 3400' disposed inside the upper unit 1100 from interacting or interfering with other magnetic objects present in the outside.

Meanwhile, as an alternative embodiment, an accommodation space may be provided along the periphery of the upper unit 1100 to accommodate the driving force limiting member 3090. In this case, the driving force limiting member 3090 may be accommodated in the accommodation space formed in the upper unit 1100 to surround the upper unit 1100.

In addition, as a specific example, another area of the movement unit 3400' may be supported by a driving support or a protruding area or as a specific example, may be supported through contact with the driving support or the protruding area. Thus, an expression unit may be positioned at a position different from the lowermost point, or in an optional embodiment, at the highest point, and such a state may include a state in which the expression unit is implemented by being physically latched by the driving support or the protruding area.

According to an information output apparatus according to the present embodiment, a precise control ability for information output may be improved, and user management convenience may be improved.

While the present disclosure has been described with reference to embodiments illustrated in the drawings, this is merely illustrative. It is to be understood that various equivalent modifications and variations of the embodiments can be made by a person having an ordinary skill in the art without departing from the spirit and scope of the present disclosure. Therefore, the true technical scope of protection of the present disclosure should be determined by the technical spirit of the appended claims. Accordingly, the true technical protection scope of the disclosure should be defined by the technical spirit of the appended claims.

The specific implementations described in the embodiments are examples and do not limit the scope of the embodiments in any method. For brevity of the specification, descriptions of conventional electronic configurations, control systems, software, and other functional aspects of the systems may be omitted. In addition, since the connection of the lines between the components or connection members shown in the drawings are illustrative examples of functional connections and/or physical or circuit connections, in the actual device, it may be represented as an alternative or additional various functional connections, physical connections, and circuit connections. In addition, unless “essential,” “important, and the like are not specifically mentioned, it may not be a necessary component for the application of the present disclosure.

In the specification (especially in the claims) of the embodiments, the use of the term “the” and similar indicating terms may correspond to both singular and plural. In addition, in the case where a range is described in the embodiment, since it includes the disclosure in which the individual values belonging to the range are applied, unless otherwise stated, it is the same as describing each individual value constituting the range in the detailed description. Finally, when there is no explicit or contradictory description of operations constituting the method according to the embodiment, the operations may be performed in a suitable order. The embodiments are not necessarily limited to the order in which the operations are described. The use of all the examples or exemplary terms (for example, etc.) in the embodiments is merely for describing the embodiments in detail. Accordingly, the scope of the embodiments may not be limited by the examples or exemplary terms, unless limited by the claims. In addition, those skilled in the art may recognize that various modifications, combinations, and changes may be configured according to design conditions and factors within the scope of the appended claims or equivalents thereof.

What is claimed is:

1. An information output apparatus comprising:

an upper unit;

a lower unit;

a base unit;

a plurality of expression units inside the upper unit, the plurality of expression units configured to move in at least one direction to be detected by a user;

a plurality of movement units at one side of a respective expression unit from among the plurality of expression units, the plurality of movement units configured to be rotatable in at least one direction to move the respective expression unit in at least one direction;

a plurality of driving force providing units in the lower unit, the plurality of driving force providing units being at one side of a respective movement unit from among the plurality of movement units and configured to provide a driving force to the respective movement unit; and a plurality of driving force limiting members inside the lower unit, the plurality of driving force limiting members configured to reduce or restrict the driving force generated by the plurality of driving force providing units from being transmitted in a direction that is different from a direction from the plurality of driving force providing units to the respective expression unit, wherein the upper unit and the lower unit are coupled to each other by:

a groove formed on an outer surface of one from among the upper unit and the lower unit; and an extension portion formed on the other from among the upper unit and the lower unit, the extension portion corresponding to the groove, wherein the plurality of driving force limiting members comprises a magnetic material, and wherein the base unit has an open upper portion facing the lower unit, and the base unit includes a space connected to the open upper portion.

2. The information output apparatus of claim 1, wherein a driving force providing unit from among the plurality of driving force providing units comprises a driving support extending in one direction, and a coil wound around the driving support, and wherein a driving force limiting member from among the plurality of driving force limiting members overlaps with at least a portion of the coil.

3. The information output apparatus of claim 2, wherein the driving force limiting member has a height in a longitudinal direction of the driving support.

4. The information output apparatus of claim 3, wherein the driving force limiting member has a height up to a position at which at least a portion of the driving force limiting member overlaps with the respective movement unit from among the plurality of movement units.

5. The information output apparatus of claim 2, wherein a movement unit from among the plurality of movement units is configured to rotate in at least one direction by a magnetic field generated from the coil in a case where an electric field is applied to the coil.

* * * * *